United States Patent
Marlowe et al.

(10) Patent No.: US 9,020,845 B2
(45) Date of Patent: Apr. 28, 2015

(54) SYSTEM AND METHOD FOR ENHANCED SHOPPING, PREFERENCE, PROFILE AND SURVEY DATA INPUT AND GATHERING

(71) Applicants: Alexander Hieronymous Marlowe, Pasadena, CA (US); Daniel Francis DiPrima, Pasadena, CA (US)

(72) Inventors: Alexander Hieronymous Marlowe, Pasadena, CA (US); Daniel Francis DiPrima, Pasadena, CA (US)

( * ) Notice: Subject to any disclaimer, the term of this patent is extended or adjusted under 35 U.S.C. 154(b) by 0 days.

(21) Appl. No.: 14/036,691

(22) Filed: Sep. 25, 2013

(65) Prior Publication Data
US 2014/0229342 A1    Aug. 14, 2014

Related U.S. Application Data

(60) Provisional application No. 61/705,518, filed on Sep. 25, 2012.

(51) Int. Cl.
| | |
|---|---|
| *G06Q 30/00* | (2012.01) |
| *G06Q 30/02* | (2012.01) |
| *G06Q 30/06* | (2012.01) |
| *G06F 3/0481* | (2013.01) |

(52) U.S. Cl.
CPC ........ *G06Q 30/0282* (2013.01); *G06Q 30/0643* (2013.01); *G06F 3/0481* (2013.01)

(58) Field of Classification Search
USPC ....................................... 705/26.1, 26.7, 27.2
See application file for complete search history.

(56) References Cited

U.S. PATENT DOCUMENTS

| | | | |
|---|---|---|---|
| 7,301,529 B2 | 11/2007 | Marvit et al. | |
| 7,542,845 B2 | 6/2009 | Russ et al. | |
| 7,737,958 B2 * | 6/2010 | Jeon et al. | 345/173 |
| 8,196,066 B1 | 6/2012 | Ouyang et al. | |
| 8,291,341 B2 | 10/2012 | Tseng et al. | |
| 8,494,274 B2 | 7/2013 | Badharudeen et al. | |
| 8,495,683 B2 | 7/2013 | van Coppenolle et al. | |
| 8,510,298 B2 | 8/2013 | Khandelwal | |
| 8,751,965 B2 * | 6/2014 | Wiley et al. | 715/832 |
| 2002/0103692 A1* | 8/2002 | Rosenberg et al. | 705/10 |
| 2004/0167794 A1* | 8/2004 | Shostack et al. | 705/1 |
| 2005/0193333 A1* | 9/2005 | Ebert | 715/517 |
| 2005/0229117 A1* | 10/2005 | Hullender et al. | 715/863 |

(Continued)

OTHER PUBLICATIONS

"Styling sliders and card sort," Confirmit. "Tip of the Month, " Feb. 2008. pp. 1-6. Accessed Aug. 7, 2014 from: https://extranet.confirmit.com/library/tip/Styling-sliders-and-card-sort.aspx.*

(Continued)

*Primary Examiner* — Yogesh C. Garg
*Assistant Examiner* — Kaitlin M Gallup

(57) ABSTRACT

Systems and methods, implemented with computing devices, enable a human operator to input in software environments degrees of preference for a plurality of products, items or services, in a single swipe or gesture, and values for a plurality of fields of data in a single swipe or gesture. The user performs gestures in software environments, through the interface of a computing device, to move and reposition objects representing products, items or services relative to a rating scale having a predetermined range of preference values, to indicate a degree of preference for each product, item or service. A plurality of objects may be moved and rated in a single gesture. Rating scales may be embedded in virtual environments. Methods included enable a user to input values for a plurality of data fields in a single swipe or gesture, at least in part by selecting or moving objects within a software environment.

20 Claims, 43 Drawing Sheets

(56) References Cited

U.S. PATENT DOCUMENTS

| | | |
|---|---|---|
| 2008/0036743 A1 | 2/2008 | Westerman et al. |
| 2008/0122796 A1* | 5/2008 | Jobs et al. .................... 345/173 |
| 2008/0316183 A1* | 12/2008 | Westerman et al. .......... 345/173 |
| 2009/0153288 A1* | 6/2009 | Hope et al. .................... 340/3.1 |
| 2010/0146412 A1* | 6/2010 | Nagase ......................... 715/760 |
| 2010/0185949 A1 | 7/2010 | Jaeger |
| 2010/0237991 A1 | 9/2010 | Prabhu et al. |
| 2011/0130170 A1* | 6/2011 | Han et al. ..................... 455/566 |
| 2011/0181529 A1 | 7/2011 | Capela et al. |
| 2011/0210850 A1* | 9/2011 | Tran ............................. 340/540 |
| 2011/0246329 A1 | 10/2011 | Geisner et al. |
| 2011/0246335 A1* | 10/2011 | Li .................................. 705/27.1 |
| 2011/0260962 A1* | 10/2011 | Benko et al. .................. 345/156 |
| 2012/0030566 A1* | 2/2012 | Victor .......................... 715/702 |
| 2012/0144299 A1 | 6/2012 | Crowe et al. |
| 2012/0249595 A1 | 10/2012 | Feinstein |
| 2012/0253908 A1* | 10/2012 | Ouimet et al. ............. 705/14.23 |
| 2012/0272144 A1 | 10/2012 | Radakovitz et al. |
| 2013/0076651 A1 | 3/2013 | Reimann et al. |
| 2013/0106686 A1 | 5/2013 | Bennett |
| 2013/0170699 A1 | 7/2013 | Bran et al. |
| 2013/0311909 A1* | 11/2013 | Howard et al. ............... 715/760 |
| 2013/0311954 A1* | 11/2013 | Minkkinen ................... 715/862 |

OTHER PUBLICATIONS

Norman, Kent L. "Implementation of Conditional Branching in Computerized Self-Administered Questionnaires," Nov. 2001. University of Maryland; College Park, Maryland. Accessed through Proquest Dialog Aug. 7, 2014.*

* cited by examiner

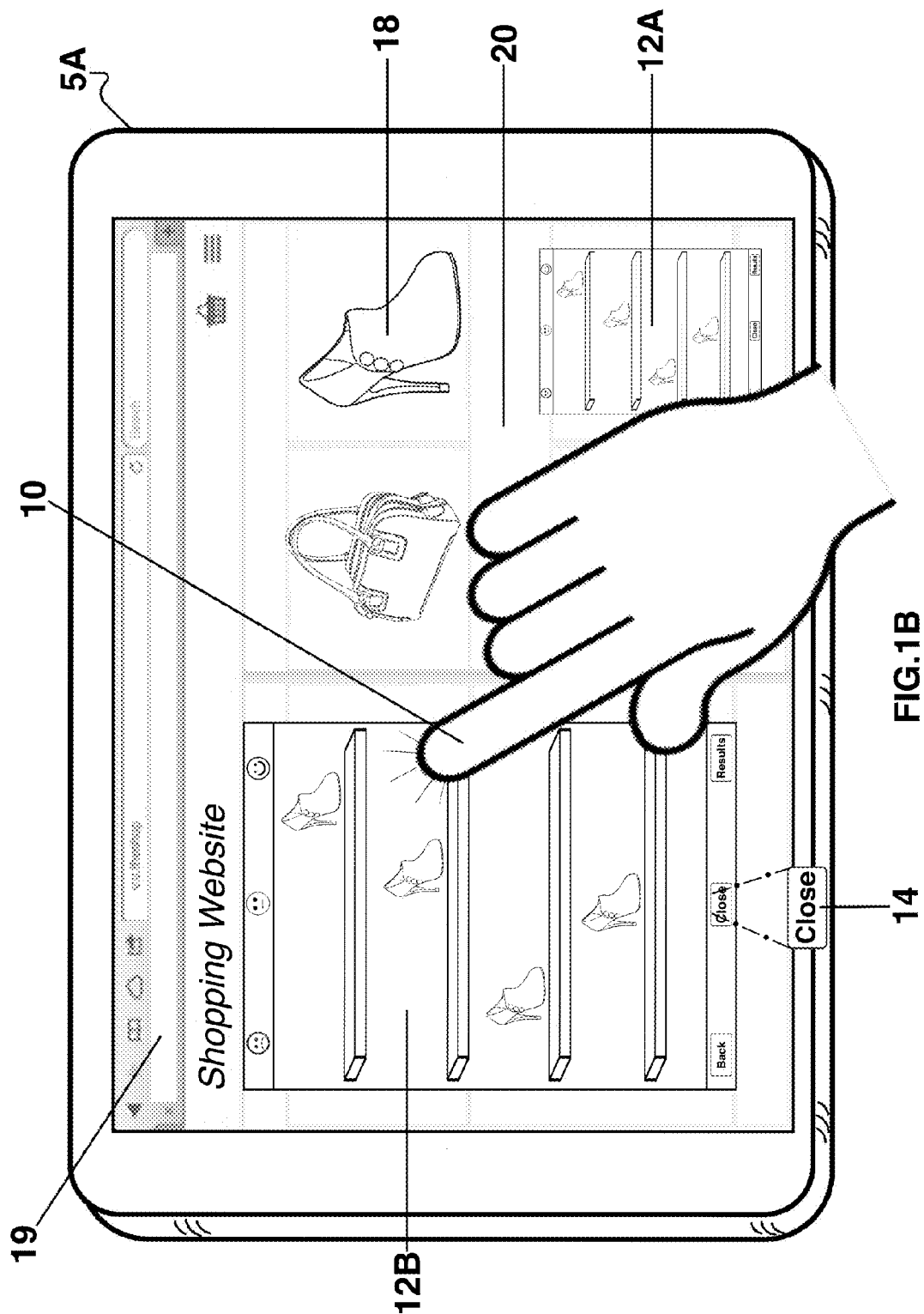

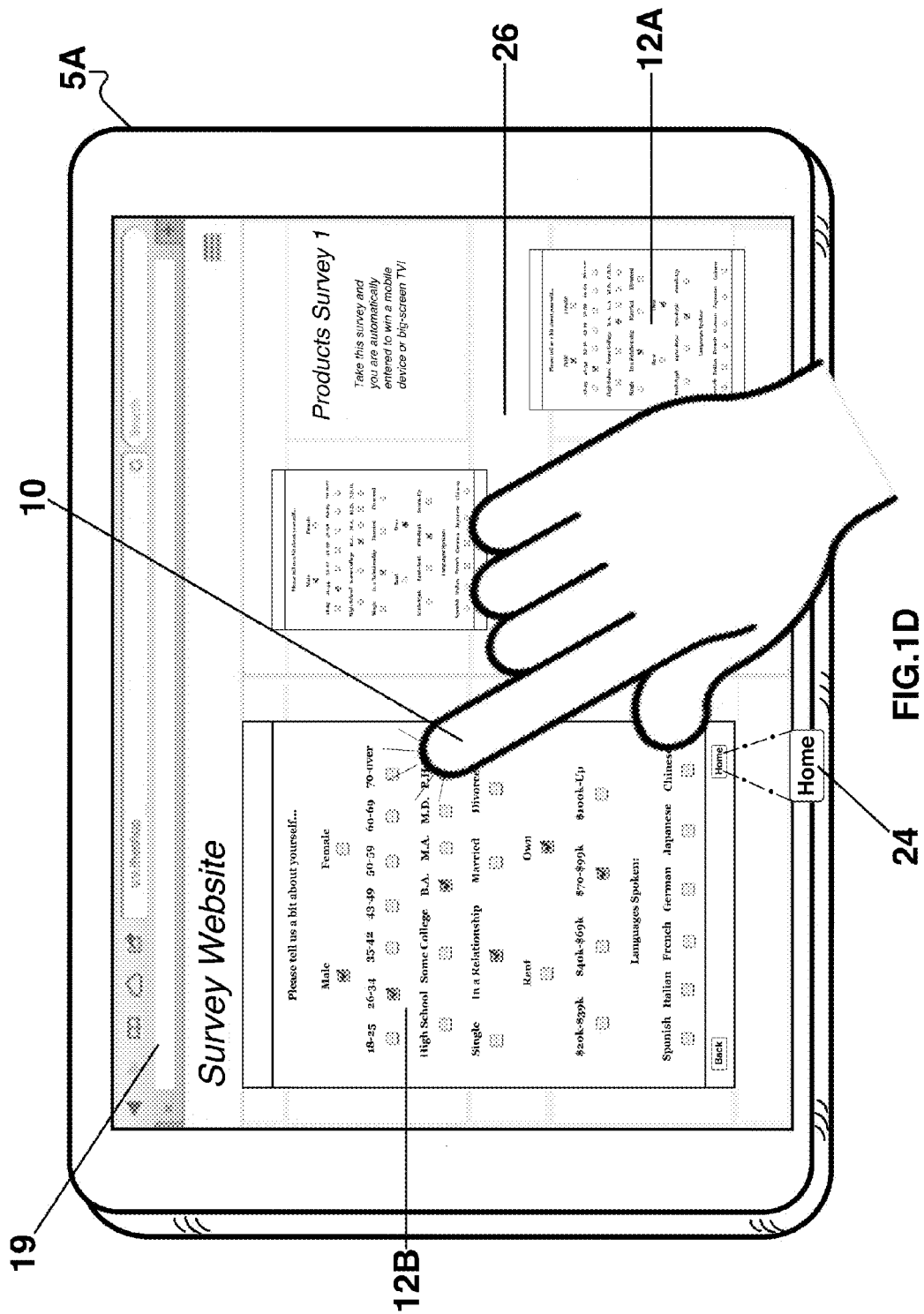

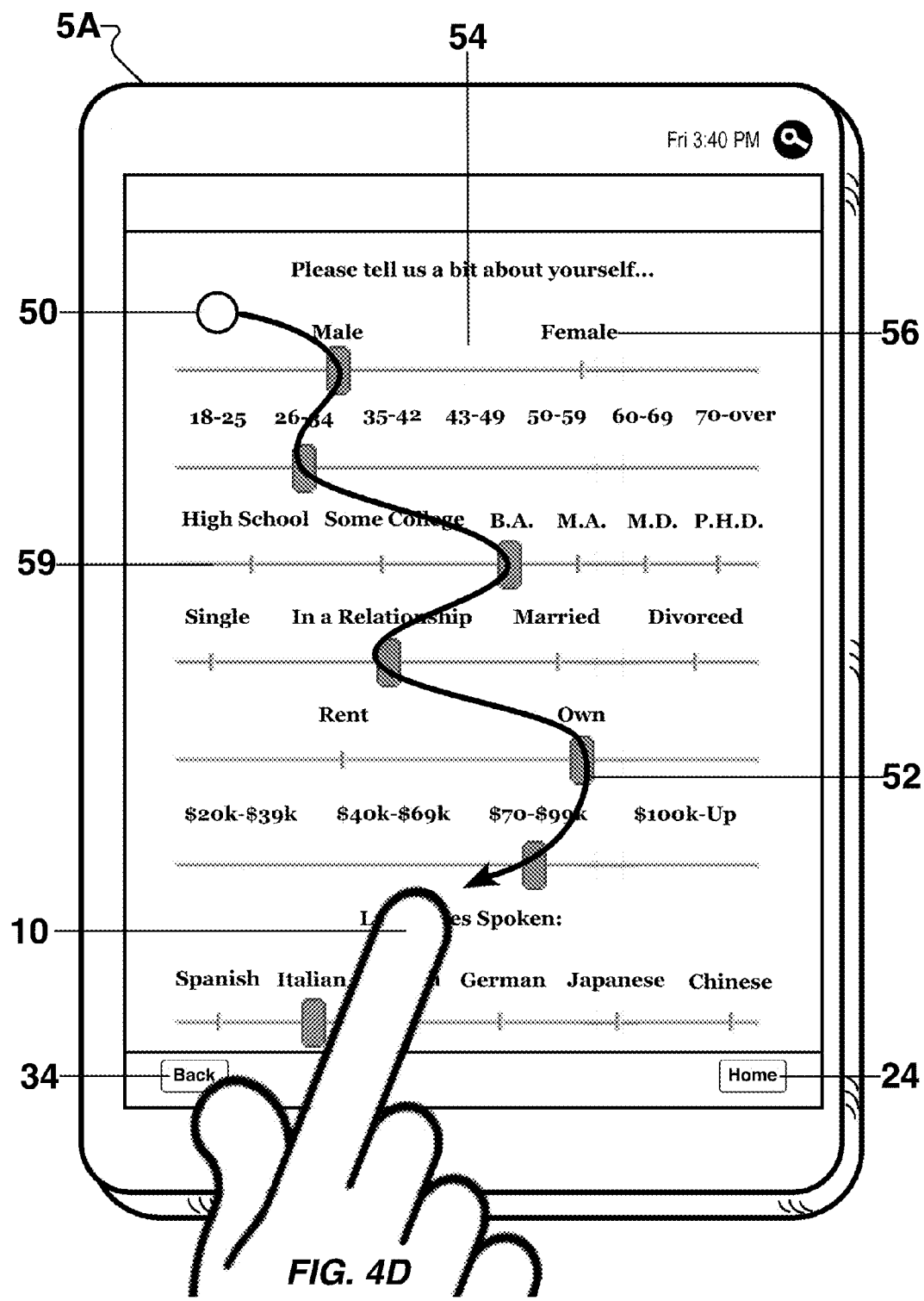

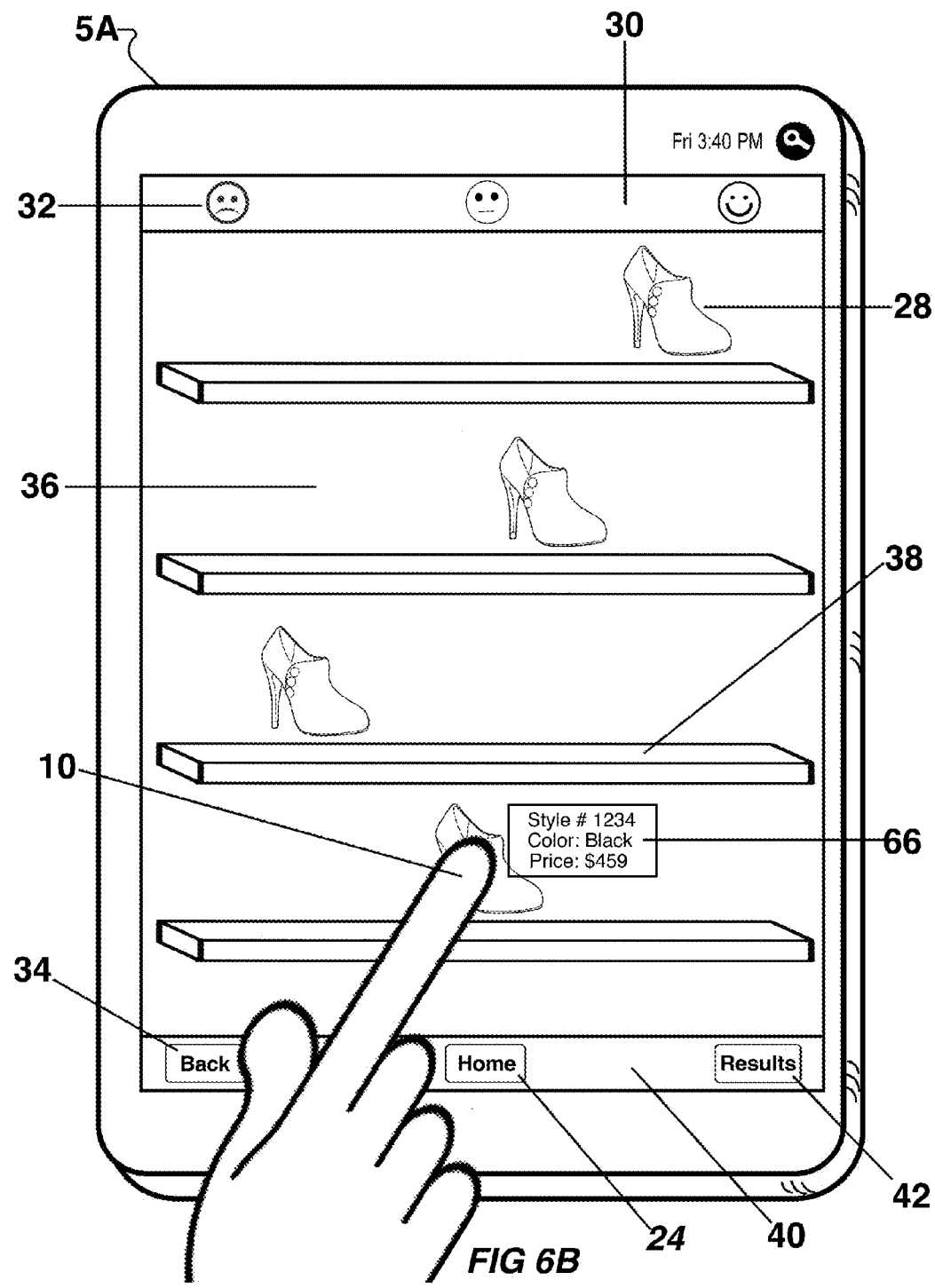

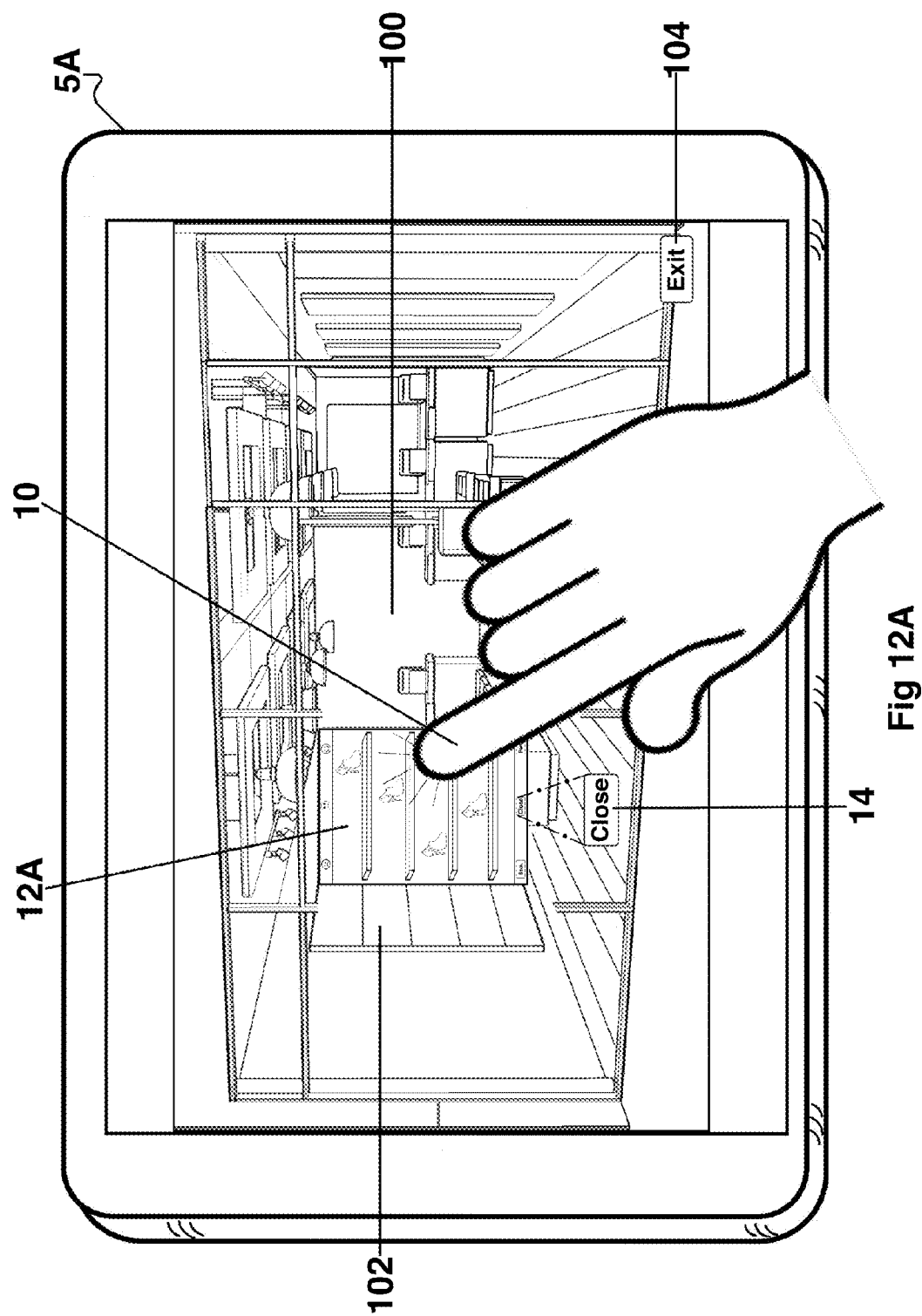

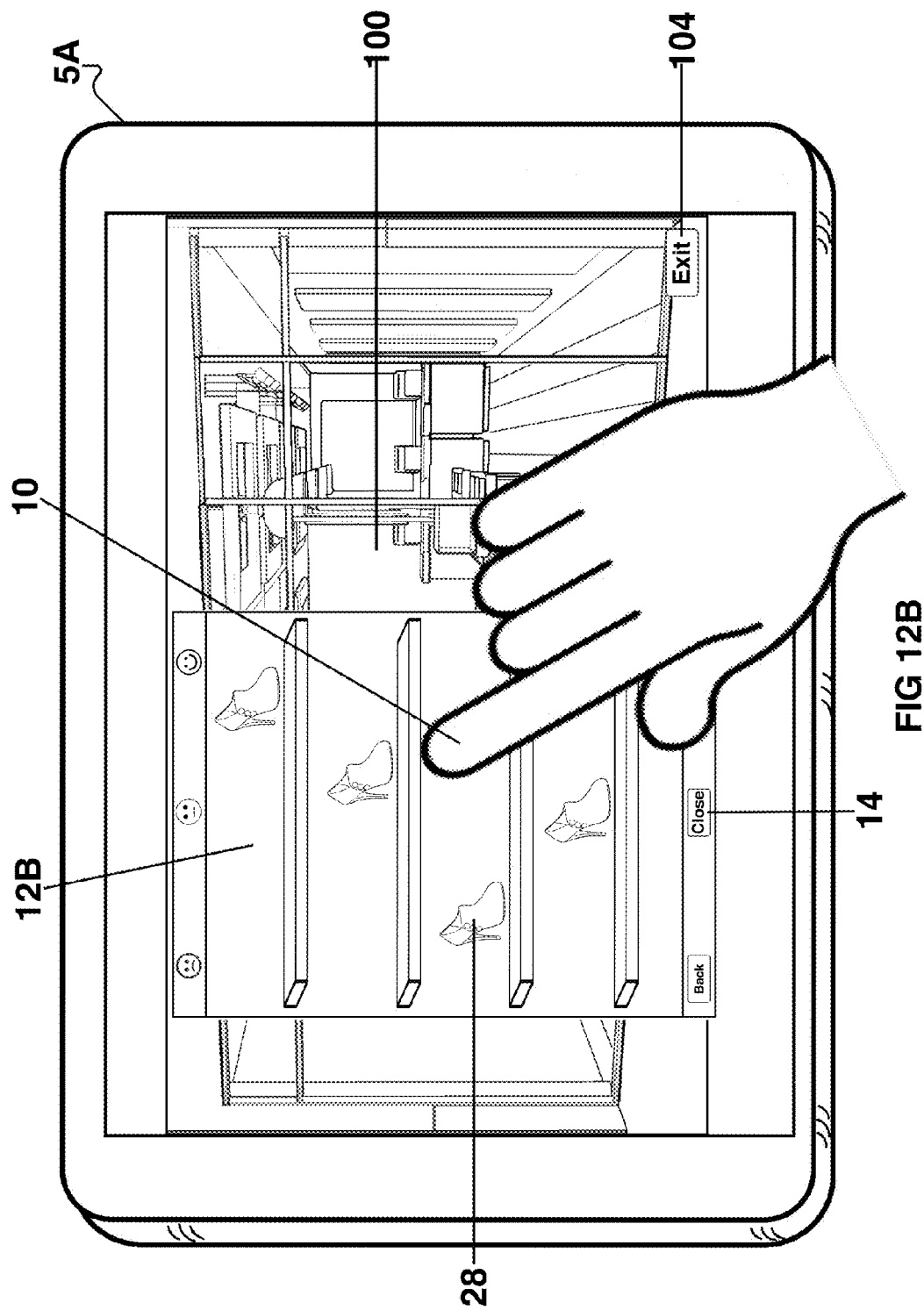

SYSTEM AND METHOD FOR ENHANCED SHOPPING, PREFERENCE, PROFILE AND SURVEY DATA INPUT AND GATHERING

CROSS-REFERENCE TO RELATED APPLICATIONS

This application claims the benefit of provisional patent application Ser. No. U.S. 61/705,518, filed 2012 Sep. 25 by the present inventors, which is incorporated by reference.

FEDERALLY SPONSORED RESEARCH

Non-Applicable.

SEQUENCE LISTING OR PROGRAM

Non-Applicable.

PATENT CITATIONS

U.S. Patents

| Pat. No. | Kind Code | Issue Date | Patentee |
|---|---|---|---|
| U.S. Pat. No. 8,196,066 | B1 | 2012-06-05 | Yu et al. |
| U.S. Pat. No. 8,291,341 | B1 | 2012-10-16 | Tseng et al. |
| U.S. Pat. No. 7,301,529 | B1 | 2007-11-27 | Marvit et al. |
| U.S. Pat. No. 7,542,845 | B2 | 2009-06-02 | Russ et al. |
| U.S. Pat. No. 8,495,683 | B2 | 2013-07-23 | Coppenolle et al. |
| U.S. Pat. No. 8,494,274 | B2 | 2013-07-23 | Badharudeen et al. |
| U.S. Pat. No. 8,510,298 | B2 | 2013-08-13 | Khandelwal |

U.S. Patent Application Publications

| Publication Nr. | Kind Code | Publ. Date | Applicant |
|---|---|---|---|
| US20080036743 | A1 | 2008-02-14 | Westerman et al. |
| US20090153288 | A1 | 2009-06-18 | Bull et al. |
| US20100237991 | A1 | 2010-09-23 | Krishnanand |
| US20130076651 | A1 | 2013-03-28 | Reimann et al. |
| US20120144299 | A1 | 2012-06-07 | Crowe et al. |
| US20130170699 | A1 | 2013-07-04 | Bran et al. |
| US20130106686 | A1 | 2013-05-02 | Bennett |
| US20100185949 | A1 | 210-07-22 | Jaeger |
| US20120249595 | A1 | 2012-10-04 | Feinstein |
| US20120272144 | A1 | 2012-10-25 | Radakovitz et al. |
| EP 2385492 | A1 | 2011-04-05 | Yu-Hsien Li |
| WO2011094281 | A1 | 2011-08-04 | Capela et al. |
| US 20110246329 | A1 | 2011-10-06 | Geisner et al. |

BACKGROUND

In general the present disclosure pertains to methods applied in the field of e-commerce, which is commonly defined as types of industries where the buying and selling of products or services is conducted over electronic systems such as the Internet and other computer networks. E-commerce today is often directly related to Mobile Commerce, which broadly involves the delivering of e-commerce capabilities to consumers accessing those capabilities on mobile electronic devices, like smartphones and mobile tablet computers, via wireless technologies.

An increasing percentage of customer and user e-commerce activities are now conducted on mobile devices, as e-commerce companies and customers seek faster and more convenient ways to access and deliver products and services.

E-commerce companies in various market sectors, including online retail, dating websites, social networking, social shopping, lifestyle and survey websites, among others, attempt to gather data from customers and users in the course of doing business.

E-commerce customers search for products and services and input profile and preferences data daily on desktop, laptop, and mobile computing devices, in the course of engaging with the websites, mobile applications, and other software environments of e-commerce companies in a variety of market sectors.

In order to find what they are looking for, e-commerce customers must often search through a multitude of options and must often enter a lot of information on a website, mobile application, or other software environment to achieve a desired result.

The process of shopping online for a pair of shoes, describing member preferences on a lifestyle portal website, filling out an online survey, or engaging with a social shopping engine often requires a large number of steps: clicks of a mouse, or taps on a touch screen, entry of data into boxes, scrolling through pages, etc.

For the e-commerce customer, going through these processes and finding the options most relevant to them can often be daunting, time consuming, and sometimes ineffective.

For the e-commerce company, gathering specific preference data from customers, generally considered an essential function of e-commerce business, can be time-consuming, expensive, and often ineffective as well.

Advantages

One or more embodiments of the present disclosure provide at least the benefits of enabling the e-commerce customer, or user in various software environments, to describe degrees of preference for a plurality of items, or to enter values for a plurality of fields of data, in a single swipe or gesture. For example in shopping online the user can sort through to the options most relevant to them quickly, and on survey or membership-based services can enter survey or profile data quickly, in an interface that is more responsive to that user, and that supports a greater degree of user engagement than is available with other e-commerce methods.

In some embodiments, software user interface windows that enable methods of the disclosure may be embedded within virtual environments. Such environments may include virtual shopping environments representing retail stores.

At the same time, one or more embodiments of the present disclosure empower e-commerce companies to at least gather rich, detailed preferences data from their customers, including degrees of like or dislike for a plurality of that company's products or services, in much less time than is possible with other preference-data gathering methods.

Various embodiments of the disclosure further provide at least the benefits that both the results described above for the e-commerce customer or user, and for the e-commerce company, are attained simultaneously by the same process of operating a software user interface that employs one or more methods of the embodiments.

One or more aspects of the present disclosure may provide further benefits when applied using emerging user interface hardware technologies like glasses that combine a display and an input means, holographic displays, and gesture recognition systems. These benefits, resulting from synergies between various embodiments of this disclosure and various enhancements in user interface technologies, make data and gesture input faster, easier and more effective.

SUMMARY

Various embodiments of the disclosure enable the user, for example on a website or mobile application, to describe degrees of preference for a plurality of items, products and services, or values for a plurality of fields of data, in a single swipe or gesture. Various methods may be applied at least in part for various e-commerce activities, for example online shopping, virtual shopping, interacting with social networking websites, online dating services, online survey services, and in-store kiosks. Various embodiments may employ software user interface windows in which objects representing products or items or services are positioned by a user relative to a rating scale to indicate degrees of preference for each product or item or service.

BRIEF DESCRIPTION OF DRAWINGS

Figures

FIG. 1B is a drawing illustrating an example of a software user interface accessed on a shopping website through a mobile device in accordance with one or more aspects of the present disclosure.

FIG. 1D shows an example of a software user interface accessed on a Survey website through a mobile device in accordance with one or more aspects of the present disclosure.

FIGS. 4C & 4D are drawings illustrating examples of systems and methods for entering values for a plurality of fields of data in a single swipe or gesture in accordance with one or more aspects of the present disclosure.

FIG. 6B is a drawing illustrating an example of a system and method for displaying of info tags attached to on-screen objects in accordance with one or more aspects of the present disclosure.

FIG. 12A is a drawing illustrating an example of a software user interface embedded in a virtual shopping environment in accordance with one or more aspects of the present disclosure.

FIG. 12B is a drawing illustrating an example of an enlarged software user interface embedded in a virtual shopping environment in accordance with one or more aspects of the present disclosure.

FIGS. 14B & 14C are continuations of the flowchart begun in FIG. 14A.

FIG. 15B is a continuation of the flowchart begun in FIG. 15A.

FIG. 20B is a continuation of the flowchart begun in FIG. 20A.

DRAWINGS

Reference Numerals

FIG. 1A

Figure 1A:
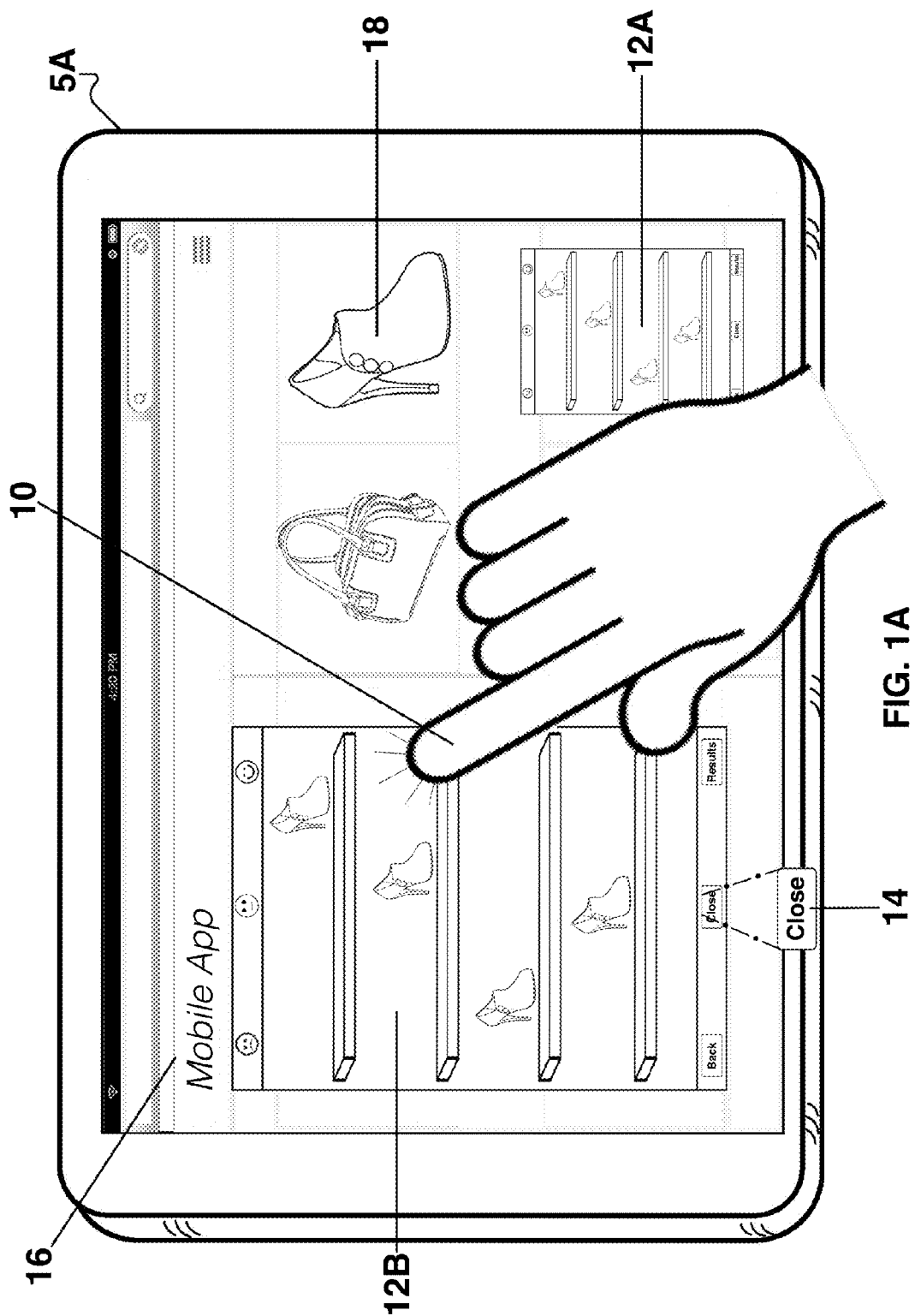
FIG. 1A is a drawing illustrating an example of a mobile device application in accordance with one or more aspects of the present disclosure.

| Computing Device | 5A |
|---|---|
| Finger or other Pointer Means | 10 |
| Software User Interface Window | 12A |
| User Interface Window in Enlarged View | 12B |
| User Interface Close Button | 14 |
| Mobile Application | 16 |
| Photos Representing Products or Items | 18 |

FIG. 1B

| Computing Device | 5A |
|---|---|
| Finger or other Pointer Means | 10 |
| Software User Interface Window | 12A |
| User Interface Window in Enlarged View | 12B |
| User Interface Close Button | 14 |
| Photos Representing Products or Items | 18 |
| Web Browser | 19 |
| Shopping Website | 20 |

FIG. 1C

| Computing Device | 5A |
|---|---|
| Finger or other Pointer Means | 10 |
| Software User Interface Window | 12A |
| User Interface Window in Enlarged View | 12B |
| Home Button | 24 |
| Photos Representing Member Profiles | 17 |
| Web Browser | 19 |
| Dating Website | 22 |

FIG. 1D

| Computing Device | 5A |
|---|---|
| Finger or other Pointer Means | 10 |
| Software User Interface Window | 12A |
| User Interface Window in Enlarged View | 12B |
| Web Browser | 19 |
| Home Button | 24 |
| Survey Website | 26 |

FIG. 2A

| Computing Device | 5A |
|---|---|
| Objects representing products or items | 28 |
| Rating Scale | 30 |
| Emoticons | 32 |
| Back Button | 34 |
| Home Button | 24 |
| Product/Item Display Area | 36 |
| Rows and/or Shelves | 38 |
| Menu Bar | 40 |
| Results Button | 42 |

FIG. 2B

| Computing Device | 5A |
|---|---|
| Member Profiles | 44 |
| Rating Scale | 30 |
| Emoticons | 32 |
| Back Button | 34 |
| Home Button | 24 |
| Product/Item Display Area | 36 |
| Rows and/or Shelves | 38 |
| Menu Bar | 40 |
| Results Button | 42 |

FIG. 3

| Rating Scale | 30 |
|---|---|
| Emoticons | 32 |
| Rating Scale Numbers | 46 |
| Preference Designations | 48 |

FIG. 4A

| Computing Device | 5A |
|---|---|
| Finger or other Pointer Means | 10 |
| Point of initial contact of Pointer | 50 |
| Path of Pointer over screen | 52 |
| Objects representing products or items | 28 |
| Rating Scale | 30 |
| Emoticons | 32 |
| Product/Item Display Area | 36 |
| Rows and/or Shelves | 38 |

FIG. 4B

| | | |
|---|---|---|
| Computing Device | 5A | |
| Finger or other Pointer Means | 10 | |
| Point of initial contact of Pointer | 50 | |
| Path of Pointer over screen | 52 | |
| Objects Representing Member Profiles | 44 | |
| Rating Scale | 30 | |
| Emoticons | 32 | |
| Product/Item Display Area | 36 | |
| Rows and/or Shelves | 38 | |

FIGS. 4C & 4D

| | |
|---|---|
| Computing Device | 5A |
| Survey Form | 54 |
| Finger or other Pointer Means | 10 |
| Point of initial contact of Pointer | 50 |
| Path of Pointer over screen | 52 |
| Data Field Designations | 56 |
| Checkboxes (FIG 4D Sliders 59) | 58 |
| Back Button | 34 |
| Home Button | 24 |

FIG. 5

| | |
|---|---|
| Computing Device | 5A |
| Finger or other Pointer Means | 10 |
| Point of initial contact of Pointer | 50 |
| Path of Pointer over screen | 52 |
| Back Button | 34 |
| Home Button | 24 |
| Menu Bar | 40 |
| Results Button | 42 |
| Member Preferences Input Page | 60 |
| Attribute Icons | 62 |
| Attribute Icons in Selected State | 64 |

FIG. 6A

| | |
|---|---|
| Computing Device | 5A |
| Finger or other Pointer Means | 10 |
| Objects representing products or items | 28 |
| Rating Scale | 30 |
| Emoticons | 32 |
| Back Button | 34 |
| Product/Item Display Area | 36 |
| Rows and/or Shelves | 38 |
| Menu Bar | 40 |

FIG. 6B

| | |
|---|---|
| Computing Device | 5A |
| Finger or other Pointer Means | 10 |
| Objects representing products or items | 28 |
| Rating Scale | 30 |
| Emoticons | 32 |
| Back Button | 34 |
| Home Button | 24 |
| Product/Item Display Area | 36 |
| Rows and/or Shelves | 38 |
| Menu Bar | 40 |
| Results Button | 42 |
| Product/Item Info Tag | 66 |

FIGS. 7A & 7B

| | |
|---|---|
| Computing Device | 5A |
| Finger or other Pointer Means | 10 |
| Objects representing products or items | 28 |
| Rating Scale | 30 |
| Emoticons | 32 |
| Back Button | 34 |
| Product/Item Display Area | 36 |
| Rows and/or Shelves | 38 |
| Menu Bar | 40 |

FIGS. 8A & 8B

| | |
|---|---|
| Computing Device | 5A |
| Objects representing products or items | 28 |
| Rating Scale | 30 |
| Emoticons | 32 |
| Back Button | 34 |
| Product/Item Display Area | 36 |
| Rows and/or Shelves | 38 |
| Menu Bar | 40 |
| Results Button | 42 |
| Two Fingers Together | 68 |

FIG. 9A

| | |
|---|---|
| Computing Device | 5A |
| Rating Scale | 30 |
| Emoticons | 32 |
| Back Button | 34 |
| Home Button | 24 |
| Menu Bar | 40 |
| Results Button | 42 |
| Product Enlarged View Page | 70 |
| Product in Larger View | 72 |
| Info Button | 74 |
| Buy Button | 76 |

FIG. 9B

| | |
|---|---|
| Computing Device | 5A |
| Rating Scale | 30 |
| Emoticons | 32 |
| Back Button | 34 |
| Home Button | 24 |
| Menu Bar | 40 |
| Results Button | 42 |
| Profile Enlarged View Page | 78 |
| Profile Photo in Larger View | 80 |
| Profile Button | 82 |
| Contact Button | 84 |

FIG. 10

| | |
|---|---|
| Computing Device | 5A |
| Finger or other Pointer Means | 10 |
| Point of initial contact of Pointer | 50 |
| Path of Pointer over screen | 52 |
| Rating Scale | 30 |
| Emoticons | 32 |
| Back Button | 34 |
| Home Button | 24 |
| Menu Bar | 40 |
| Product Enlarged View Page | 70 |

-continued

| | |
|---|---|
| Product in Larger View | 72 |
| Info Button | 74 |
| Buy Button | 76 |

FIG. 11A

| | |
|---|---|
| Computing Device | 5A |
| Rating Scale | 30 |
| Emoticons | 32 |
| Back Button | 34 |
| Home Button | 24 |
| Menu Bar | 40 |
| Results Button | 42 |
| Buy Button | 76 |
| Product Search Results Page | 86 |
| Item List with Ratings | 88 |
| Item Icons | 90 |

FIG. 11B

| | |
|---|---|
| Computing Device | 5A |
| Rating Scale | 30 |
| Emoticons | 32 |
| Back Button | 34 |
| Home Button | 24 |
| Menu Bar | 40 |
| Results Button | 42 |
| Contact Button | 92 |
| Profile Search Results Page | 94 |
| Profile List with Ratings | 96 |
| Profile Icons | 98 |

FIG. 12A

| | |
|---|---|
| Computing Device | 5A |
| Finger or other Pointer Means | 10 |
| Virtual Shopping Environment | 100 |
| Virtual Display Area | 102 |
| Software User Interface Window | 12A |
| User Interface Close Button | 14 |
| Virtual Environment Exit Button | 104 |

FIG. 12B

| | |
|---|---|
| Computing Device | 5A |
| Finger or other Pointer Means | 10 |
| Virtual Shopping Environment | 100 |
| User Interface Window in Enlarged View | 12B |
| User Interface Close Button | 14 |
| Objects representing products or items | 28 |
| Virtual Environment Exit Button | 104 |

FIG. 12C

| | |
|---|---|
| Computing Device | 5A |
| Finger or other Pointer Means | 10 |
| Virtual Shopping Environment | 100 |
| Virtual Display Area | 102 |
| User Interface Tool | 12A |
| Virtual Environment Exit Button | 104 |

FIG. 12D

| | |
|---|---|
| Computing Device | 5A |
| Virtual Shopping Environment | 100 |
| User Interface Tool | 12A |
| Virtual Tour Exit Button | 104 |
| Two Fingers Together | 68 |

FIG. 13

| | |
|---|---|
| Computing Device (Mobile) | 5A |
| Computing Device (Desktop) | 5B |
| Internet/Computer Network | 106 |
| Ecommerce Website Servers | 108 |
| Products Information Database | 110 |
| Preferences Collection Servers | 112 |
| Preferences Database | 114 |

FIG. 14A

| | |
|---|---|
| Steps | 116-124 |
| Product Information Database | 110 |
| Steps | 126-130 |

FIG. 14B

| | |
|---|---|
| Step | 132 |
| Preferences Information Database | 114 |
| Steps | 134-142 |

Figure 14A:
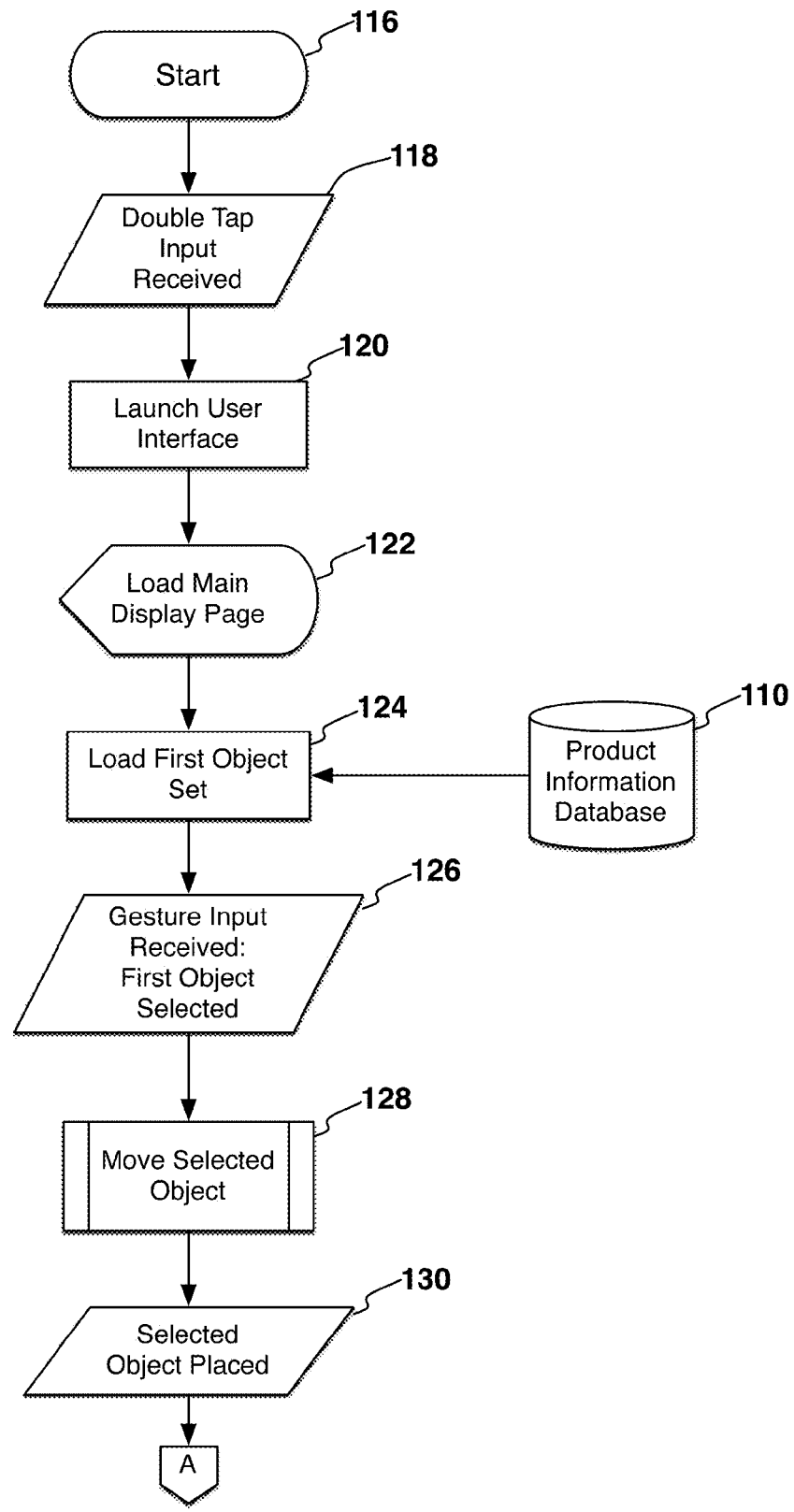
FIGS. 14A, 14B & 14C are flowcharts indicating examples of software process steps for operations of an example software user interface in accordance with one or more aspects of the present disclosure.
Figure 14B:
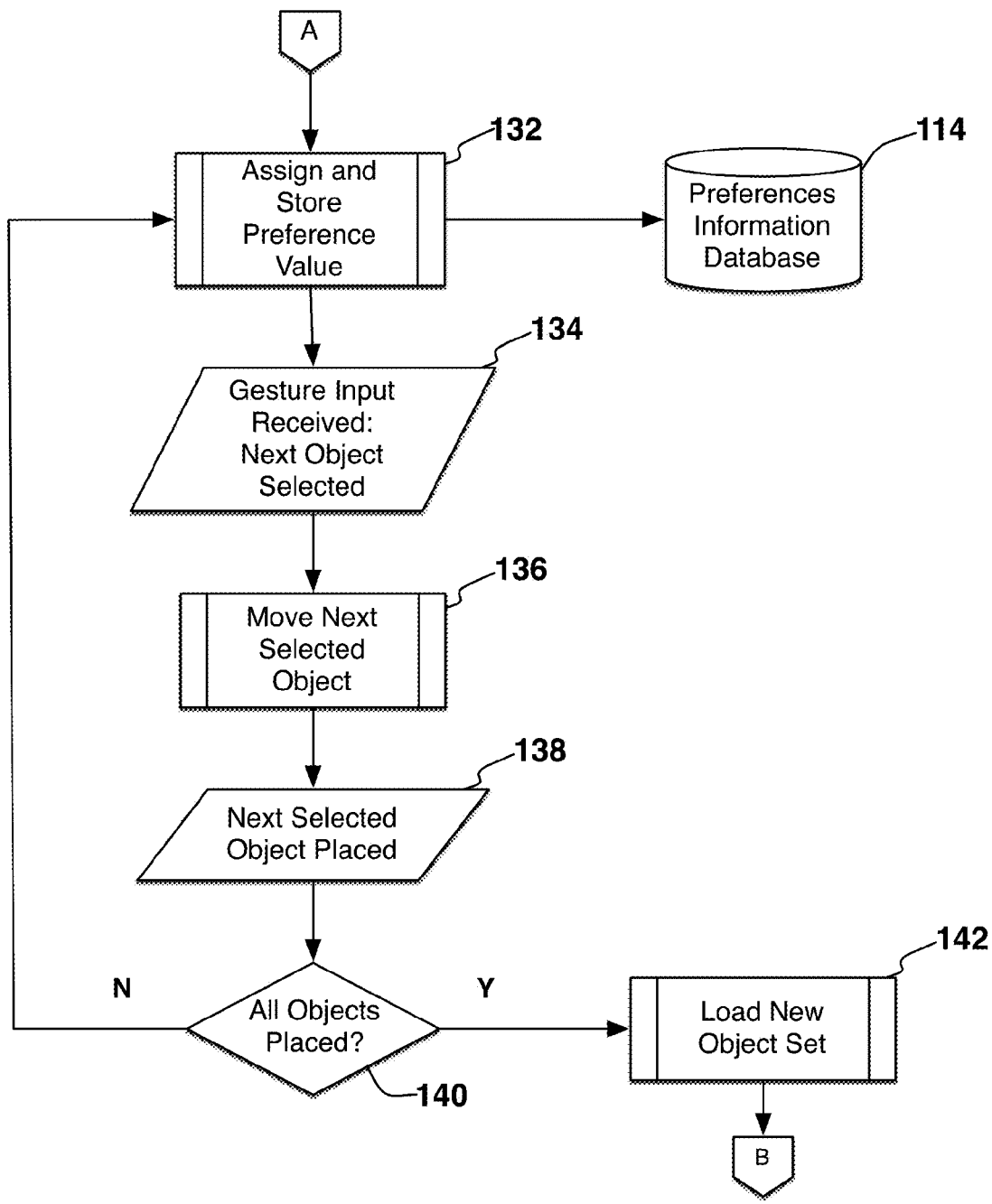
Figure 14C:
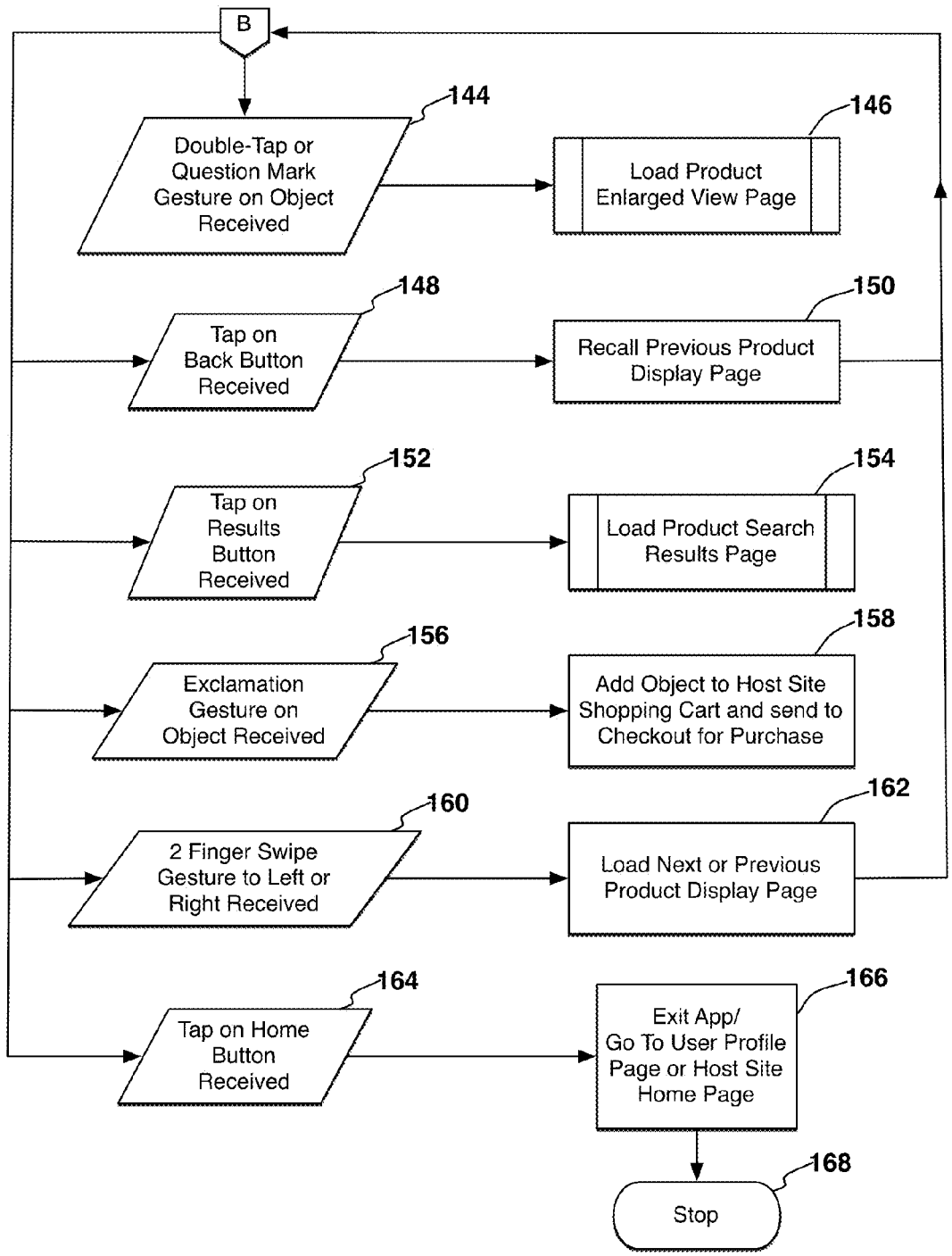
Figure 15A:
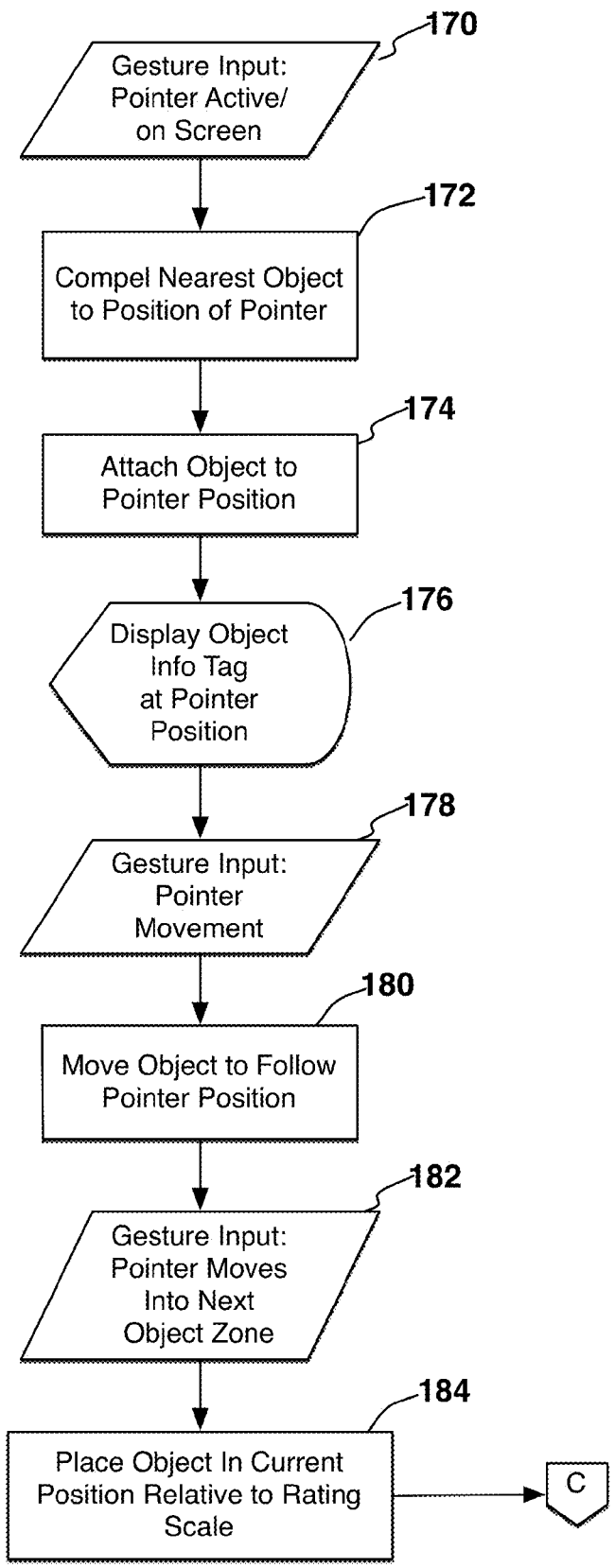
FIGS. 15A & 15B are flowcharts indicating examples of software process steps for object placement operations of an example software user interface in accordance with one or more aspects of the present disclosure.
Figure 15B:
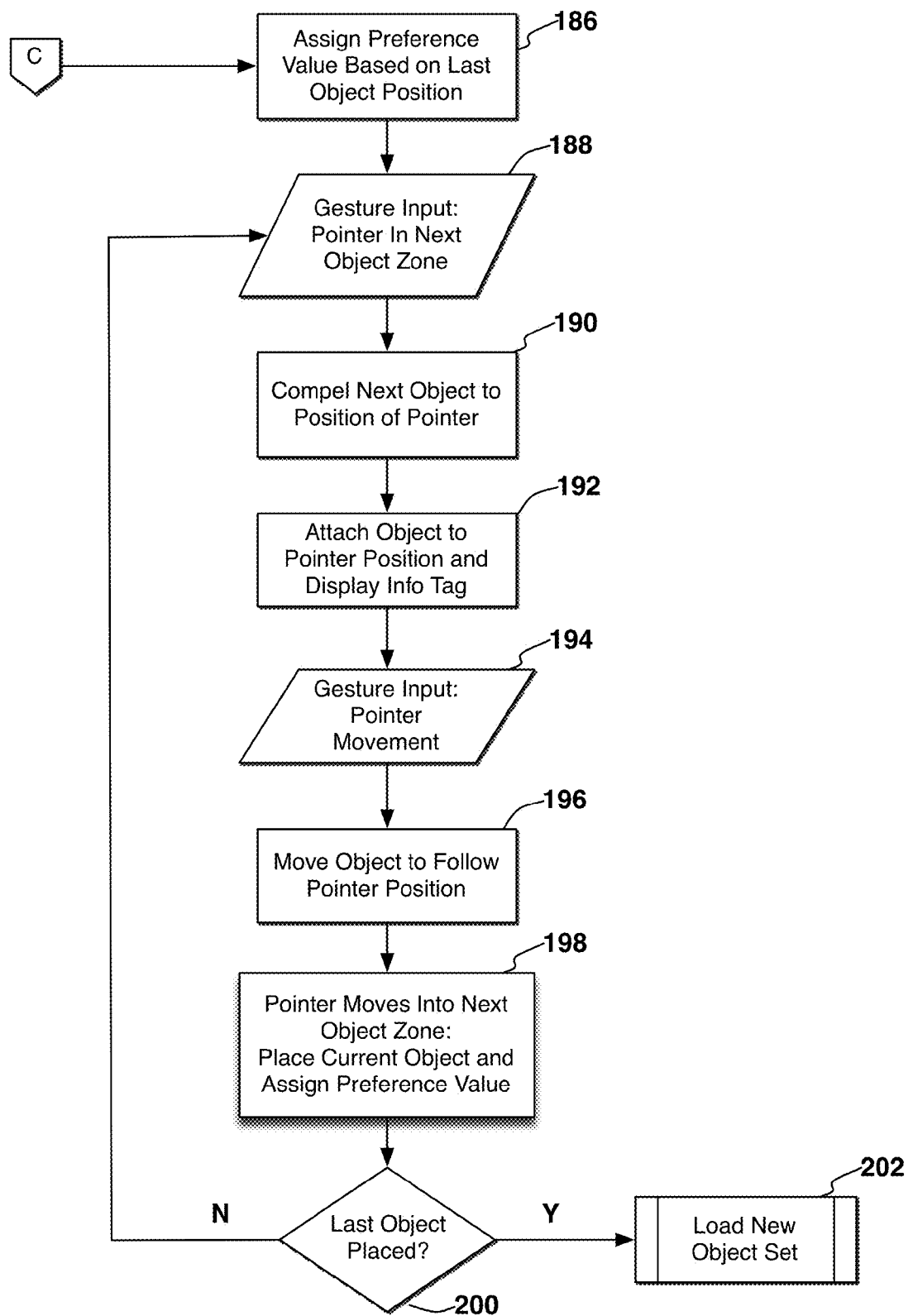
Figure 16:
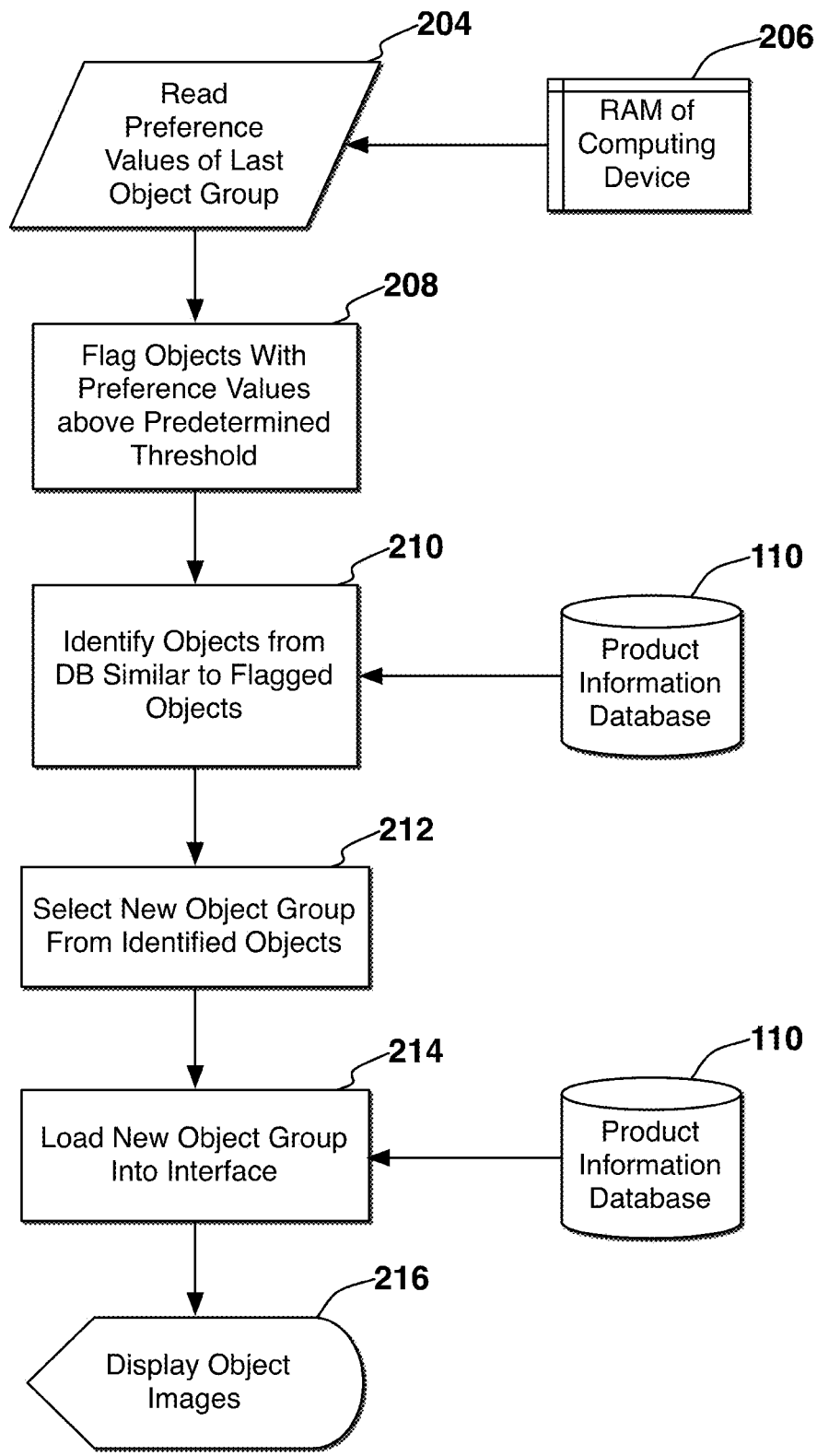
FIG. 16 is a flowchart indicating an example of a software process subroutine for selecting objects in an example software user interface in accordance with one or more aspects of the present disclosure.

FIG. 14C
    Steps 144-168
FIG. 15A
    Steps 170-184
FIG. 15B
    Steps 186-202
FIG. 16

| | |
|---|---|
| Step | 204 |
| RAM of Computing Device | 206 |
| Steps | 208-210 |
| Product Information Database | 110 |
| Steps | 212-216 |

FIG. 17

| | |
|---|---|
| Steps | 218-222 |
| RAM of Computing Device | 206 |
| Preferences Information Database | 114 |

FIG. 18

| | |
|---|---|
| Steps | 224-240 |
| Product Information Database | 110 |

FIG. 19

| | |
|---|---|
| Steps | 242-260 |
| Preferences Information Database | 114 |

FIG. 20A

| Steps | 262-276 |
|---|---|

FIG. 20B

| Steps | 278-290 |
|---|---|
| Preferences Information Database | 114 |

FIG. 20C

| Steps | 292-302 |
|---|---|
| Preferences Information Database | 114 |

FIG. 20D

| Steps | 304-316 |
|---|---|
| Attribute Icons Database | 306 |
| Preferences Information Database | 114 |

FIG. 21

| Steps | 318-348 |
|---|---|
| Virtual Environment Database | 322 |
| User Interface Database | 326 |

FIG. 22

| Processor | 350 |
|---|---|
| Storage Device | 352 |
| Network Interface | 354 |
| Power Source | 356 |
| Operating System | 358 |
| Touch-Sensitive Screen or other Display | 360 |
| Gesture Recognition Detector | 362 |
| Memory | 364 |

DETAILED DESCRIPTION

In general this disclosure describes techniques for enhanced user interaction with electronic commerce entities, which may include internet-based retail shopping websites, internet-based social networks, social shopping engines, dating services, and survey services, among other e-commerce uses. The method of the disclosure may also be applied to uses on in-store kiosks and other in-store displays controlled by computing devices in so called brick-and-mortar locations, among other uses.

In accordance with some embodiments, methods and processes are used for input by a human operator of degrees of preference for a plurality of products, items or services in a single swipe or gesture, and for input by a human operator of values for multiple fields of member profile, survey or other types of data in a single swipe or gesture. Various methods may use at least a software user interface application operated on a variety of mobile computing devices having at least a memory and a touch screen, a variety of desktop and laptop computing devices having at least a memory, a display, a keyboard, and a mouse or a touchpad, and a variety of other types of computing devices, having other means of memory, display and data input.

We presently contemplate the computing device referred to in the various embodiments in the following detailed description to be a mobile tablet computer with a touch screen, such as an iPad or its equivalent. We presently contemplate the software user interface application referred to in the various embodiments in the following detailed description to be a software application for said computing device, such as an iPad App or its equivalent. However, the system and method of the disclosure and the various embodiments may be applied using other forms of computing devices and other forms of software applications as well.

We presently contemplate the pointer means referred to in the various embodiments in the following detailed description to be a finger or fingers of the human operator performing gestures on the touch screen of a mobile tablet computer, such as an iPad or its equivalent. However, the pointer means referred to may, in accordance with various embodiments, take a variety of other forms as well, including a pointer tool in a software application controlled by a human operator using a mouse or a touchpad, glasses that track eye movements, gesture recognition systems, or other computing device interfaces, input devices or methods.

We presently contemplate the interface of the computing device referred to in the various embodiments to be the touch screen of a mobile tablet computer, such as an iPad or its equivalent. However, the interface of the computing device referred to may, in accordance with various embodiments, take a variety of other forms as well, including a mouse or touchpad of a desktop or laptop computer, or emerging user interface hardware technologies, like glasses that combine a display and an input means, input through eye movements, holographic displays, gesture recognition systems, or other computing device interfaces, input devices or methods.

Various Embodiments

Structure—FIGS. 1A, 1B, 1C and 1D

The example of FIG. 1A shows a computing device 5A having at least a processor, a memory, a display, and an interface, in this case a touch screen. The computing device 5A runs a mobile application 16, containing a software user interface window 12A, a user interface window in enlarged view 12B, and photos representing products or items 18. The user interface window in enlarged view 12B contains a close button 14; the mobile application 16 and user interface windows 12A/12B are operated in this example using a finger or other pointer means 10.

The example of FIG. 1B shows the computing device 5A having at least a processor, a memory, a display, and an interface, in this case a touch screen, running a web browser 19 displaying a shopping website 20, with embedded software user interface window 12A, user interface window in enlarged view 12B, and photos representing products or items 18. The user interface window in enlarged view 12B contains the close button 14, the shopping website 20 and user interface windows 12A/12B are operated in this example using the finger or other pointer means 10.

Figure 1C:
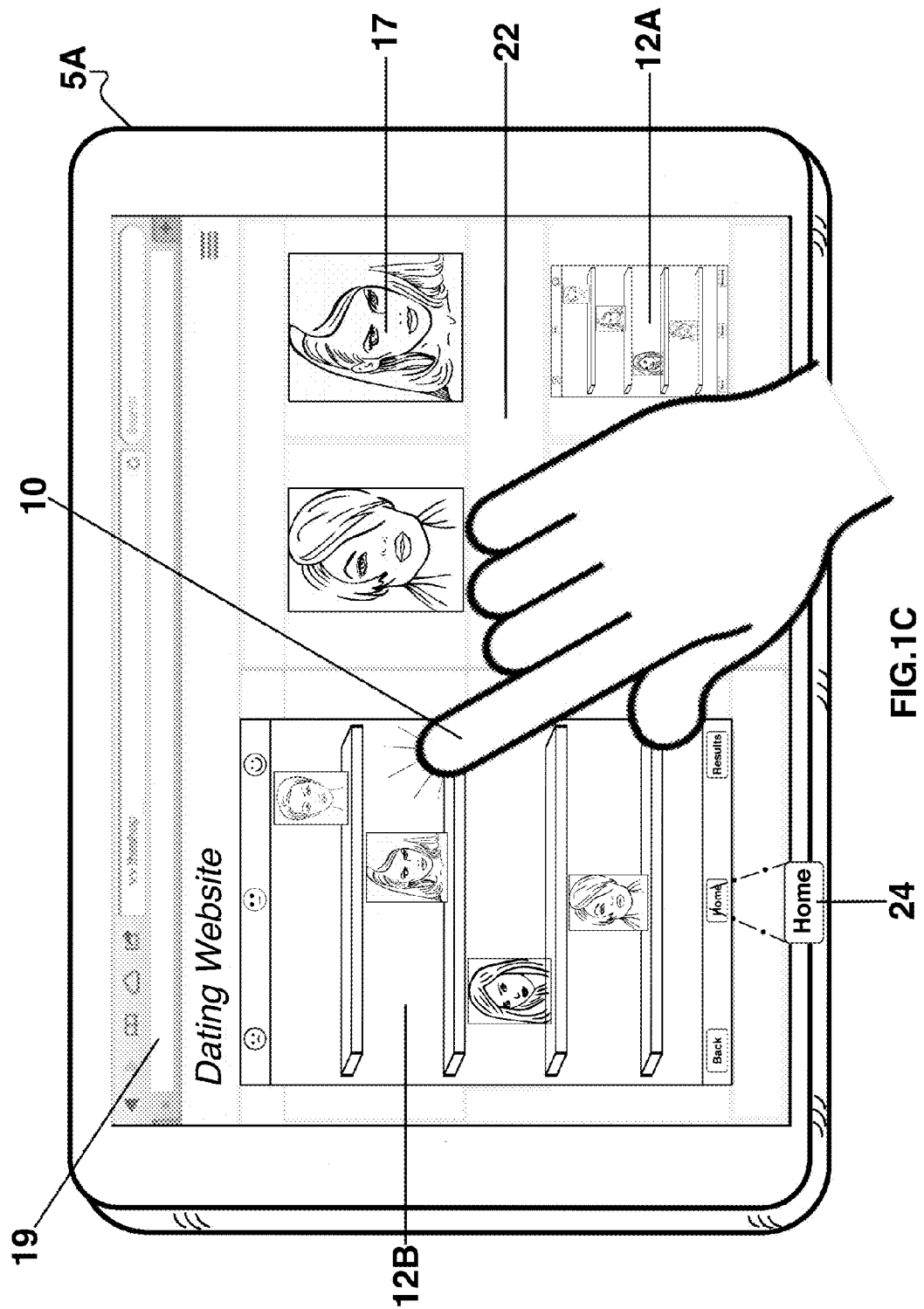
FIG. 1C shows an example of a software user interface accessed on a dating website through a mobile device in accordance with one or more aspects of the present disclosure.

The example of FIG. 1C shows the computing device 5A running the web browser 19 displaying a dating website 22, with the embedded software user interface window 12A, the user interface window in enlarged view 12B, and photos representing member profiles 17. The user interface window in enlarged view 12B contains a home button 24. The dating website 22 and user interface windows 12A/12B are operated in this example using the finger or other pointer means 10.

The example of FIG. 1D shows the computing device 5A running the web browser 19 displaying a survey website 26, with the embedded software user interface window 12A, and the user interface window in enlarged view 12B. The user interface window in enlarged view 12B contain the home button 24, the survey website 26 and user interface windows 12A/12B are operated in this example using the finger or other pointer means 10.

Various Embodiments

Operation—FIGS. 1A, 1B, 1C and 1D

In accordance with various embodiments of the disclosure, the human operator may initiate methods of the disclosure in various ways. The following embodiments include examples of methods applied to mobile applications, shopping websites, dating websites, and survey websites.

In the example of FIG. 1A, in the mobile application 16, the human operator may perform a double tap gesture on the touch screen of the computing device 5A, with the finger or other pointer means 10, in the area of the software user interface window 12A to enlarge it so it becomes the user interface window in enlarged view 12B. The human operator (user) may perform a double tap gesture on the touch screen of the computing device 5A, with the finger or other pointer means 10, in the area of one of the photos representing products or items 18, to open the user interface window in enlarged view 12B displaying a set of objects similar to the product or item depicted in the photo representing products or items 18. The user may touch the close button 14 to close the user interface window in enlarged view 12B.

In the example of FIG. 1B, the user may apply operations similar to those described above for FIG. 1A, in this example in the web browser 19 displaying the shopping website 20.

In the example of FIG. 1C, the user may apply operations similar to those described above for FIG. 1A, in this example in the web browser 19 displaying the dating website 22. In the example of FIG. 1C the user may perform a double tap gesture on the touch screen of the computing device 5A, with the finger or other pointer means 10, in the area of one of the photos representing member profiles 17, to open the user interface window in enlarged view 12B displaying a set of profiles similar to the member profile depicted in the photo representing member profiles 17.

In the example of FIG. 1D, the user may apply operations similar to those described above for FIG. 1A, in this example in the web browser 19 displaying the survey website 26. In the example of FIG. 1D the user interface window in enlarged view 12B contains the home button 24, which in some embodiments the user may touch to exit the user interface window in enlarged view 12B and return to the home page of the survey website 26.

Embodiment One

Figure 2A:
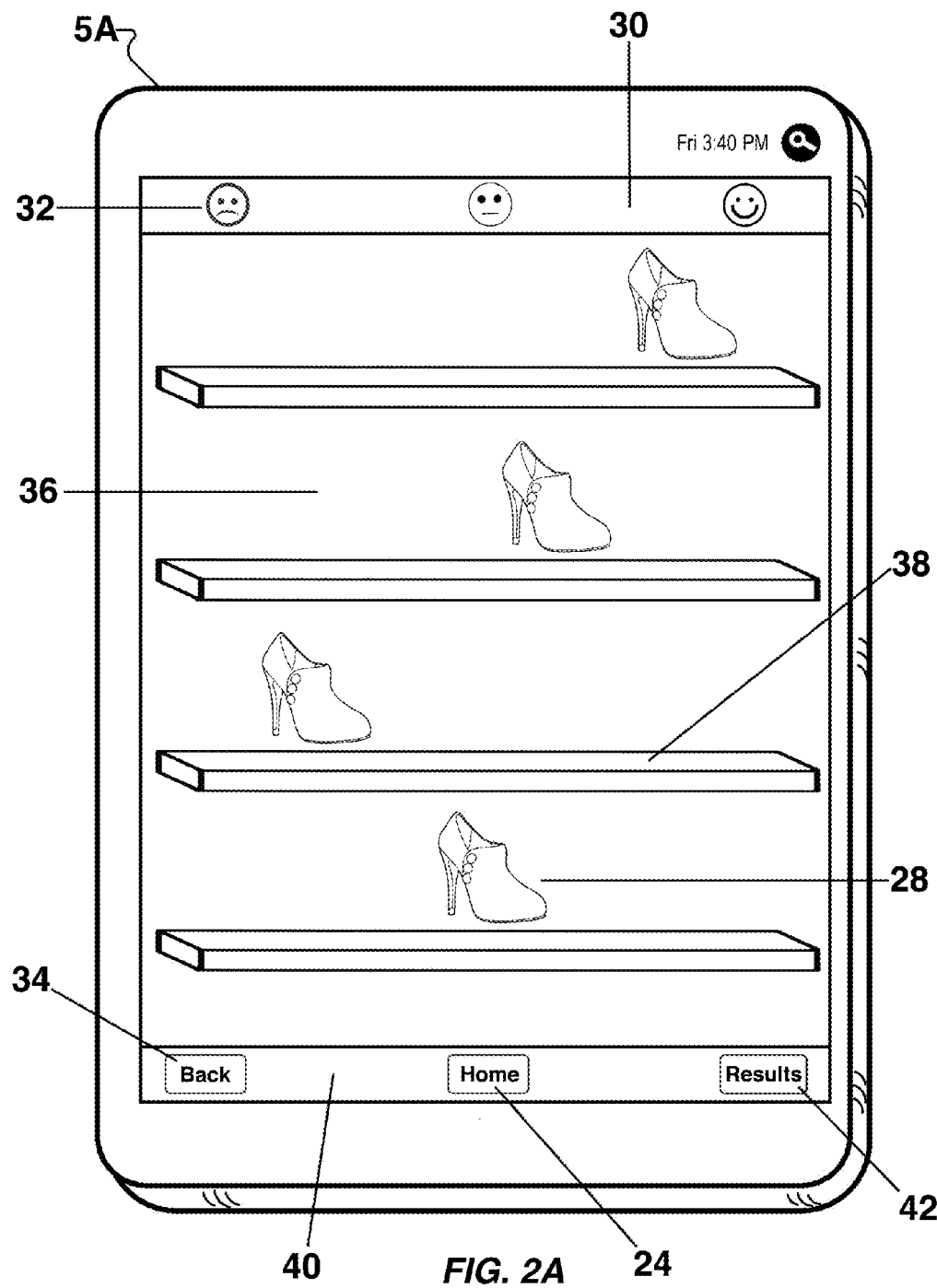
FIG. 2A is a drawing illustrating an example of a software user interface application with products in accordance with one or more aspects of the present disclosure.
Figure 3:
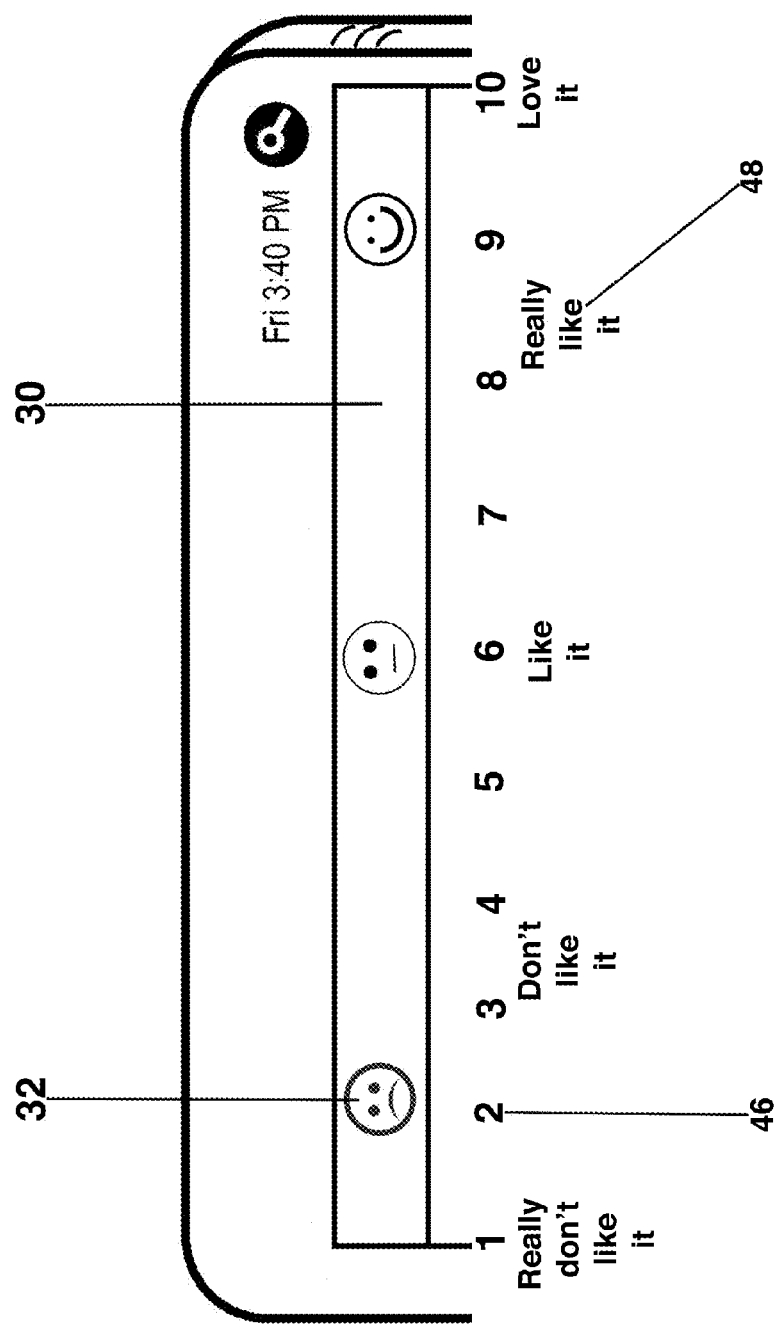
FIG. 3 is a drawing illustrating an example of a rating scale for a software user interface application in accordance with one or more aspects of the disclosure.
Figure 9A:
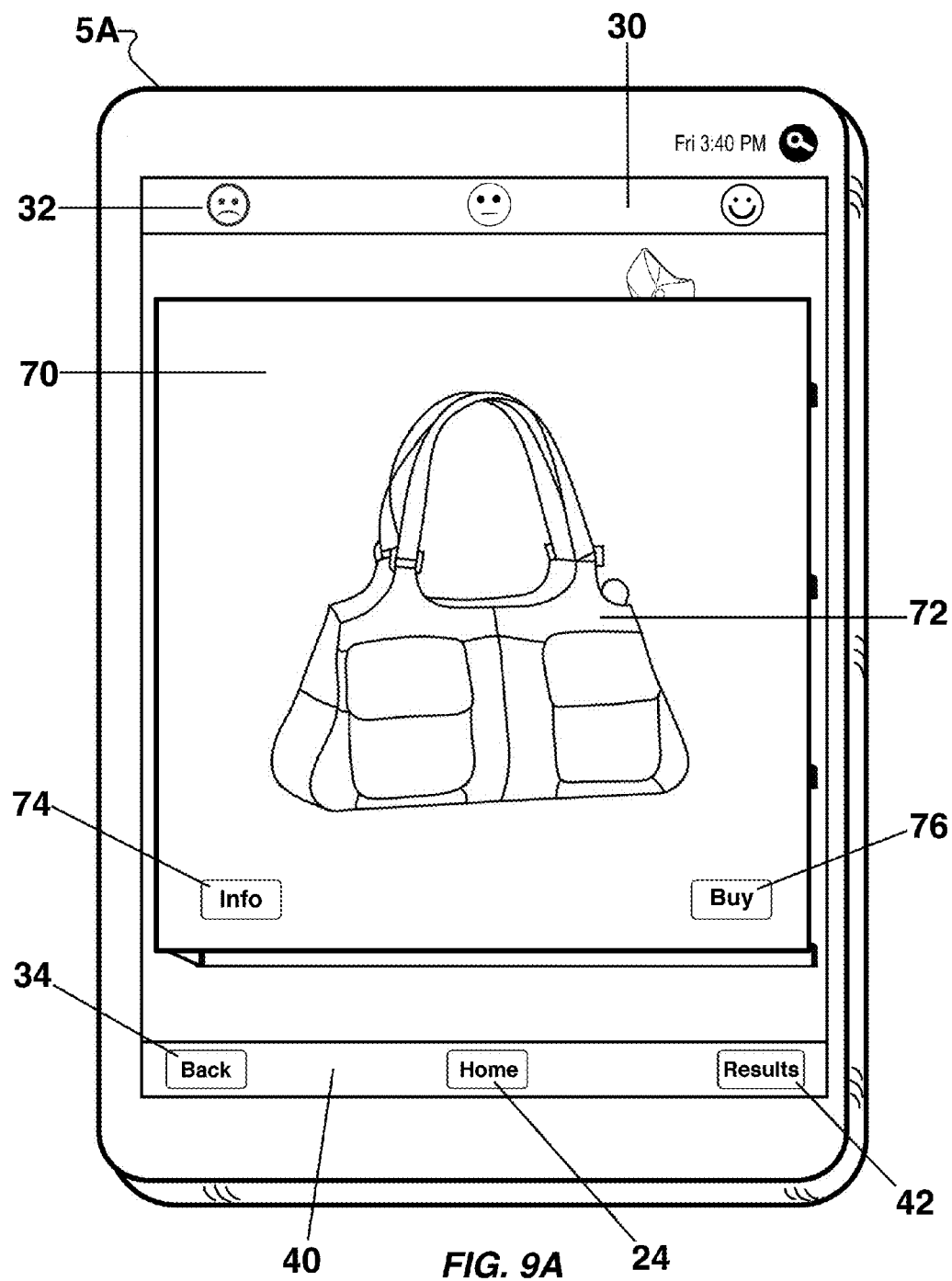
FIG. 9A is a drawing illustrating an example of a product in larger view page of a software user interface in accordance with one or more aspects of the present disclosure.

User Interface—Structure FIGS. 2A, 3 and 9A

In accordance with embodiment one of the disclosure, FIG. 2A shows the computing device 5A having at least a processor, a memory, a display, and an interface, in this case a touch screen, running a software user interface application with a product/item display area 36, containing horizontal rows and/or shelves 38, which contain graphical objects representing products or items 28. A rating scale 30, in this case a row of emoticons 32, is situated above the product/item display area 36, parallel to the rows and/or shelves 38. In this example a menu Bar 40, containing a back button 34, a home button 24, and a results button 42, is situated below the product/item display area 36, also parallel to the rows and/or shelves 38.

FIG. 3 shows rating scale numbers 46, and preference designations 48, indicating degrees of like and dislike, in approximate positions on the example rating scale 30, in this case a row of emoticons 32, as employed in the software user interface application described in various embodiments of the disclosure.

FIG. 9A shows the computing device 5A having at least a processor, a memory, a display, and an interface, in this case a touch screen, running a software user interface application with a product enlarged view page 70, containing a product in larger view 72. In this example an info button 74, and a buy button 76, are situated below the product in larger view 72, in the product enlarged view page 70. The other parts indicated in FIG. 9A are the same as described above for FIG. 2A.

Embodiment One

Figure 4A:
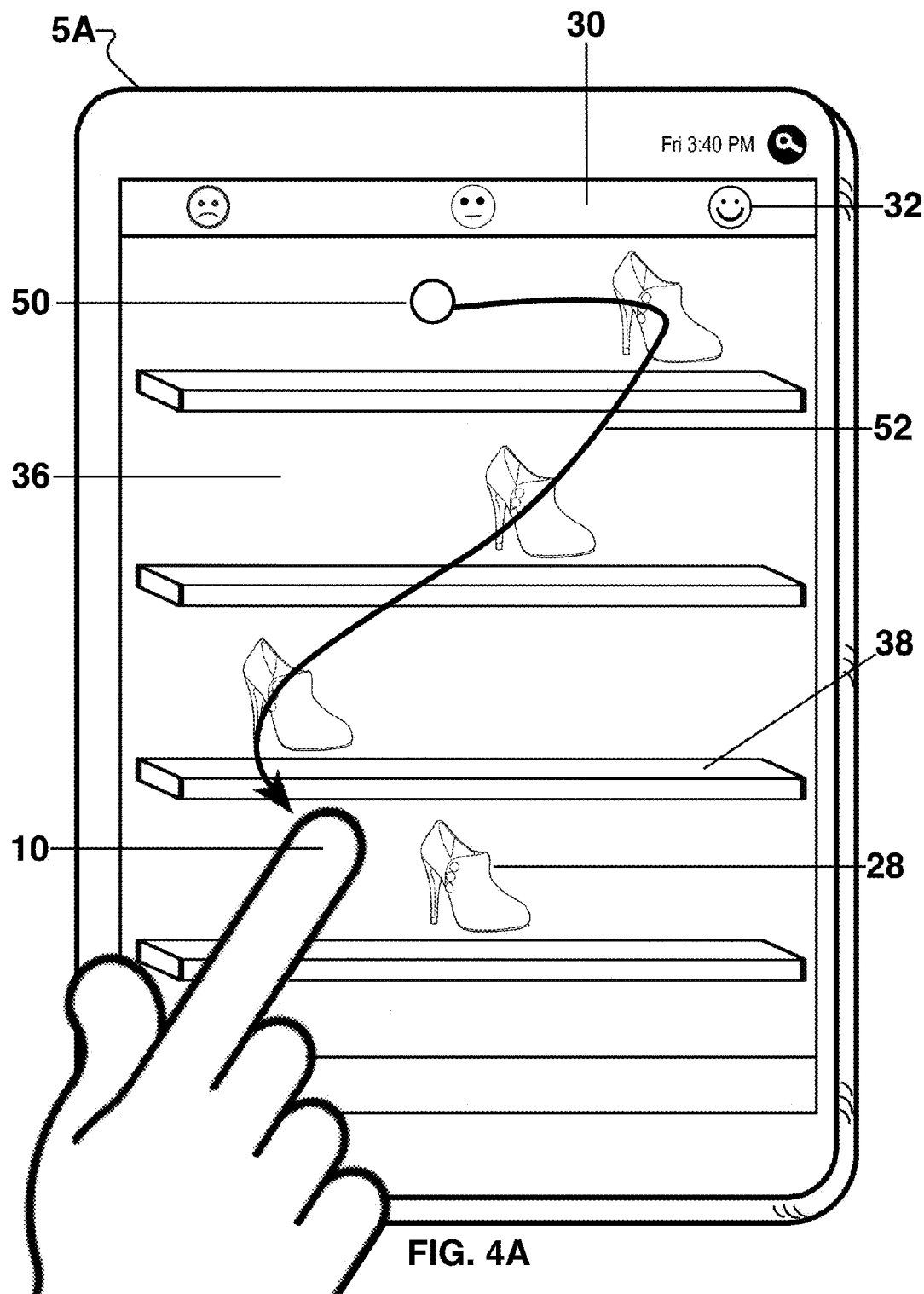
FIG. 4A is a drawing illustrating an example of a system and method for describing degrees of preference for a plurality of items in a single swipe or gesture in accordance with one or more aspects of the present disclosure.

User Interface—Operation FIGS. 2A, 3, 4A, 6A, 6B, 7A, 7B, 8A, 8B, 9A, 10 and 11A In embodiment one, for example as depicted in FIG. 4A, the human operator (user) indicates degrees of preference for a plurality of products, items or services, represented by the graphical objects representing products or items 28, on the touch screen of the computing device 5A, by at least initiating contact with the touch screen with the finger or other pointer means 10, and passing the finger or other pointer means 10 over the touch screen in a single swipe or gesture.

In the example shown in FIG. 4A, the user touches the touch screen of the computing device 5A, with the finger or other pointer means 10, at a point of initial contact of pointer 50, within the product/item display area 36. The user moves the objects representing products or items 28 to the left or right along the rows and/or shelves 38, placing objects representing products or items 28 at positions relative to the rating scale 30, to indicate degrees of like or dislike for products or items 28, represented by the row of emoticons 32 on the rating scale 30.

In various embodiments, values on the rating scale 30 (FIG. 3) register from left to right, such that the position furthest to the left indicates the lowest degree of like, and the position furthest to the right indicates the highest degree of like. In various embodiments, the user interface software application will assign a floating point numeric value, expressing the rating scale numbers 46 and preference designations 48 (FIG. 3), to each product or item 28 (FIG. 4A), as determined by the position on the rating scale 30 in which each product or item 28 (FIG. 4A) has been placed.

In the example depicted in FIG. 4A, when the user has placed the current object representing products or items 28 in the desired position, and the finger or other pointer means 10 moves down the product/item display area 36 into the next of the rows and/or shelves 38, the next object representing products or items 28 is selected and moved to the left or right to the desired position. In this manner the user continues selecting and placing objects representing products or items 28, tracing for example the path of pointer over screen 52, in a single swipe or gesture, until the last object at the bottom of the product/item display area 36 has been placed.

When the last of the objects representing products or items 28 (FIG. 4A) has been placed, and the finger or other pointer means 10 moves below the bottom-most of the rows and/or shelves 38 in the product/item display area 36, the software user interface automatically scrolls to display a new page containing a new set of objects representing products or items 28.

The software user interface application adjusts the selection of products or items 28 (FIG. 4A) included on each successive page view in the product/item display area 36, to consist of more products or items similar to those the user has indicated they like, and to exclude products or items similar to those the user has indicated they do not like. In this manner the user is able to search products or items in order to quickly find those for which they have a high degree of preference.

Figure 6A:
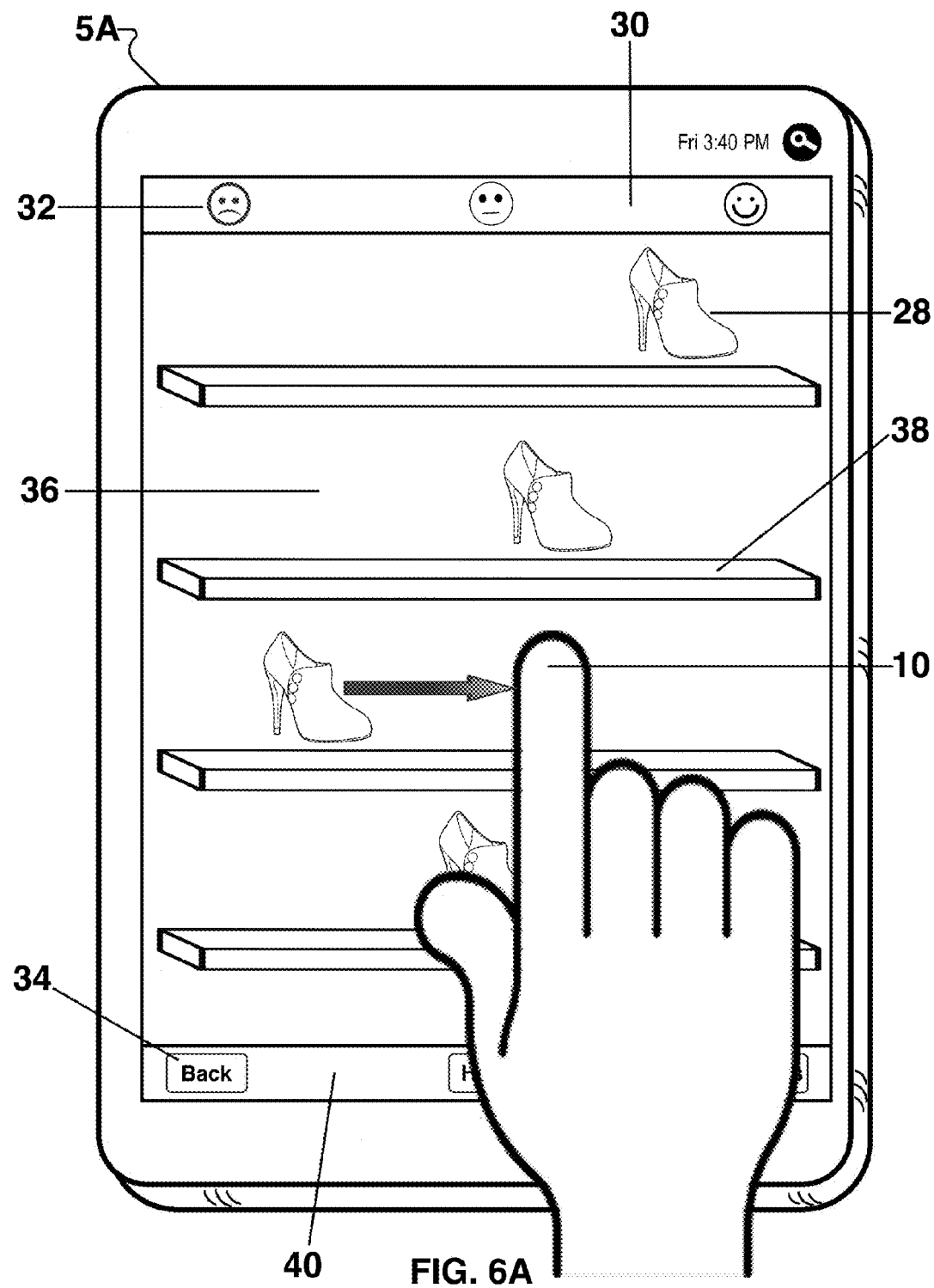
FIG. 6A is a drawing illustrating an example of a system and method for gravitation of an on-screen object toward the position of a pointer in accordance with one or more aspects of the present disclosure.

As shown in FIG. 6A, the object representing products or items 28 nearest to the current position of the finger or other pointer means 10, on the current row and/or shelf 38, gravitates to the current position of the finger or other pointer means 10, and becomes attached to the finger or other pointer means 10, as shown in FIG. 6B.

As shown in FIG. 6B, a product/item info tag 66, displaying descriptive information about that product or item, for example brand name, model, design, price, etc, may appear for example above or next to the object representing products or items 28.

When an object representing products or items 28 (FIG. 4A) is placed in a position along one of the rows and/or shelves 38, it may flash, pulse, adjust in size, or otherwise graphically indicate that it has been placed in a position.

In the course of the process depicted in FIG. 4A, the user interface continually presents the user with more pages of objects representing products or items 28, as long as the user continues to swipe or gesture with the finger or other pointer means 10 over successive page views in the product/item display area 36.

In this example, the user may touch the back button 34 (FIG. 2A), in the menu bar 40 (FIG. 2A), to go back to previously viewed product/item display area 36 pages.

Figure 8A:
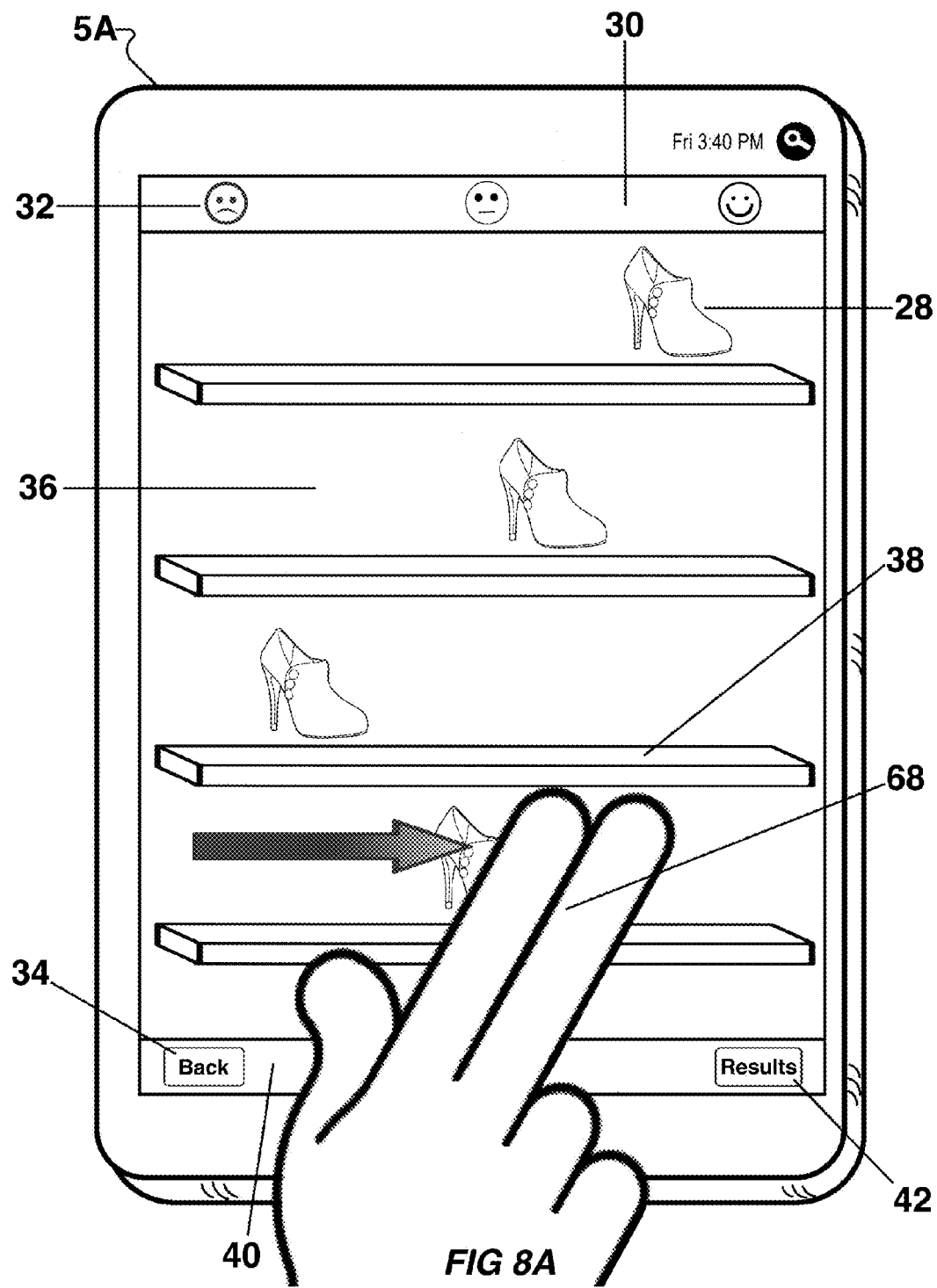
FIG. 8A is a drawing illustrating an example of a system and method for navigating back to a previous page in a software user interface in accordance with one or more aspects of the present disclosure.
Figure 8B:
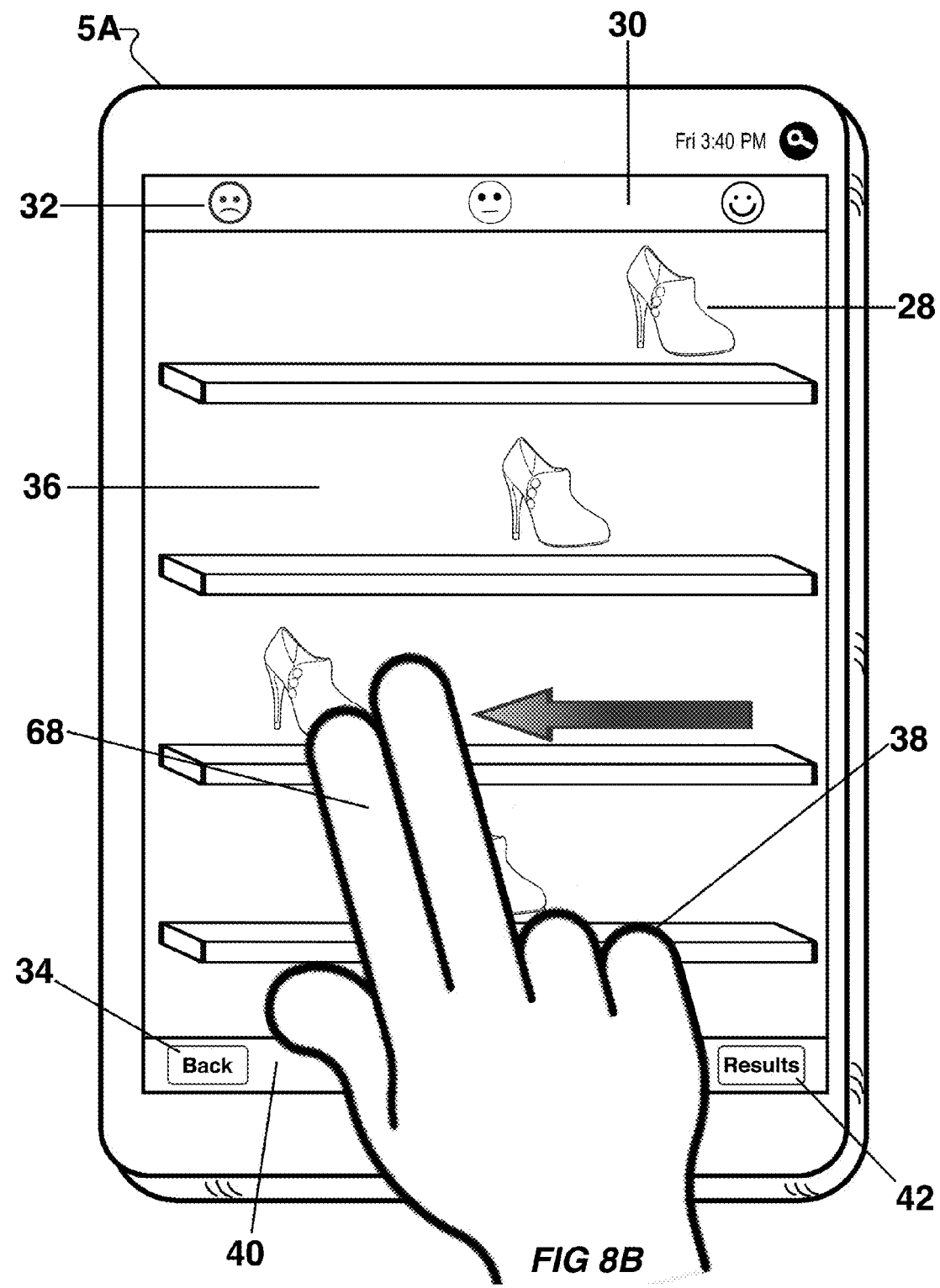
FIG. 8B is a drawing illustrating an example of a system and method for navigating forward to a next page in a software user interface in accordance with one or more aspects of the present disclosure.

As shown in FIG. 8A, the user may touch with two fingers together 68 and drag from left to right to go back to previously viewed product/item display area 36 pages. As shown in FIG. 8B, the user may touch with two fingers together 68 and drag from right to left to go forward to the next product/item display area 36 page.

The user may get more information about a particular product or item 28 (FIG. 2A), by double tapping on the product or item 28 in the product/item display area 36, to open the product enlarged view page 70, the current example of which is shown in FIG. 9A. The product enlarged view page 70 displays the product in larger view 72.

In the product enlarged view page 70 (FIG. 9A) the user may touch the Info Button 74, to get more detailed information about the product in larger view 72. The user may touch the buy button 76 to purchase the product in larger view 72. The user may touch the back button 34 to exit the product enlarged view page 70.

Figure 7A:
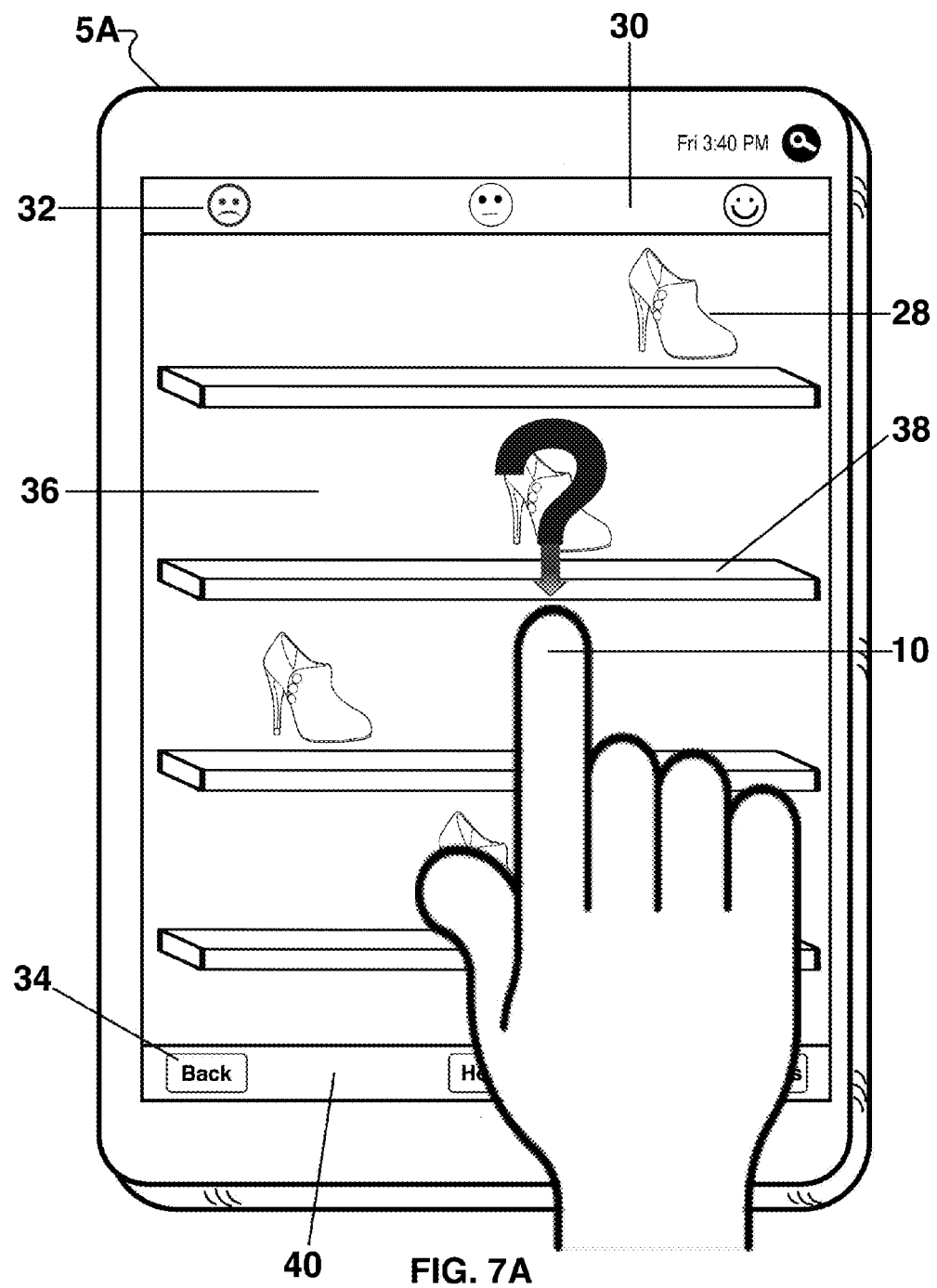
FIG. 7A is a drawing illustrating an example of a system and method for swiping a question mark gesture over an on-screen object in accordance with one or more aspects of the present disclosure.

This embodiment may include functionality, for example as shown in FIG. 7A, allowing the user to trace a question mark gesture over the product or item 28, with the finger or other pointer means 10, in the product/item display area 36, in order to view that product or item 28 in the product enlarged view page 70 that is shown in FIG. 9A.

Figure 7B:
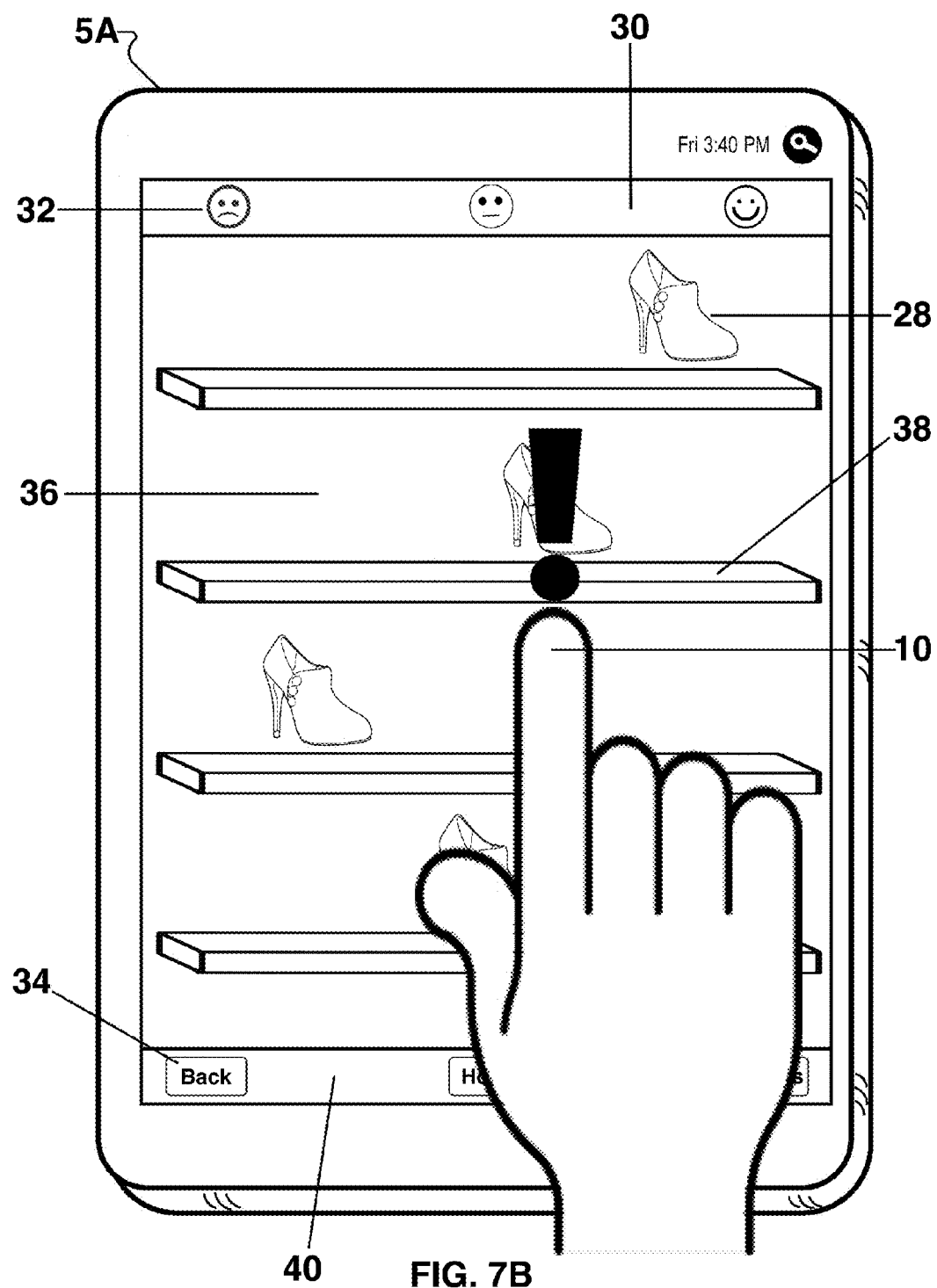
FIG. 7B is a drawing illustrating an example of a system and method for swiping an exclamation mark gesture over an on-screen object in accordance with one or more aspects of the present disclosure.

This embodiment may also include functionality, for example as shown in FIG. 7B, allowing the user to trace an exclamation point gesture over the product or item 28, with the finger or other pointer means 10, in the product/item display area 36, in order to go to a checkout page and purchase the product or item 28.

Figure 10:
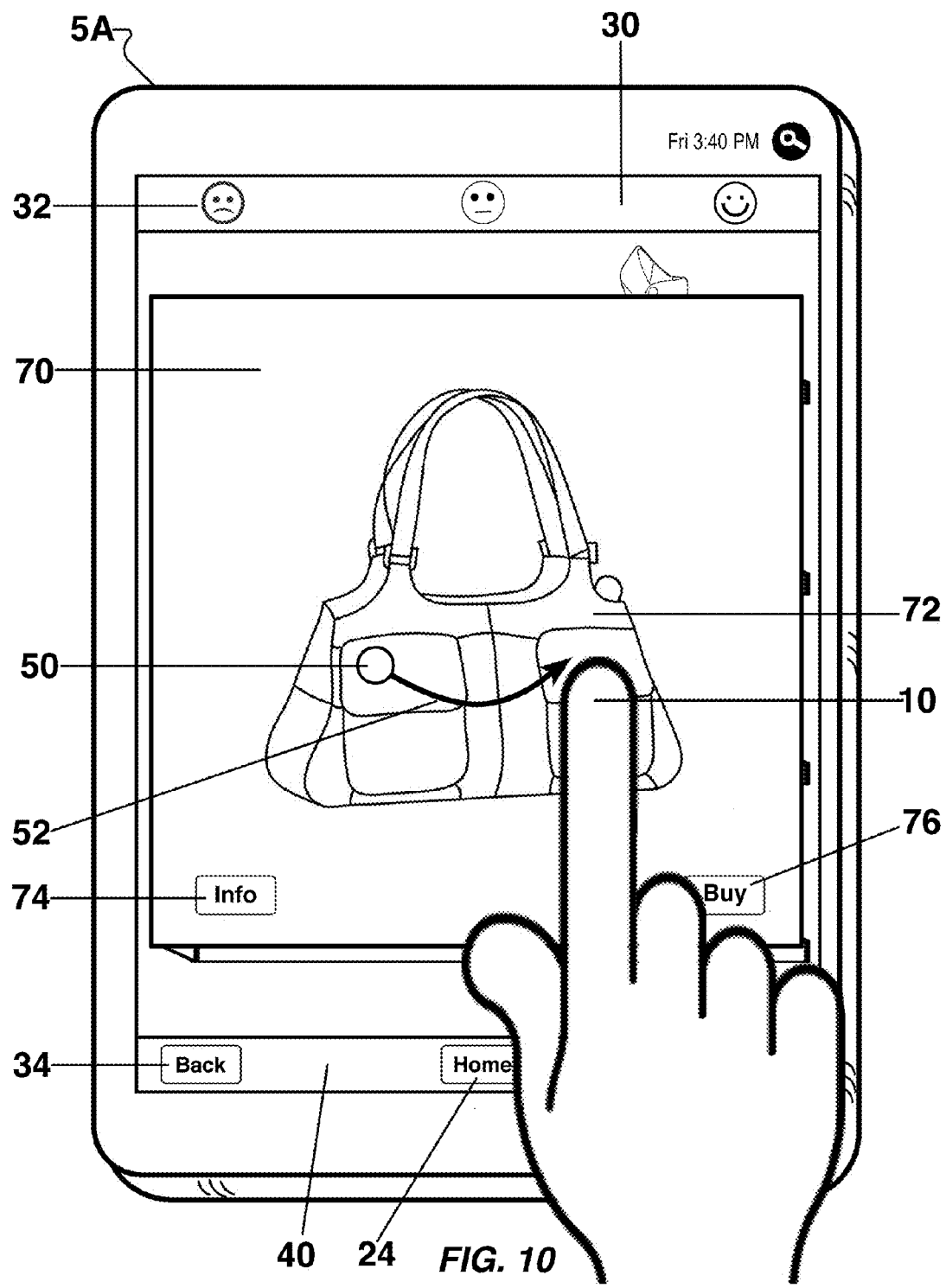
FIG. 10 is a drawing illustrating an example of a system and method for rotation of an on-screen object in accordance with one or more aspects of the present disclosure.

In the example shown in FIG. 10, in the product enlarged view page 70, the user may touch on the product in larger view 72 with the finger or other pointer means 10, for example at the point of initial contact of pointer 50, and swipe for example the path of pointer over screen 52, in order to rotate the product in larger view 72 to view it at different angles.

Figure 11A:
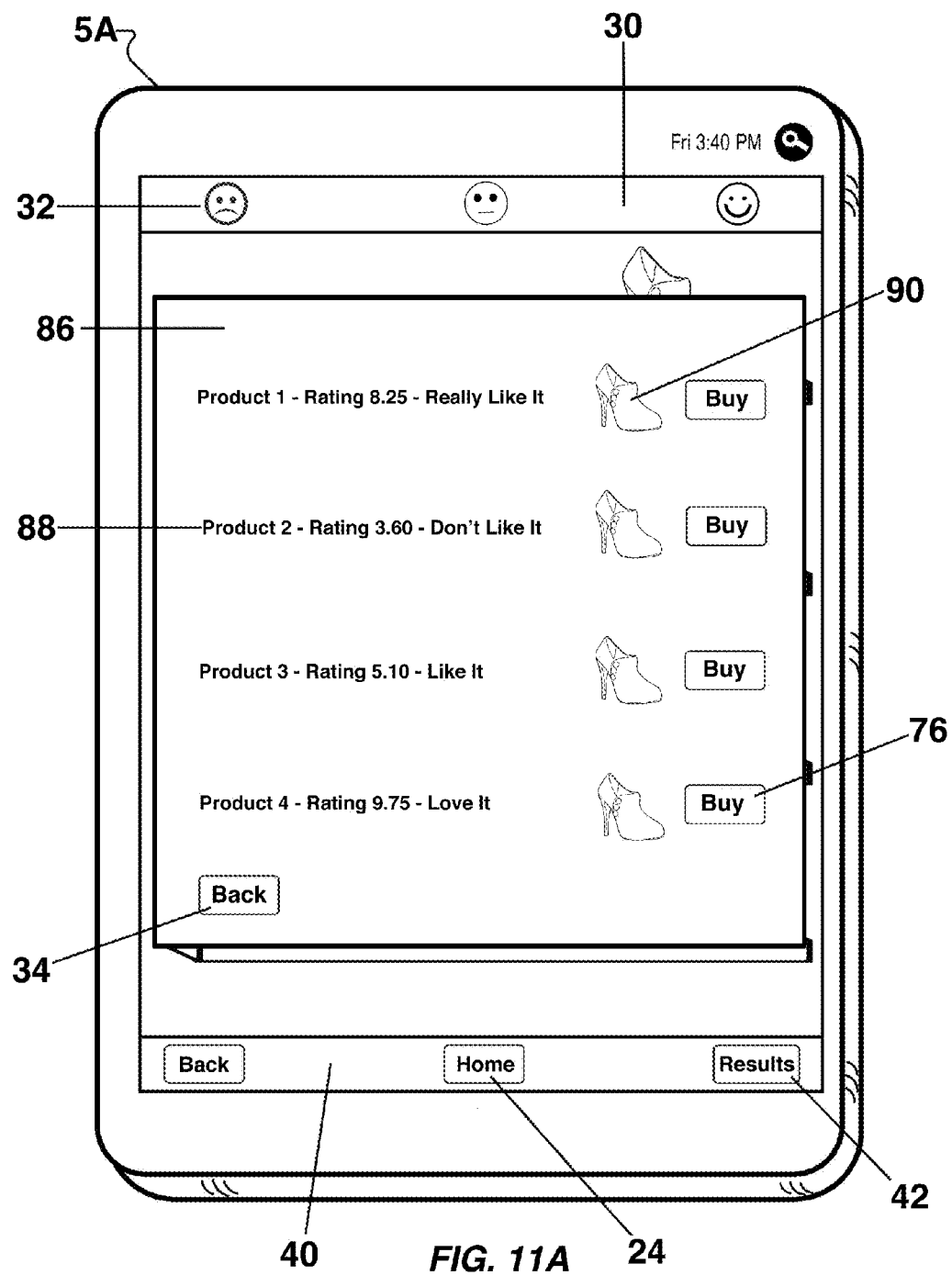
FIG. 11A is a drawing illustrating an example of a product search results page of a software user interface in accordance with one or more aspects of the present disclosure.

In some embodiments, in order to view the results of their search, the user may touch the results button 42, shown in FIG. 2A, to open a product search results page 86, an example of which is shown in FIG. 11A. The product search results page 86 (FIG. 11A) contains an item list with ratings 88, indicating item names, and how the user has rated items they have viewed thus far. Ratings are expressed as rating scale numbers 46 and preference designations 48 (FIG. 3) indicating degrees of preference. Ratings are determined by the positions relative to the rating scale 30 (FIG. 4A) in which products or items 28 (FIG. 4A) have previously been placed by the user, for example as in the process depicted in FIG. 4A.

In the example of FIG. 11A, the product search results page 86 also contains item icons 90, which remind the user of the appearance of each item searched. The user may touch on the buy button 76 next to one of the item icons 90 in order to purchase that item. The user may touch the back button 34 to exit the product search results page 86. The user may touch the Home Button 24 (FIG. 2A) to exit the user interface.

Embodiment Two

Virtual Shopping—Structure FIGS. 12A and 12B

In accordance with embodiment two of the disclosure, FIG. 12A shows the computing device 5A having at least a processor, a memory, a display, and an interface, in this case a touch screen, running a software user interface application consisting of a virtual shopping environment 100 containing a virtual display area 102 in which is located the software user interface window 12A. The software user interface window 12A contains the user interface close button 14. The virtual shopping environment 100 contains a virtual environment exit button 104. The finger or other pointer means 10 is touching the software user interface window 12A.

FIG. 12B shows the virtual shopping environment 100 with the user interface window in enlarged view 12B, containing objects representing products or items 28. The other parts indicated in FIG. 12B are the same as detailed in FIG. 12A above.

Embodiment Two

Virtual Shopping—Operation FIGS. 12A, 12B, 12C and 12D

In embodiment two, the software user interface application described above in embodiment one, referred to here as the software user interface window 12A, is embedded in the virtual tour environment 100, as shown in FIG. 12A.

We presently contemplate that the virtual shopping environment 100 shown in FIG. 12A will be of a type similar to the virtual tours used on websites to showcase retail stores, however the virtual environment used may take other forms as well. In the example of FIG. 12A the virtual shopping environment represents a retail store.

FIG. 12A shows the virtual display area 102, containing the software user interface window 12A. We presently contemplate that virtual shopping environments 100 of this embodiment may contain a plurality of virtual display areas 102, with a plurality of user interface windows 12A, representing a plurality of products, items or services, such as may be displayed in the real world equivalents of environments represented in virtual forms, in accordance with this embodiment.

The virtual shopping environments 100 (FIG. 12A) described here may be hosted in a plurality of contexts, for example mobile device applications, online retail shopping websites, online social shopping engines, in-store displays and kiosks driven by computing devices, etc.

In the method of this embodiment the user navigates through the virtual shopping environment 100 (FIG. 12A), to search for virtual display areas 102, that represent products or services in which the user may have an interest. The user opens user interface windows 12A and uses them to search products or services and enter preferences.

When the user finds the software user interface window 12A (FIG. 12A) they would like to open, the user double taps on the software user interface window 12A, with the finger or other pointer means 10, as shown in FIG. 12A. The software user interface window 12A is then enlarged such that it becomes the user interface window in enlarged view 12B (FIG. 12B), displaying objects representing products or items 28, as shown in FIG. 12B. The user may then search and enter preferences in the same manner as is described above in embodiment one of the disclosure.

To close the user interface window in enlarged view 12B (FIG. 12B) the user touches the user interface close button 14 to for example return the user interface window in enlarged view 12B to the previous state of the software user interface window 12A (FIG. 12A).

Figure 12C:
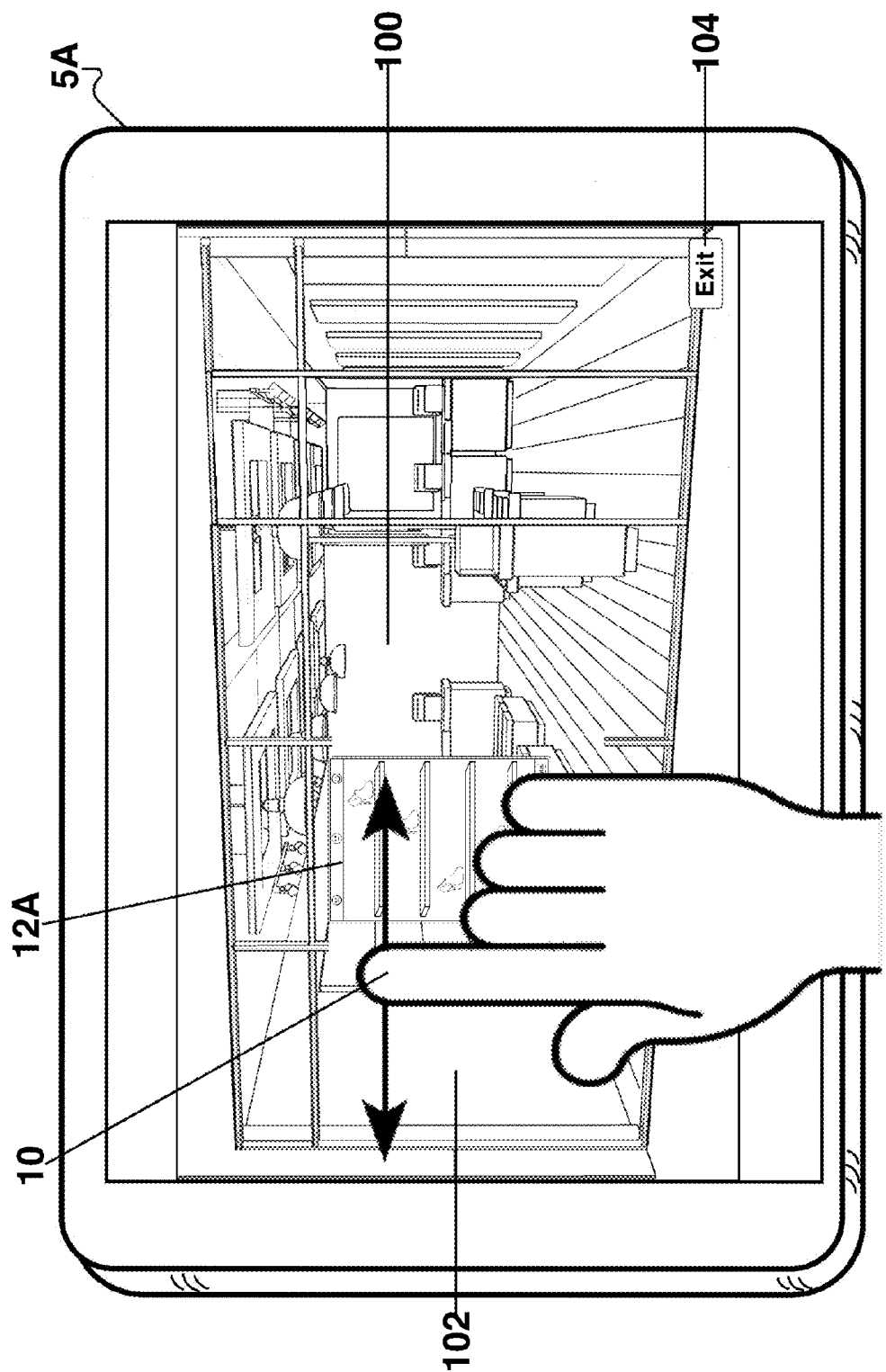
FIG. 12C is a drawing illustrating an example of user navigation left and right in a virtual shopping environment in accordance with one or more aspects of the present disclosure.

As shown in FIG. 12C, in order to navigate through the virtual shopping environment 100, the user touches the touch screen of the computing device 5A with the finger or other pointer means 10, and for example drags to the right to move to the right, or drags to the left to move to the left, within the virtual shopping environment 100, although such navigation may take other forms as well.

Figure 12D:
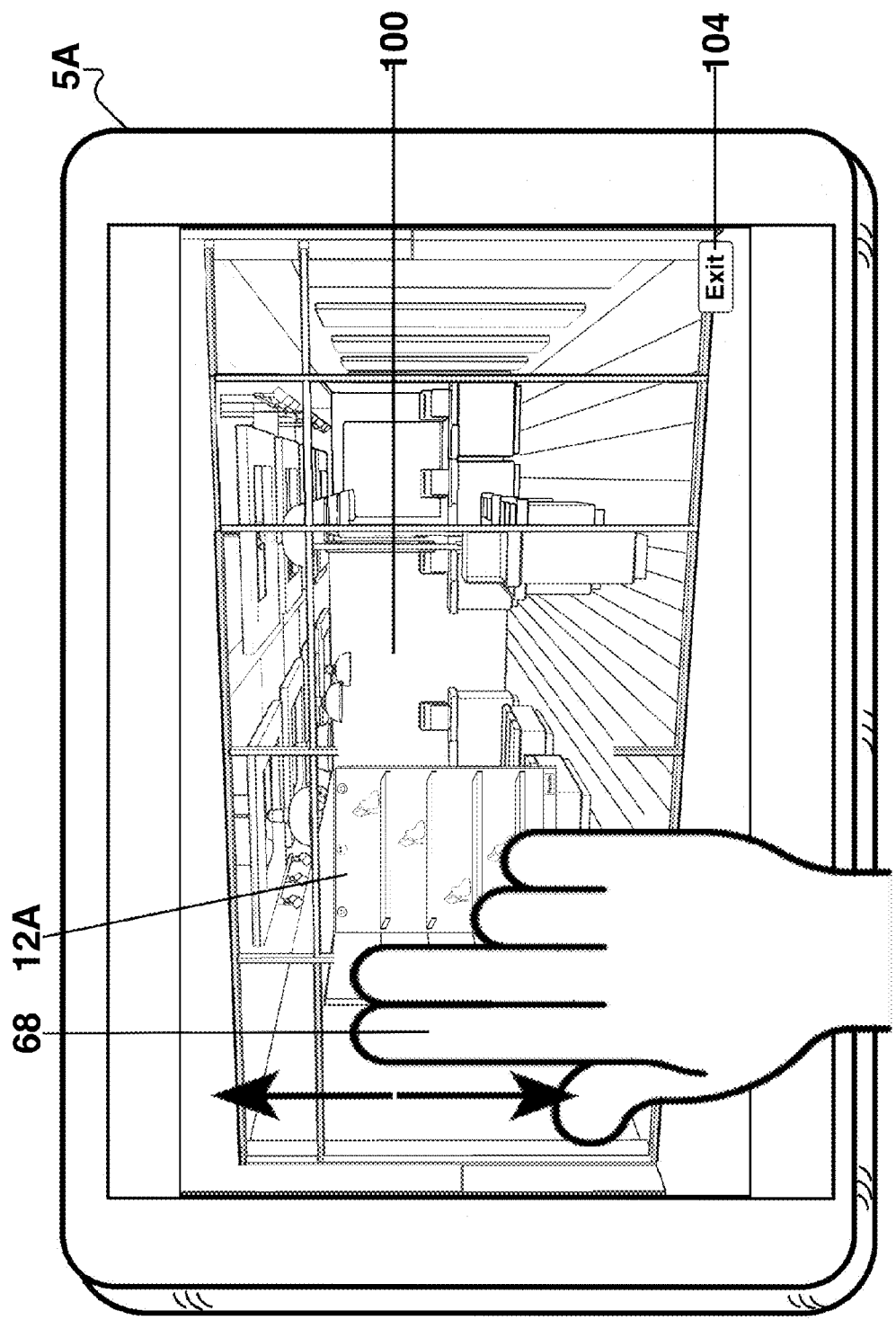
FIG. 12D is a drawing illustrating an example of user navigation forward and backward in a virtual shopping environment in accordance with one or more aspects of the present disclosure.

As shown in FIG. 12D, the user touches the touch screen of the computing device 5A with two fingers together 68 and for example drags up to move forward, or drags down to move backward, within the virtual shopping environment 100.

The user touches the virtual environment exit button 104 (FIG. 12A) to exit the virtual shopping environment 100.

Embodiment two may be applied to virtual environments for other uses as well.

Embodiment Three

Figure 2B:
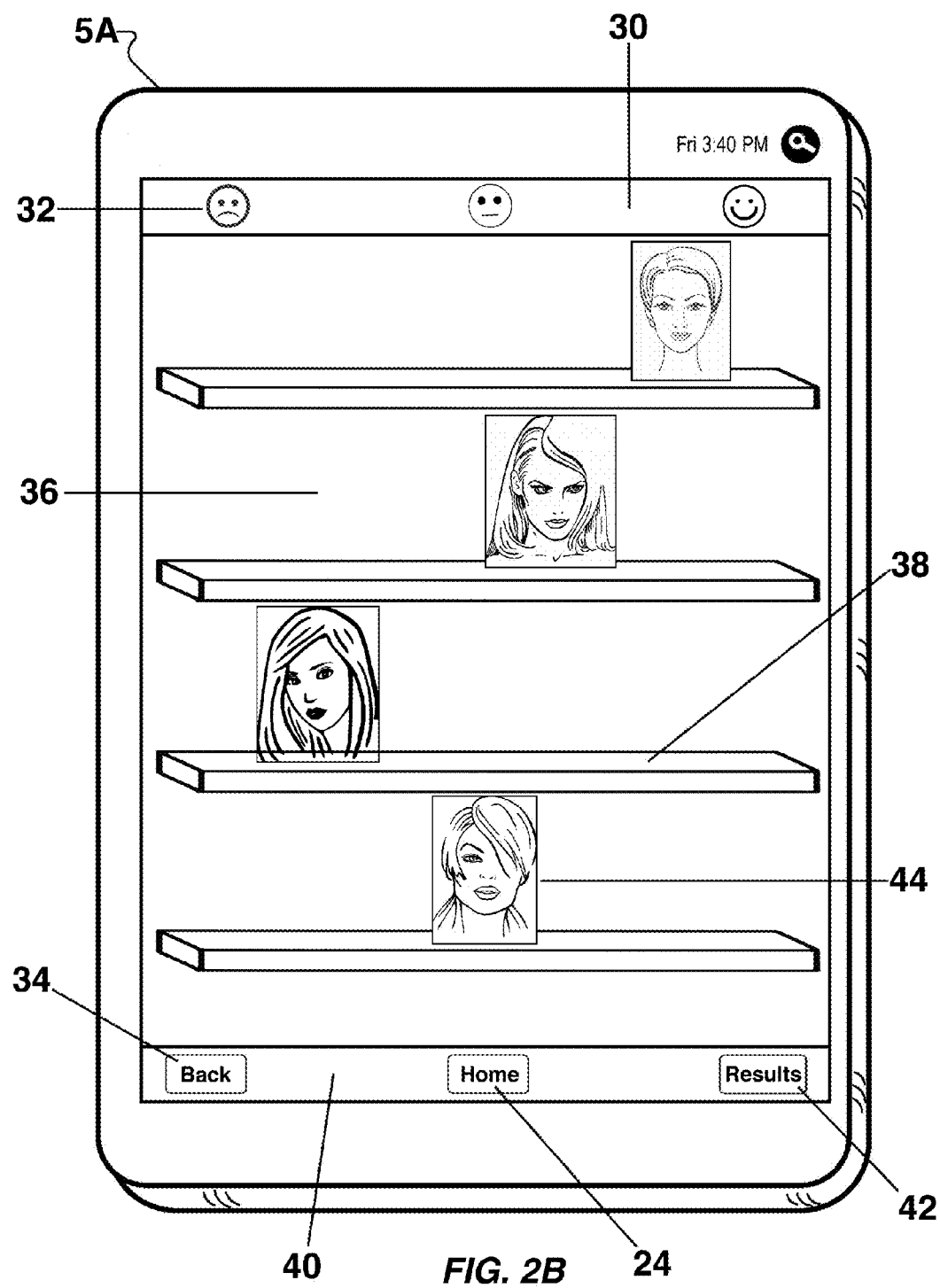
FIG. 2B is a drawing illustrating an example of a software user interface application with member profiles in accordance with one or more aspects of the disclosure.
Figure 5:
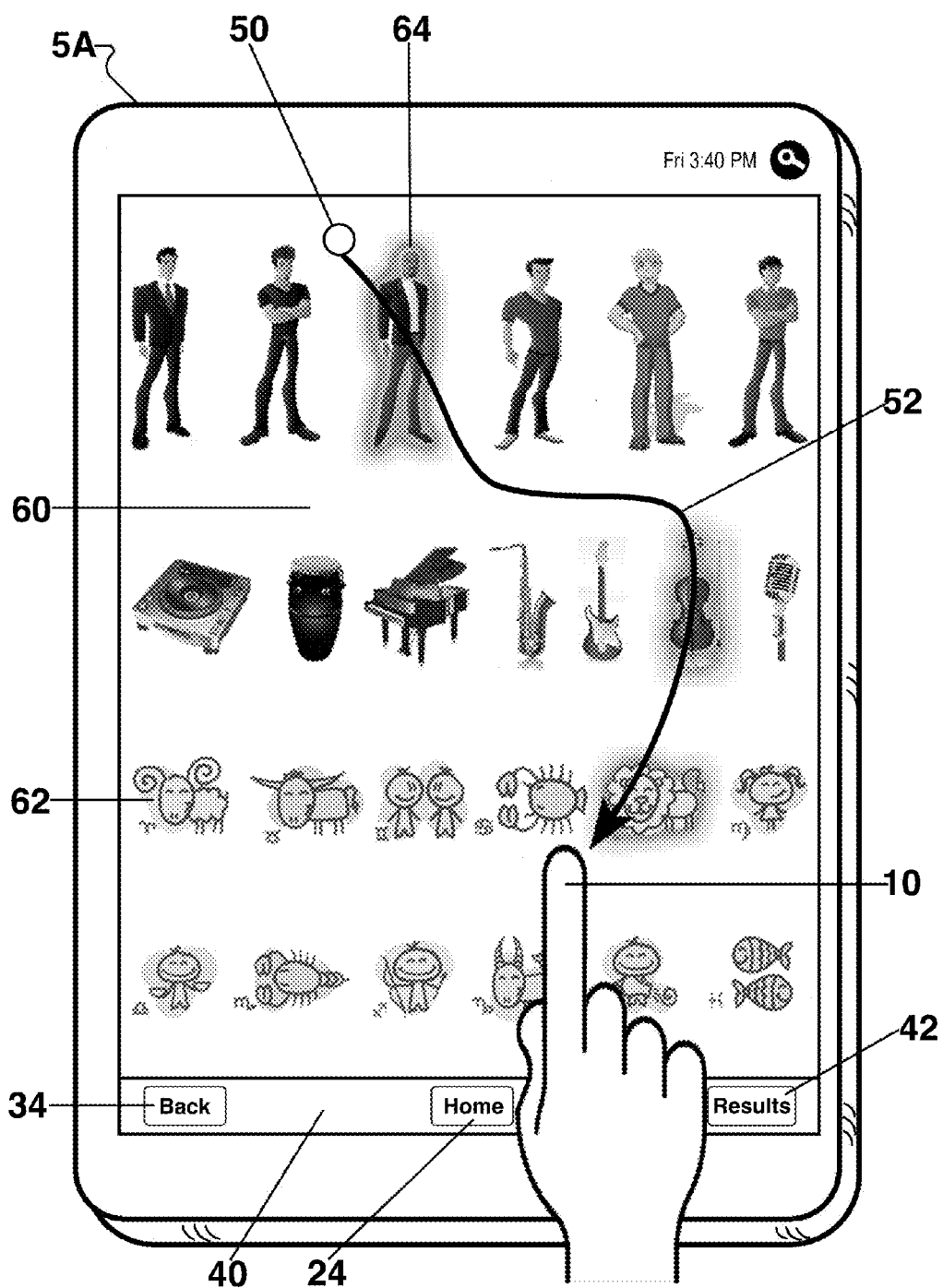
FIG. 5 is a drawing illustrating an example of a system and method for selection of a plurality of attribute icons in a single swipe or gesture in accordance with one or more aspects of the present disclosure.
Figure 9B:
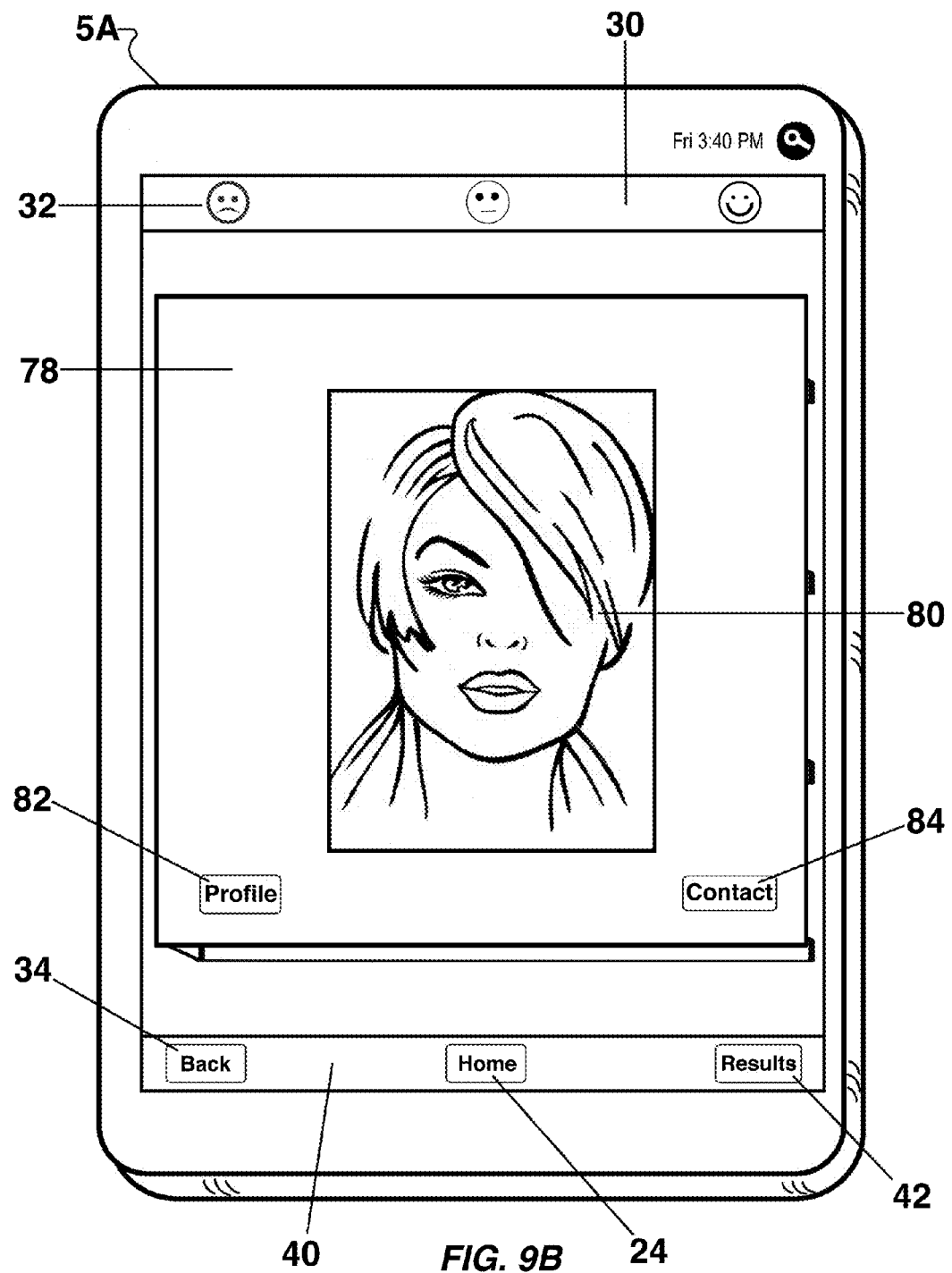
FIG. 9B is a drawing illustrating an example of a member profile in larger view page of a software user interface in accordance with one or more aspects of the disclosure.

Dating Services—Structure FIGS. 2B, 9B and 5

In accordance with embodiment three of the disclosure, FIG. 2B shows the computing device 5A having at least a processor, a memory, a display, and an interface, in this case a touch screen, running a software user interface application with the product/item display area 36, containing horizontal rows and/or shelves 38, which contain photos representing member profiles 44. The rating scale 30, in this case the row of emoticons 32, is situated above the product/item display area 36, parallel to the rows and/or shelves 38. In this example the menu Bar 40, containing the back button 34, the home button 24, and the results button 42, is situated below the product/item display area 36, also parallel to the rows and/or shelves 38.

FIG. 9B shows the computing device 5A, running the software user interface application with a profile enlarged view page 78, containing a profile photo in larger view 80. In this example a profile button 82 and a contact button 84 are situated below the profile photo in larger view 80, in the profile enlarged view page 78. The other parts indicated in FIG. 9B are the same as described above for FIG. 2B.

FIG. 5 shows the computing device 5A, running the software user interface application with a member preferences input page 60 containing attribute icons 62, and attribute icons in selected state 64. In this example the menu Bar 40, containing the back button 34, the home button 24, and the results button 42, is situated below the member preferences input page 60.

Embodiment Three

Dating Services—Operation FIGS. 2B, 3, 4B, 5, 8A, 8B, 9B, 11B

Embodiment three of the disclosure applies the method and process described above in embodiment one, in this case to dating services. We presently contemplate this embodiment being used for internet dating websites, accessed on mobile computing devices, laptop and desktop computers; however this embodiment may be applied in other contexts, on other devices, and for other uses as well.

Figure 4B:
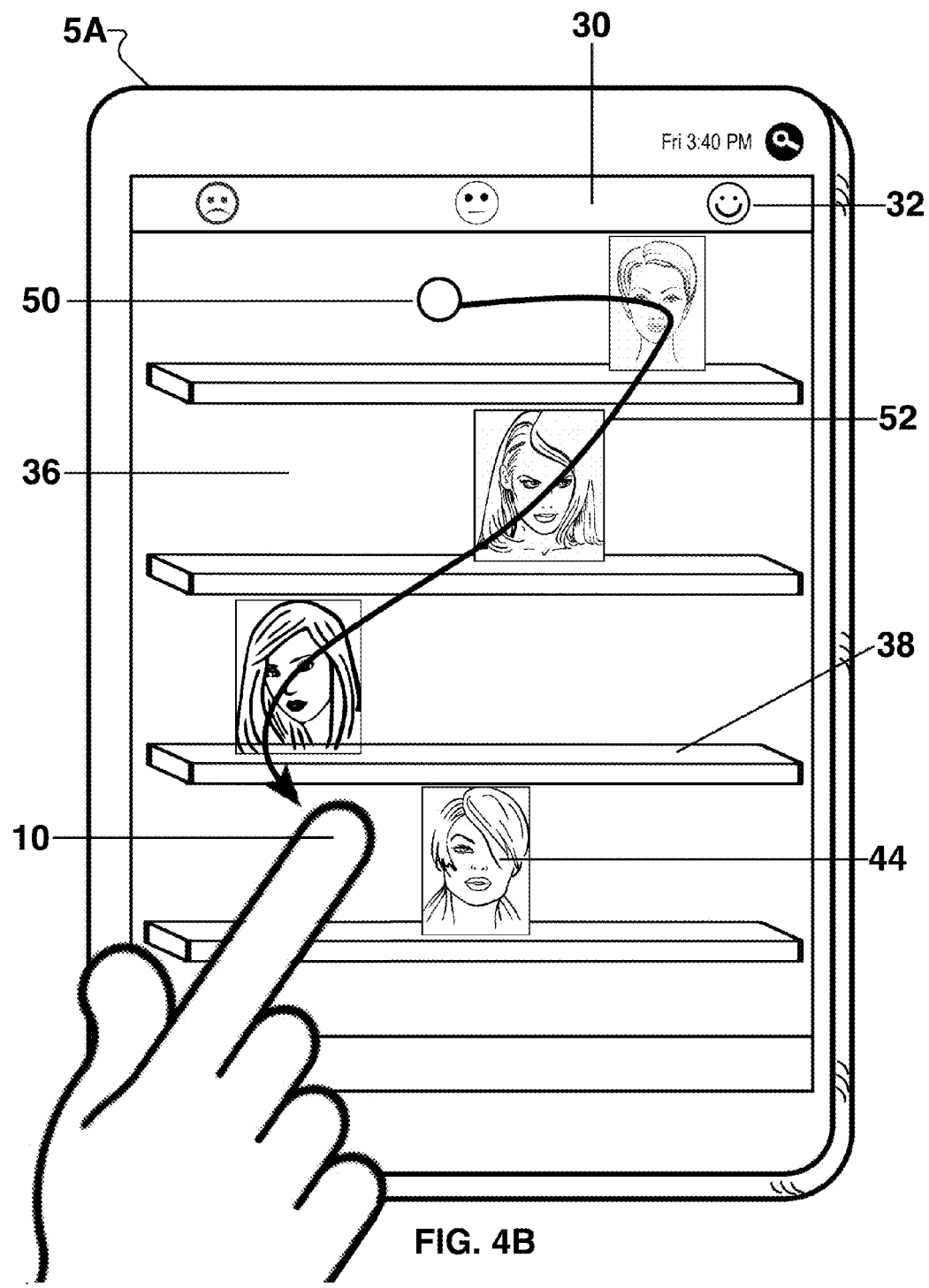
FIG. 4B is a drawing illustrating an example of a system and method for describing degrees of preference for a plurality of member profiles in a single swipe or gesture in accordance with one or more aspects of the present disclosure.

In this embodiment, for example as depicted in FIG. 4B, a user indicates degrees of preference for a plurality of objects representing member profiles 44, on the touch screen of the computing device 5A, by at least initiating contact with the touch screen with the finger or other pointer means 10, and passing the finger or other pointer means 10 over the touch screen in a single swipe or gesture.

In the example shown in FIG. 4B, the user touches the touch screen of the computing device 5A, with the finger or other pointer means 10, for example at the point of initial contact of pointer 50, within the product/item display area 36. The user moves the objects representing member profiles 44 to the left or to the right along the rows and/or shelves 38, placing objects representing member profiles 44 at positions relative to the rating scale 30, to indicate degrees of like or dislike for member profiles 44.

In this and other embodiments, values on the rating scale 30, as represented by the row of emoticons 32, and expressed as rating scale numbers 46 (FIG. 3) and preference designations 48 (FIG. 3), register from left to right, such that the position furthest to the left indicates the lowest degree of like, and the position furthest to the right indicates the highest degree of like.

Also in the example of FIG. 4B, the software user interface application will assign a floating point numeric value, representing a degree of like or dislike, to each member profile 44, as determined by the position relative to the rating scale 30 in which each member profile 44 has been placed.

In the process depicted in FIG. 4B, when the user has placed the current member profile 44 in the desired position, and the finger or other pointer means 10 moves down the product/item display area 36 into the next of the rows and/or shelves 38, the next member profile 44 is selected and moved left or right to the desired position. In this manner the user continues selecting and placing member profiles 44, tracing for example the path of pointer over screen 52, until the last member profile 44 at the bottom of the product/item display area 36 has been placed.

When the last of the member profiles 44 (FIG. 4B) has been placed, and the finger or other pointer means 10 moves below the bottom-most of the rows and/or shelves 38 in the product/item display area 36, the interface automatically scrolls to display a new page containing a new set of member profiles 44.

The software user interface application adjusts the selection of member profiles 44 (FIG. 4B) included on each successive page view in the product/item display area 36, to consist of more member profiles 44 similar to those the user has indicated they like, and to exclude member profiles 44 similar to those the user has indicated they do not like. In this manner the user is able to search available member profiles 44 to quickly find those for which they have a high degree of preference.

In the course of the process depicted in FIG. 4B, the software user interface application continually presents the user with more pages of member profiles 44, as long as the user continues to swipe or gesture with the finger or other pointer means 10 over successive page views in the product/item display area 36.

The user may touch the back button 34 (FIG. 2B) in the menu bar 40 to go back to previously viewed product/item display area 36 pages.

As shown in FIG. 8A, the user may touch with two fingers together 68 and drag from left to right to go back to previously viewed product/item display area 36 pages. As shown in FIG. 8B, the user may touch with two fingers together 68 and drag from right to left to go forward to the next product/item display area 36 page.

The user may get more information about a particular one of the member profiles 44 (FIG. 2B), by double tapping on the member profile 44 in the product/item display area 36, to open the profile enlarged view page 78, the current example of which is shown in FIG. 9B. The profile enlarged view page 78 contains the profile photo in larger view 80 (FIG. 9B).

In the profile enlarged view page 78 (FIG. 9B) the user may touch the profile button 82, to get more detailed profile information about the member shown in the profile photo in larger view 80. The user may touch the contact button 84 to contact or otherwise connect with the member shown in the profile photo in larger view 80. The user may touch the back button 34 to exit the product enlarged view page 78.

Figure 11B:
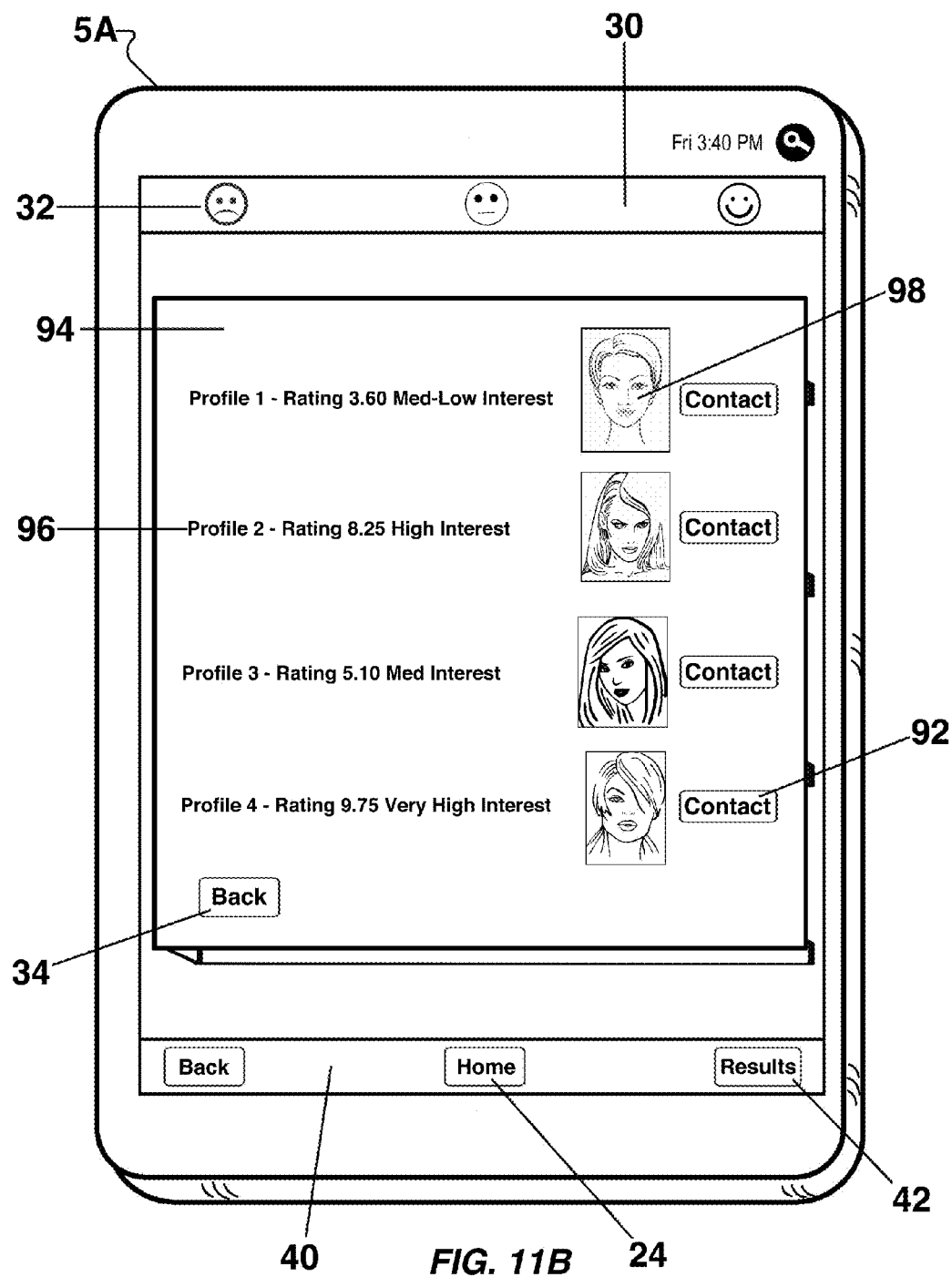
FIG. 11B is a drawing illustrating an example of a member profile search results page of a software user interface in accordance with one or more aspects of the present disclosure.

In order to view the results of their search, the user may touch the results button 42 shown in FIG. 2B, to open a profile search results page 94, an example of which is shown in FIG. 11B. The profile search results page 94 (FIG. 11B) contains a profile list with ratings 96, indicating member names, and how the user has rated profiles they have viewed thus far. Ratings are expressed as floating point numbers, and designations indicating degrees of interest. Ratings are determined by the positions relative to the rating scale 30 (FIG. 4B) in which member profiles 44 (FIG. 4B) have previously been placed by the user, for example as in the process depicted in FIG. 4B.

In the example of FIG. 11B, the profile search results page 94 also contains profile icons 98, which remind the user of the appearance of each member searched. The user may touch on the contact button 92 next to one of the profile icons 98 in order to contact or otherwise connect with the member shown in the profile icon 98. The user may touch the back button 34 to exit the profile search results page 94. The user may touch the Home Button 24 to exit the user interface, and, for example, return to their own profile page or the home page of the host website or service.

In the example of FIG. 5, the user touches the touch screen of the computing device 5A, with the finger or other pointer means 10, in the member preferences input page 60, for example at the point of initial contact of pointer 50. The user inputs preferences by passing the finger or other pointer means 10 over the touch screen of the computing device 5A in a single swipe or gesture, touching any of a plurality of attribute icons 62, to select them, so they become attribute icons in selected state 64, in the process tracing for example the path of pointer over screen 52.

In this example attribute icons 62 (FIG. 5) may represent any of a plurality of attributes of a member of the dating service, for example styles of dress, musical instruments, signs of the zodiac, interests, hobbies, sports and leisure activities, preferred vacation destinations, and a plurality of other attributes for which the user chooses to indicate a preference, by selecting specific attribute icons 62 in the member preferences input page 60. The user may navigate through member preferences input pages 60 in the same manner as described above for this embodiment and as shown in FIGS. 8A and 8B. The user may touch the Home Button 24 to exit the user interface and, for example, return to their own profile page or the home page of the host service. The Home Button 24 may also be accessed in the other page views of the user interface as shown in FIG. 2B and FIG. 9B.

Embodiment Four

Figure 4C:
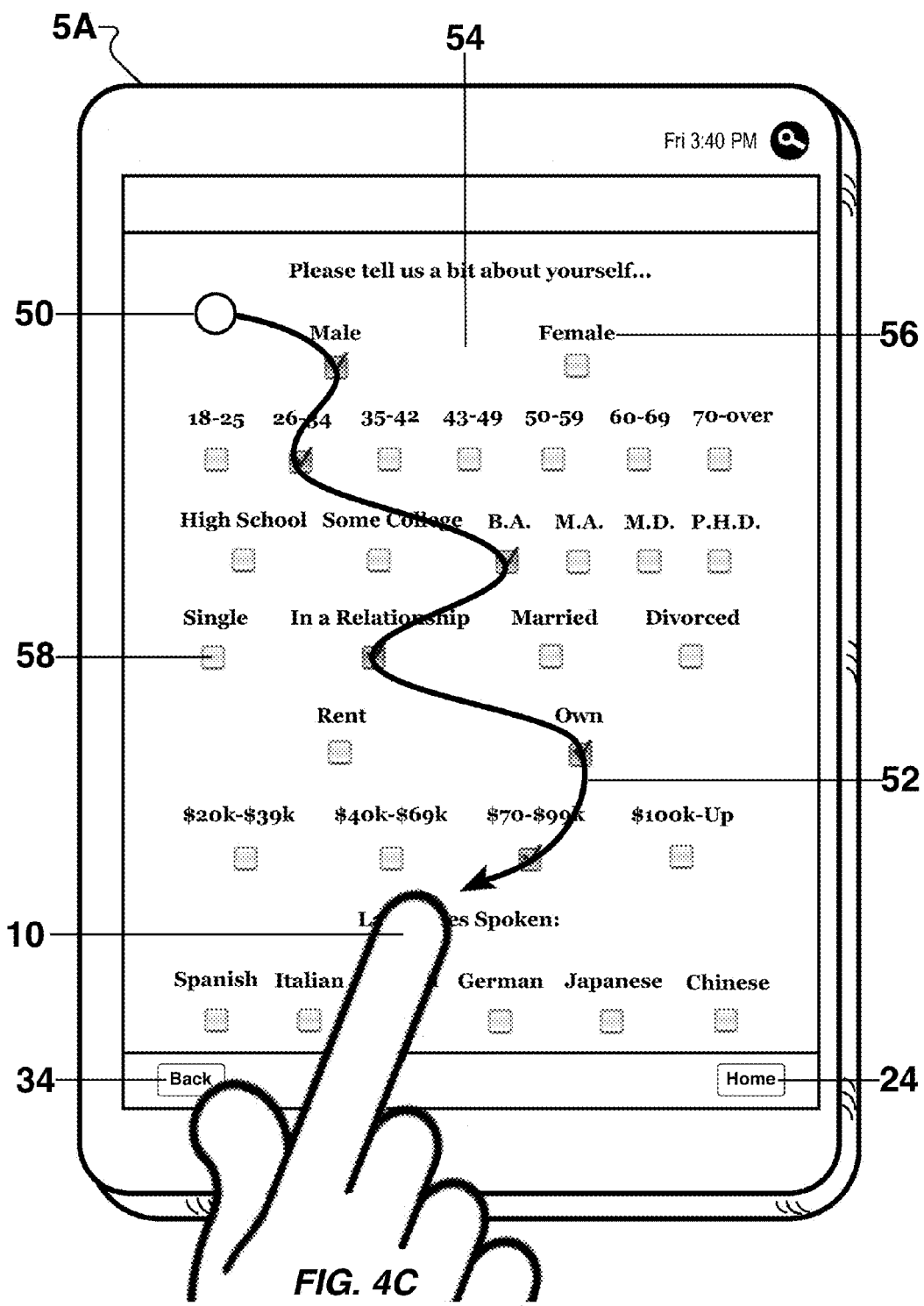

Surveys—Structure FIGS. 4C and 4D

In accordance with embodiment four of the disclosure, the example of FIG. 4C shows the computing device 5A having at least a processor, a memory, a display, and an interface, in this case a touch screen, running a software user interface application containing a survey form 54 with data field designations 56, and checkboxes 58. The back button 34 and home button 24 in this example are situated at the bottom of the survey form 54. FIG. 4D is implemented with sliders 59 instead of checkboxes.

Embodiment Four

Surveys—Operation FIGS. 4C, 4D, 8A and 8B

This embodiment four applies at least in part the system and method described in embodiment one above, in this case to use in survey forms, for example such as are used in online surveys. We currently contemplate the method of embodiment four being used on survey websites, however it may be applied in other ways as well, for example to enter member profile and preferences data on social network websites, social shopping engines, dating websites, lifestyle portal websites, in-store kiosks, etc.

For example as shown in FIG. 4C, the user touches the touch screen of the computing device 5A, with the finger or other pointer means 10, at for example the point of initial contact of pointer 50, and traces for example the path of pointer over screen 52. In so doing, the user passes the finger or other pointer means 10 over the checkboxes 58 associated with the data field designations 56 in a single swipe or gesture in order to quickly fill out the survey form 54 with answers to survey questions. FIG. 4D shows the above process using sliders 59 in place of checkboxes.

As shown in FIG. 8A, the user touches with two fingers together 68 and drags from left to right to go back to previously viewed display pages. As shown in FIG. 8B, the user touches with two fingers together 68 and drags from right to left to go forward to the next display page.

The user may touch the back button 34 (FIG. 4C) to go back to previously viewed survey form 54 pages. The user may touch the home button 24 (FIG. 4C) to exit the user interface and go for example to the home page of the host website or service.

Embodiment Five

Shopping Website—Structure FIG. 1B

In accordance with embodiment five of the disclosure, FIG. 1B shows the computing device 5A having at least a processor, a memory, a display, and an interface, in this case a touch screen, running the web browser 19 containing the shopping website 20, with embedded software user interface window 12A, and user interface window in enlarged view 12B, which contains the user interface close button 14. The shopping website 20 also contains photos representing products or items 18.

Embodiment Five

Shopping Website—Operation FIG. 1B

In the example of FIG. 1B, the user double taps on the software user interface window 12A, which is embedded in the shopping website 20, to open the user interface window in enlarged view 12B. The user may also double tap on a photo representing products or items 18 to open the user interface window in enlarged view 12B. The user interface window in enlarged view 12B then displays the product or item shown in the photo representing products or items 18, and other similar products or items. The user interface window in enlarged view 12B is then operated in a similar manner as is described above in embodiment one of the disclosure. The user may touch the user interface close button 14 in order to close the user interface window in enlarged view 12B, and for example return it to the previous state of the software user interface window 12A, as embedded in the shopping website 20.

We presently contemplate this embodiment be applied to online retail shopping websites and social shopping engine websites on which members rate, share, and shop for products, however the method described here may also be applied to any website, as well as to applications run on mobile computing devices and other uses.

Figure 13:
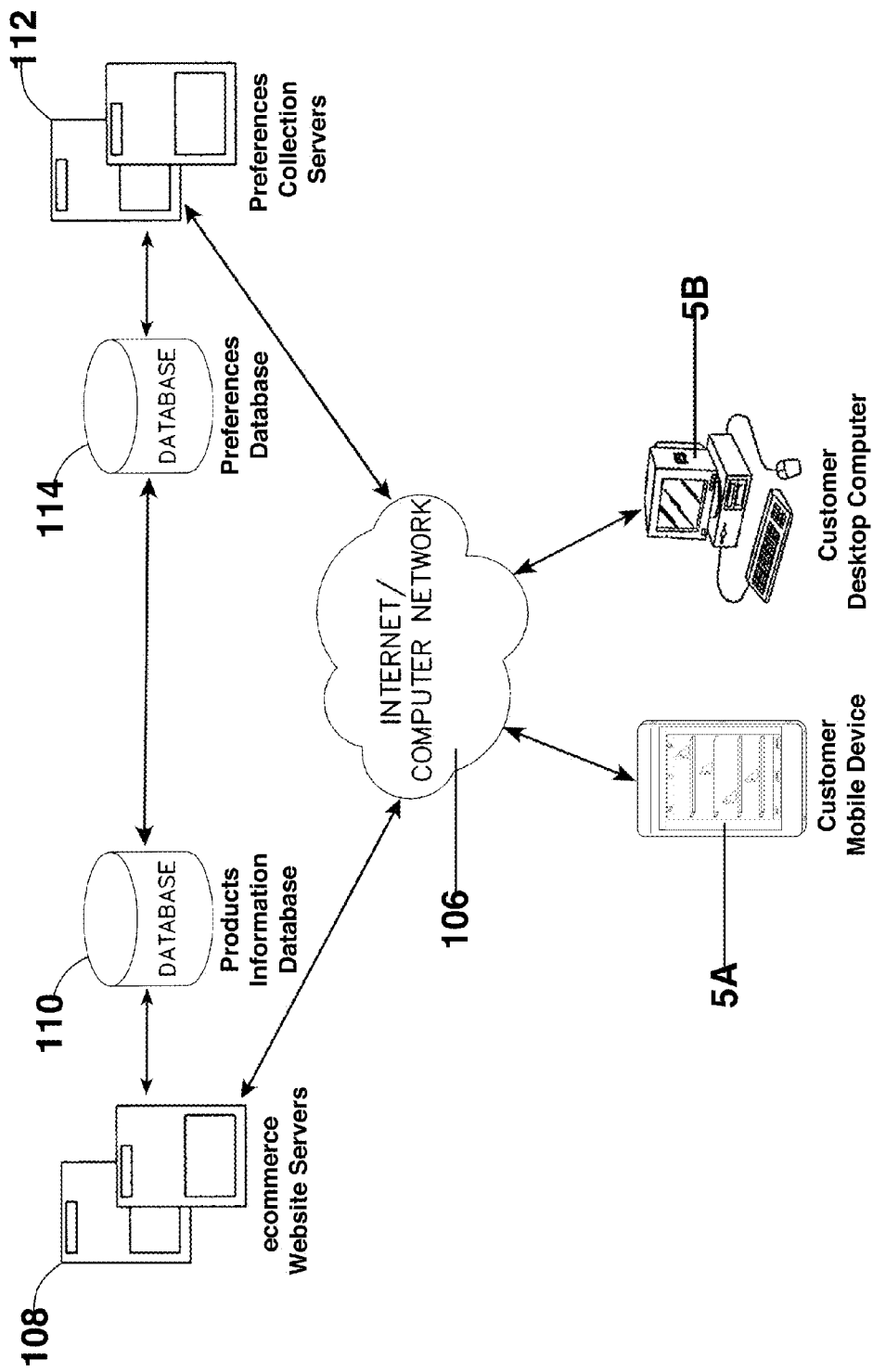
FIG. 13 is a drawing illustrating an example of hardware and network configuration for customer interaction with e-commerce websites in accordance with one or more aspects of the present disclosure.

System Infrastructure—FIG. 13

We presently contemplate the system and method of the disclosure being implemented through a hardware and software infrastructure similar to the example shown in FIG. 13.

The user or customer engages with the software user interfaces as described above in the various embodiments, on for example a customer mobile computing device 5A having at least a processor, a memory, a display, and an interface, in this case a touch screen, or customer desktop computer 5B, which communicates through a network, for example the internet 106, with, for example, e-commerce websites running on e-commerce website servers 108. Servers being defined as computers used to support the professional functions and operations of entities doing business over networks such as the internet 106. E-Commerce website servers 108 reference and retrieve product information from a products information database 110, and send product information over the network, for example the internet 106, to the software user interfaces running on the customer mobile computing device 5A, or customer desktop computer 5B.

The user operates the software user interfaces as described above in the various embodiments, on for example the customer mobile computing device 5A or customer desktop computer 5B, and generates preferences data, which is transmitted over the network, for example the internet 106, to preferences collection servers 112. The preferences data generated is stored in a preferences database 114, then retrieved and transmitted as needed over the network, for example the internet 106, to, for example, e-commerce websites running on the e-commerce website servers 108, and to the software user interfaces running on for example the customer mobile computing device 5A or customer desktop computer 5B.

Software Process—FIGS. 14A, 14B, 14C, 15A, 15B, 16, 17, 18, 19, 20A, 20B, 20C 20D, 21 and 22

We presently contemplate the software user interface application described above in the various embodiments be implemented with a software process similar to the examples of the flowcharts shown in the figures below described. In embodiments implemented with desktop computers, left and right clicks of a mouse may be used in place of the touch screen tap and gesture inputs described.

FIG. 14A is a flowchart illustrating example software process steps for operations of an example software user interface controlled by a computing device in accordance with one or more embodiments of the present disclosure. The flowcharts in FIGS. 14B & 14C are continuations of the flowchart begun in FIG. 14A.

In accordance with some embodiments, at step 118 the human operator may perform a double tap gesture on the touch screen of the computing device 5A (FIG. 1A), initiating the launch at step 120 of the example software user interface controlled by the computing device 5A. At step 122 in various embodiments the computing device 5A loads from its storage device 352 (FIG. 22) into its Memory 364 (FIG. 22) the main display page of the software user interface, including the product/item display area 36 (FIG. 2A), and rating scale 30 (FIG. 2A).

At step 124 in some embodiments the example software user interface may identify an object group of objects representing products or items 28 (FIG. 2A), and load a first object set, for example from a product information database 110 (FIG. 13), stored, for example, on e-commerce website servers 108 (FIG. 13) of an e-commerce company whose products or services the human operator (user/customer) may use the software user interface to access.

At step 126 in some embodiments gesture input is received, for example when the user performs gestures on the touch sensitive screen of the computing device 5A, to select an object representing products or items 28 (FIG. 4A), move the object for example as in step 128 and place the object in a position as in step 130. These object movement and placement steps are further described in FIGS. 15A & 15B.

FIG. 14B is a continuation of the flowchart begun in FIG. 14A. In FIG. 14B, in accordance with various embodiments, at step 132, when the object has been moved and placed in a position, for example as a result of gestures performed on the touch sensitive screen of the computing device 5A, the software user interface assigns a preference value to the object, stores that value in the memory of the computing device 5A, and transmits the value to the preferences information database 114 (FIG. 13), stored for example on the preferences collection servers 112 (FIG. 13).

At step 134 further gesture input is received, for example when the user performs gestures on the touch sensitive screen of the computing device 5A, and the next object representing products or items 28 (FIG. 4A) is selected. At step 136 the next selected object is moved then at step 138 the object is placed in a position, for example as described in FIGS. 15A & 15B.

At step 140 the software determines if all objects in the current object set have been placed, if they have not the sequence loops back to step 132 and continues. If it is determined at step 140 that the last object in the current object set has been placed, the software sequence advances to step 142 and a new object set is loaded into and displayed in the software user interface. Step 142 is further described in FIG. 16.

FIG. 14C is a continuation of the flowchart begun in FIG. 14A, and continued in FIG. 14B. In FIG. 14C, at step 144 in some embodiments when a double tap or a question mark gesture input is received, as a result of gestures performed by the user on the touch screen of the computing device 5A, the software sequence advances to step 146, and the product enlarged view page is loaded in the software user interface. Step 146 is further described in FIG. 18.

At step 148, in some embodiments, when gesture input is received, in the form of a tap on the back button 34 (FIG. 2A), the software sequence advances to step 150 where the previous display page in the software user interface is recalled and displayed. At step 152 in some embodiments, when gesture input is received, in the form of a tap on the results button 42 (FIG. 2A), the sequence advances to step 154, and the product search results page is loaded. Step 154 further described in FIG. 19.

At step 156, in some embodiments, when an exclamation mark gesture is received, as a result of gestures performed by the user on the touch screen of the computing device 5A, the software sequence advances to step 158, where for example the software user interface follows a link to add the object indicated by the gesture to the shopping cart of the host site, and sends the selected object to checkout for purchase.

At step 160, when in accordance with various embodiments gesture input with two fingers swiping to the left or to the right is received, as a result of gestures performed by the user on the touch screen of the computing device 5A, the sequence advances to step 162, where the software user interface loads and displays the next or the previous product display pages respectively. In embodiments using a desktop computer, a right click on a mouse may take the place of the two finger gesture.

At step 164, in some embodiments, when gesture input is received in the form of a tap on the home button 24 (FIG. 2A), the sequence advances to step 166 where the software user interface is closed, and, for example, the user's profile page or the host site home page is displayed.

FIG. 15A is a flowchart illustrating a subroutine of the flowcharts 14A, step 128, and 14B, step 136, relating to object movement, of objects representing products, items or services 28 (FIG. 4A), in an example software user interface, in accordance with various embodiments.

In FIG. 15A at step 170, in some embodiments, when gesture input is received on the touch sensitive screen of the computing device 5A, indicating the finger or other pointer means 10 (FIG. 4A) is in contact with the touch screen, the sequence advances to step 172 and the object nearest to the position of the pointer is moved to the current position of the pointer, and in step 174 is attached to the position of the pointer. Once the object is attached to the current position of the pointer, the sequence advances to step 176, and the product/item info tag 66 (FIG. 6B) is displayed for example at the position of the pointer near the object.

At step 178, in some embodiments when gesture input is received on the touch sensitive screen of the computing device 5A, indicating the finger or other pointer means 10 (FIG. 4A) that is in contact with the touch screen is moving, the sequence advances to step 180 and the current object is moved to follow the pointer position.

At step 182 when gesture input is received on the touch sensitive screen of the computing device 5A, indicating the pointer that is in contact with the touch screen has moved into the next object zone, in this example by passing one of the rows or shelves 38 (FIG. 4A), the sequence advances to step 184 and the current object is placed (fixed) in its current position relative to the rating scale 30 (FIG. 4A).

FIG. 15B is a continuation of the flowchart begun in FIG. 15A. At step 186 the object that has been placed at a position is assigned a preference value determined by the placed position of that object relative to the rating scale 30 (FIG. 4A), in accordance with the illustrated example.

At step 188, in this example, when gesture input is received on the touch screen of the computing device 5A, indicating the pointer in contact with the touch screen is in the next object zone, after having placed the previous object, the sequence advances to step 190 and the next object is moved to the pointer position, then to step 192 where the object is attached to the current pointer position and the product/item info tag 66 (FIG. 6B) is displayed near the object.

At step 194, when gesture input is received and pointer movement is detected, the sequence advances to step 196 where the current object is moved to follow the pointer position. At step 198, when gesture input is received indicating the pointer has moved into the next object zone, by passing the current row or shelf 38 (FIG. 4A), the current object is placed in its current position and assigned a preference value determined by the placed position of that object relative to the rating scale 30 (FIG. 4A), and the sequence advances to step 200. If it is determined at step 200 that there are objects in the current object set remaining to be placed, the sequence loops back to step 188 and continues. If it is determined at step 200 that the last object in the object set has been placed, step 202 is executed and a new object set is loaded into the interface.

FIG. 16 is a flowchart illustrating a subroutine of the flowchart 15B step 202, relating to loading object sets, of objects representing products or items 28 (FIG. 4A), in an example software user interface, in accordance with various embodiments.

In FIG. 16 at step 204, when all objects in the previous object set have been placed and assigned preference values, as in the example illustrated in FIG. 15B, preference values of the previous object set are read from the RAM of the computing device 206. In this example, at step 208 objects from the previous object set having preference values above a predetermined threshold are flagged. At step 210 objects are referenced, for example from the product information database 110, stored on the e-commerce website servers 108 (FIG. 13), and objects similar to flagged objects are identified. At step 212 a new object group is compiled from among identified objects. At step 214, the new object group is loaded into the software user interface, and at step 216, the first set of object images from the object group are displayed.

Figure 17:
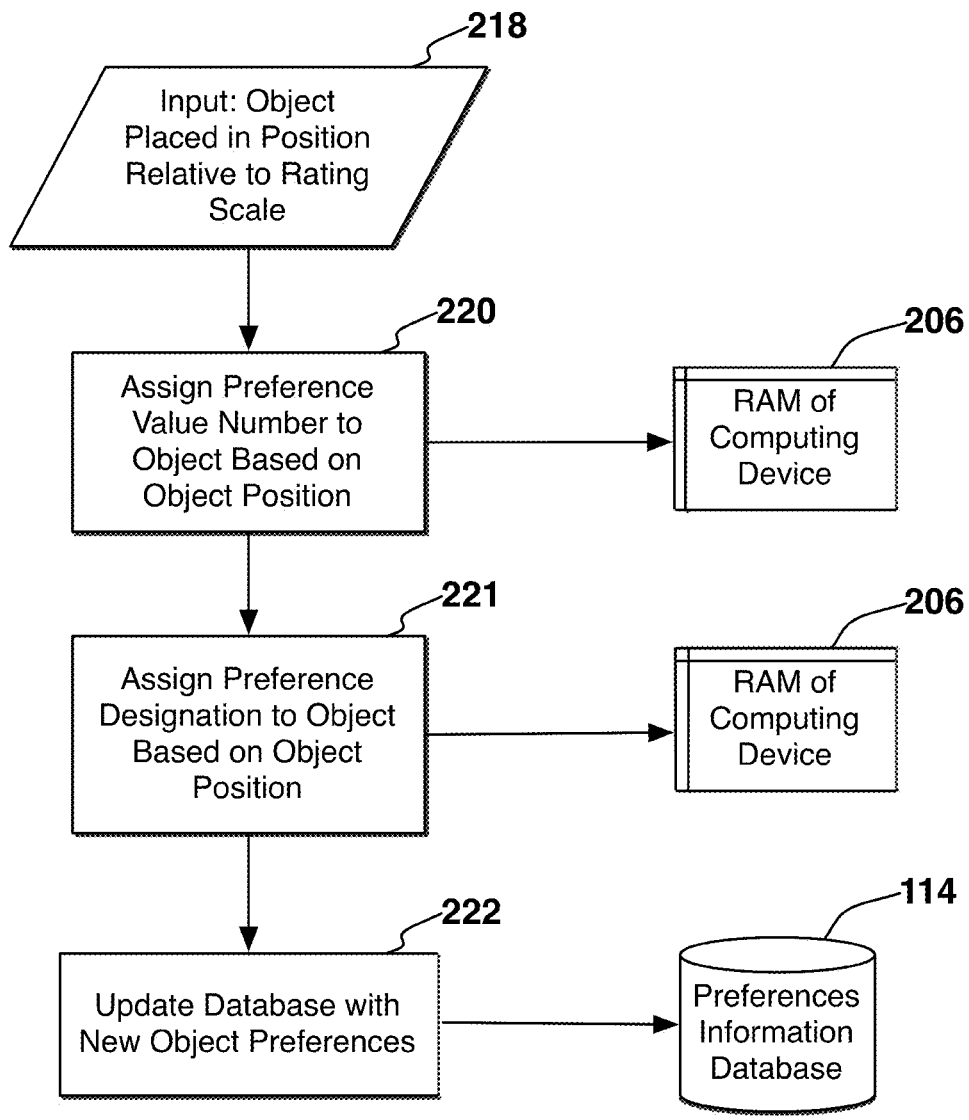
FIG. 17 is a flowchart indicating an example of a software process subroutine for assigning preference values to objects/items rated in an example software user interface in accordance with one or more aspects of the present disclosure.

FIG. 17 is a flowchart illustrating a subroutine of the flowchart 14B step 132, relating to assigning preference values to objects representing products or items 28 (FIG. 4A), in an example software user interface, and an example of storing those values, in accordance with various embodiments.

In the example of FIG. 17, at step 218, when gesture input is received on the touch screen of the computing device 5A, indicating the current object representing products or items 28 (FIG. 4A) has been placed in a position relative to the rating scale 30 (FIG. 4A), the sequence advances to step 220, a preference value number is assigned to the current object, that value is saved to the RAM of the computing device 206, then the sequence advances to step 221, where the preference designation 48 (FIG. 3) is assigned to the current object, and that designation is saved to the RAM of the computing device 206. At step 222 the preference value number and designation are transmitted for example to the preferences information database 114 stored on the preferences collection servers 112 (FIG. 13).

Figure 18:
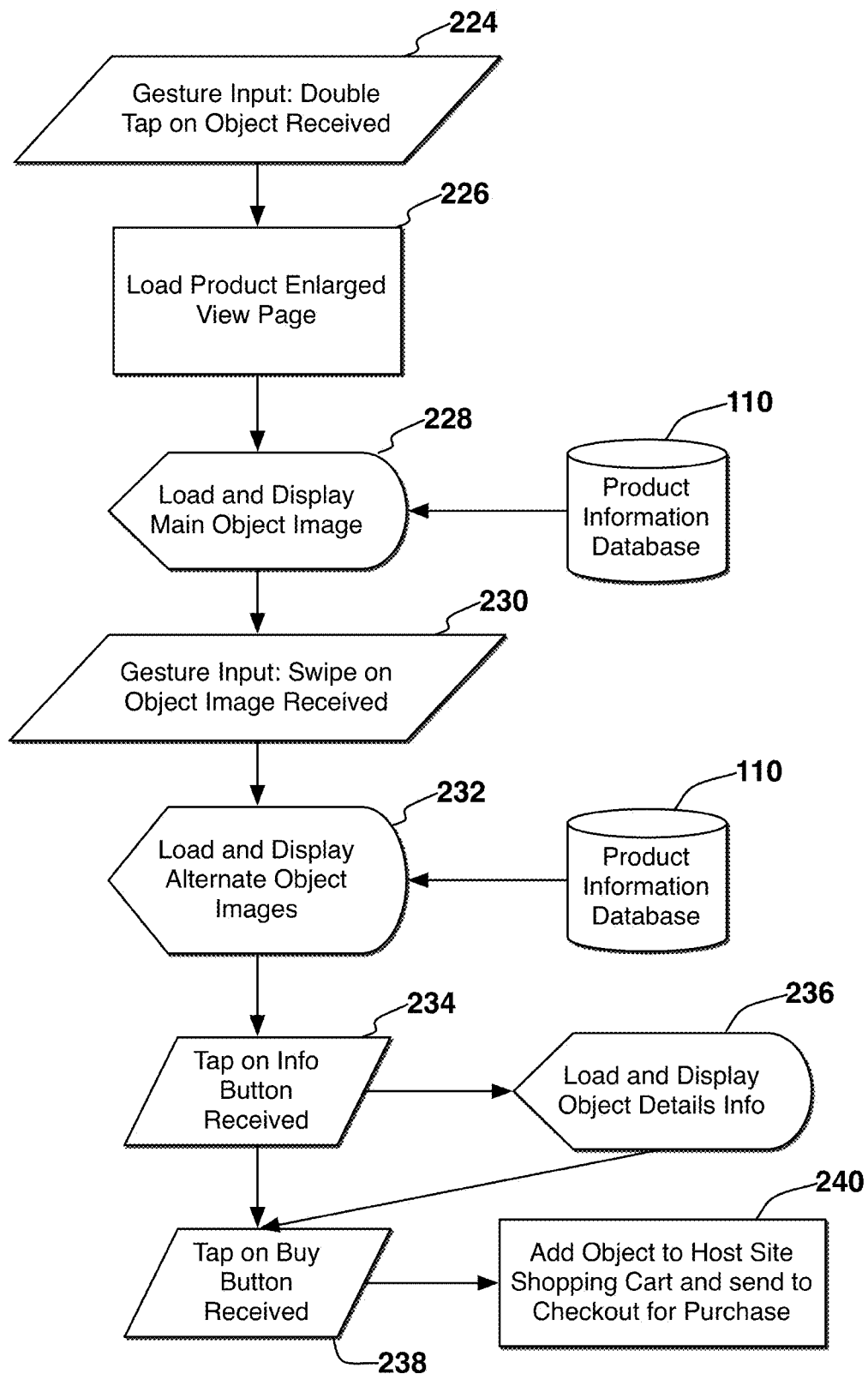
FIG. 18 is a flowchart indicating an example of a software process subroutine for operations in a product enlarged view page of a software user interface in accordance with one or more aspects of the present disclosure.

FIG. 18 is a flowchart illustrating a subroutine of the flowchart 14C step 146, relating to operations of the product enlarged view page 70 (FIG. 9A), in an example software user interface, in accordance with various embodiments.

In the example of FIG. 18, at step 224, when a double tap gesture input is received on the touch screen of the computing device 5A, on the current object representing products or items 28 (FIG. 4A), the sequence advances to step 226, the product enlarged view page 70 (FIG. 9A) is loaded in the software user interface, then to step 228, where the main image of the object is accessed for example on the product information database 110 (FIG. 13), and loaded into the product enlarged view page 70 (FIG. 9A). In some embodiments, at step 230 when a swipe gesture on the object image is performed by the user, the sequence advances to step 232 and the interface loads and displays alternate object images from the product information database 110, showing views of the object from different angles. At step 234 when a tap on the info button 74 (FIG. 9A) gesture is received the sequence advances to step 236, the interface loads and displays more detailed product information on that object. At step 238 when a tap on the buy button 76 (FIG. 9A) gesture is received, the sequence advances to step 240 and the interface closes, in this example adding the object to the shopping cart of the host website, and sending it the site's checkout page for purchase.

Figure 19:
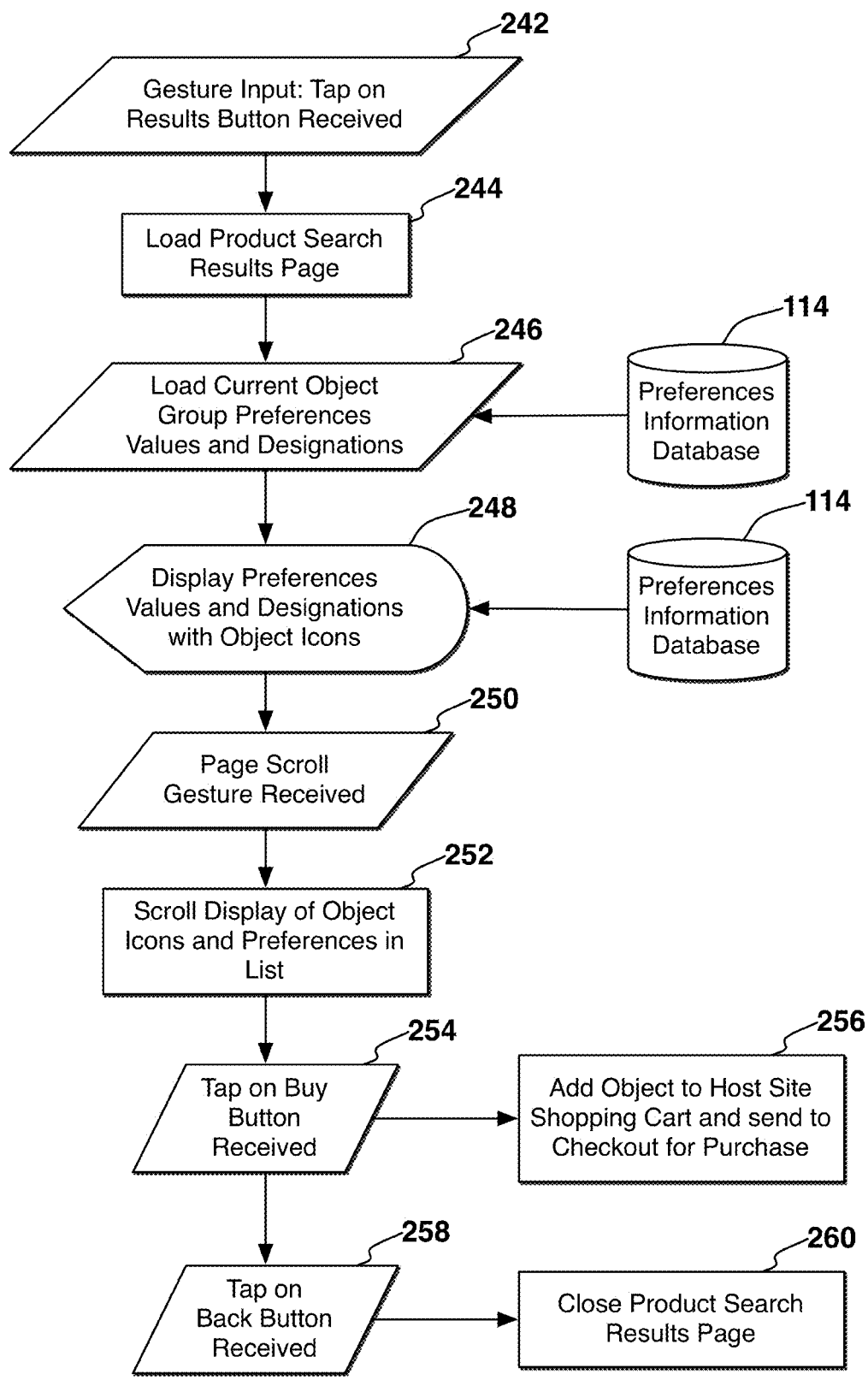
FIG. 19 is a flowchart indicating an example of a software process subroutine for operations in a product search results page of a software user interface in accordance with one or more aspects of the present disclosure.

FIG. 19 is a flowchart illustrating a subroutine of flowchart 14C step 154, relating to operations of the product search results page 86 (FIG. 11A), in an example software user interface, in accordance with various embodiments.

In the example of FIG. 19, at step 242, when a tap gesture input is received on the touch screen of the computing device 5A, on the results button 42 (FIG. 2A) the sequence advances to step 244, where the product search results page 86 (FIG. 11A) is loaded in the software user interface, then to step 246, where the preference value numbers and designations of the objects in the current object group are recalled, for example from the preferences information database 114 stored on the preferences collection servers 112 (FIG. 13), and loaded into memory of the computing device 5A.

In FIG. 19 At step 248 in some embodiments the preference value numbers and designations of the objects in the current object group are displayed along with corresponding item icons 90 (FIG. 11A) in the product search results page 86 (FIG. 11A) of the software user interface, for example as the item list with ratings 88 (FIG. 11A). At step 250 in some case when gesture input is received on the touch screen of the computing device 5A indicating a page scroll, for example when the user touches and drags with one finger vertically up or down on the touch screen, the sequence advances to step 252, and the interface scrolls up or down in the item list with ratings 88 (FIG. 11A), following the gesture input received.

At step 254 in some embodiments when a tap on the buy button 76 (FIG. 11A) gesture is received, the sequence advances to step 256 and the object represented by the item icon 90 (FIG. 11A) is added to the shopping cart of the host website, and sent to the site's checkout page for purchase.

At step 258 in some embodiments when a tap on the back button 34 (FIG. 11A) gesture is received, the sequence advances to step 260, the product search results page 86 (FIG. 11A) is closed and, in some examples, the software user interface returns to the product/item display area 36 (FIG. 4A) view.

Figure 20A:
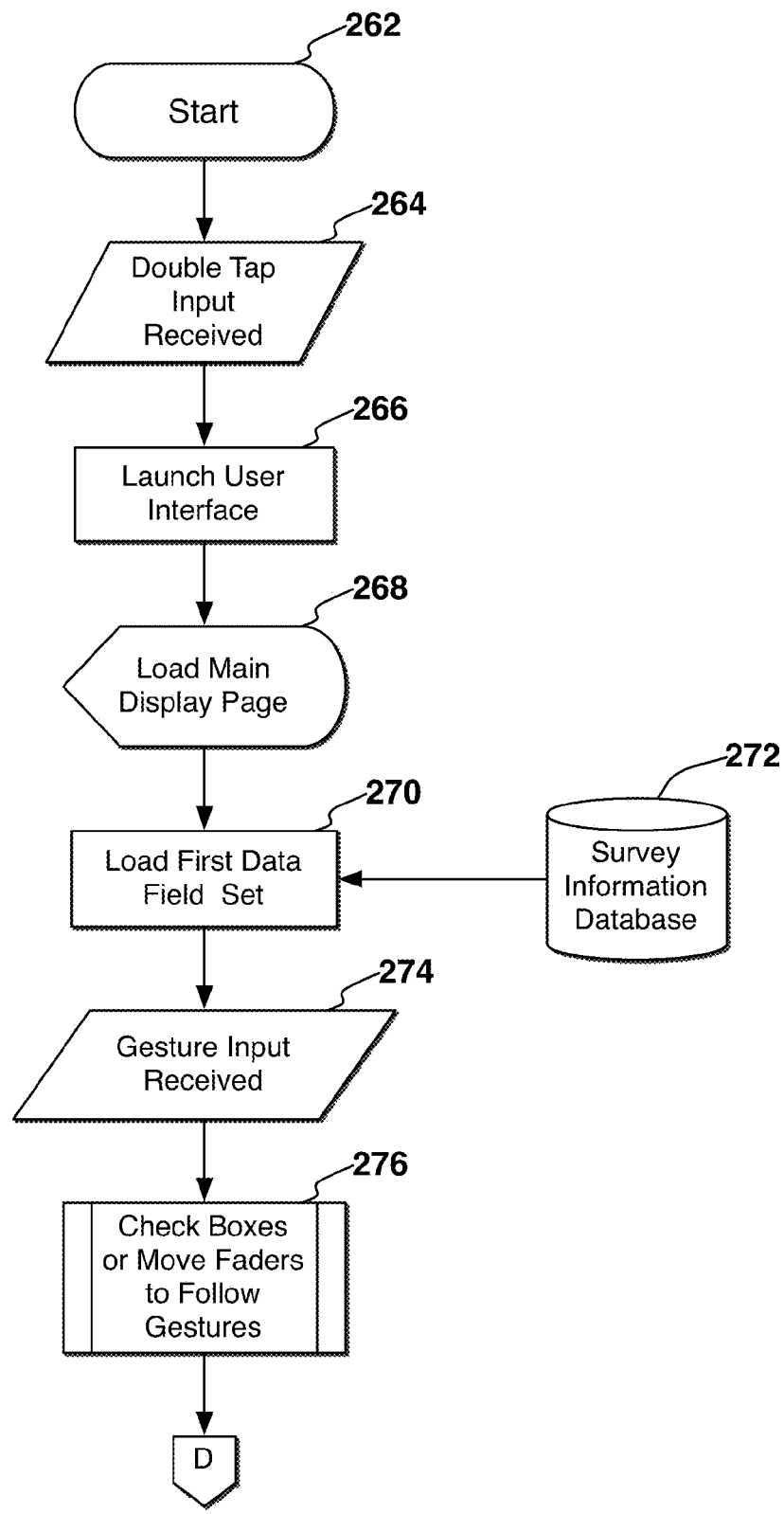
FIGS. 20A & 20B are flowcharts indicating examples of software process steps for operations of a survey or profile data input method in accordance with one or more aspects of the present disclosure.
Figure 20B:
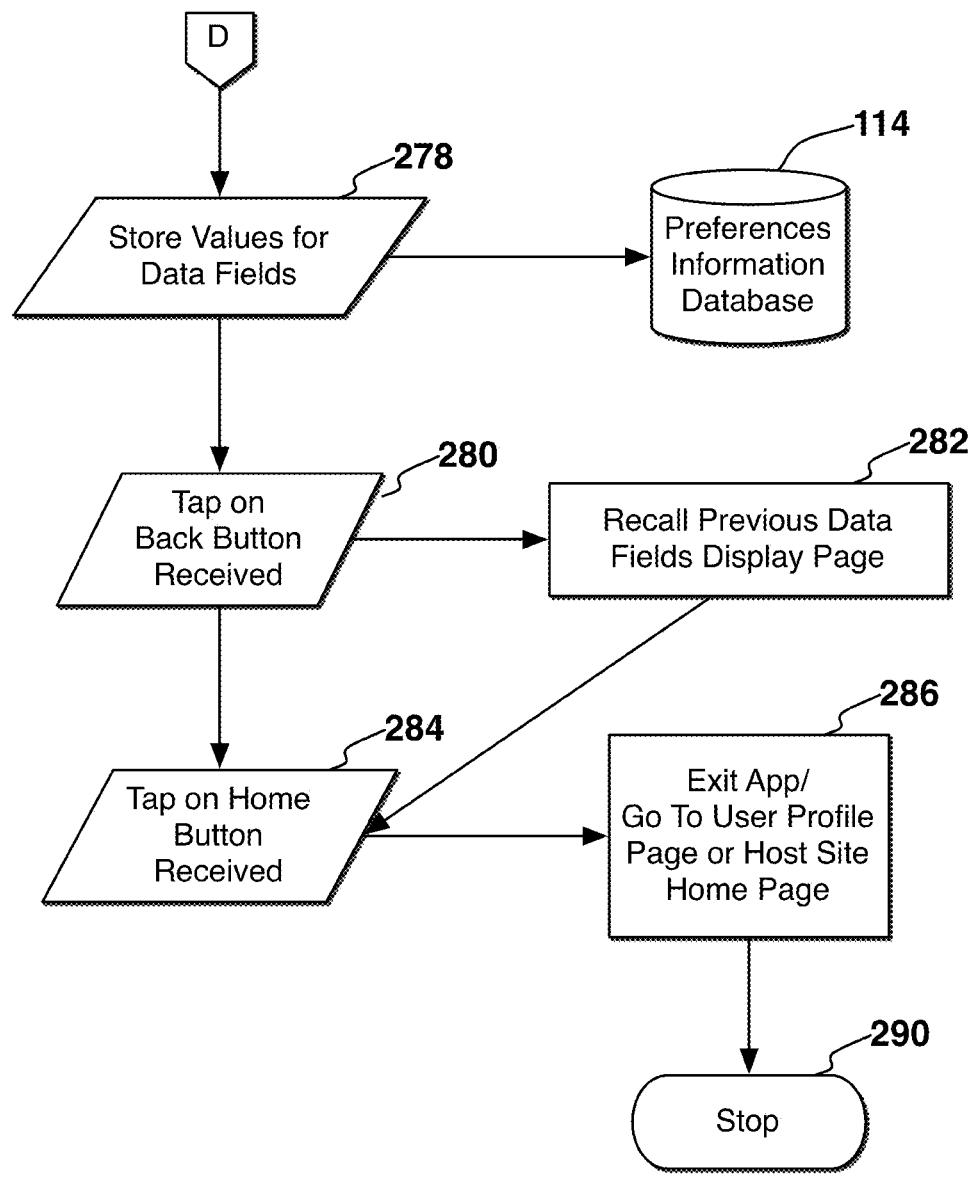

FIG. 20A is a flowchart illustrating example software process steps, for operations of an example of a software user interface controlled by a computing device, in accordance with one or more embodiments of the present disclosure. The flowchart in FIG. 20B is a continuation of the flowchart begun in FIG. 20A.

In accordance with some embodiments, at step 264 the human operator may perform a double tap gesture on the touch screen of the computing device 5A (FIG. 1D), initiating the launch at step 266 of the software user interface controlled by the computing device 5A.

In FIG. 20A at step 268 in some embodiments the software user interface loads the display page, for example the survey form 54 (FIG. 4C), including checkboxes 58 (FIG. 4C), or sliders 59 (FIG. 4D). At step 270 the first data set, in some examples consisting of data field designations 56 (FIG. 4C), and a plurality of various possible values for each data field, is loaded, in some instances from a survey information database 272 into the survey form 54 (FIG. 4C) in the software user interface.

At step 274 in some embodiments when gesture input is received, indicating the pointer 10 (FIG. 4C) is in contact with the touch screen of the computing device 5A, the sequence advances to step 276 and checkboxes 58 are checked or sliders 59 are moved following the gestures performed. The process of step 276 is further detailed in FIG. 20C.

FIG. 20B is a continuation of the flowchart begun in FIG. 20A. At step 278 in some examples when values for data fields have been input, the values are stored on a preferences information database 114. At step 280 when a tap on the back button 34 (FIG. 4C) gesture is received, the sequence advances to step 282 and the interface displays the previous survey form 54 page. At step 284 when a tap on the home button 24 (FIG. 4C) gesture is received, the sequence advances to step 286, the user interface is exited, and in various embodiments the website or service hosting the survey form may return the user to their profile page or a home page.

Figure 20C:
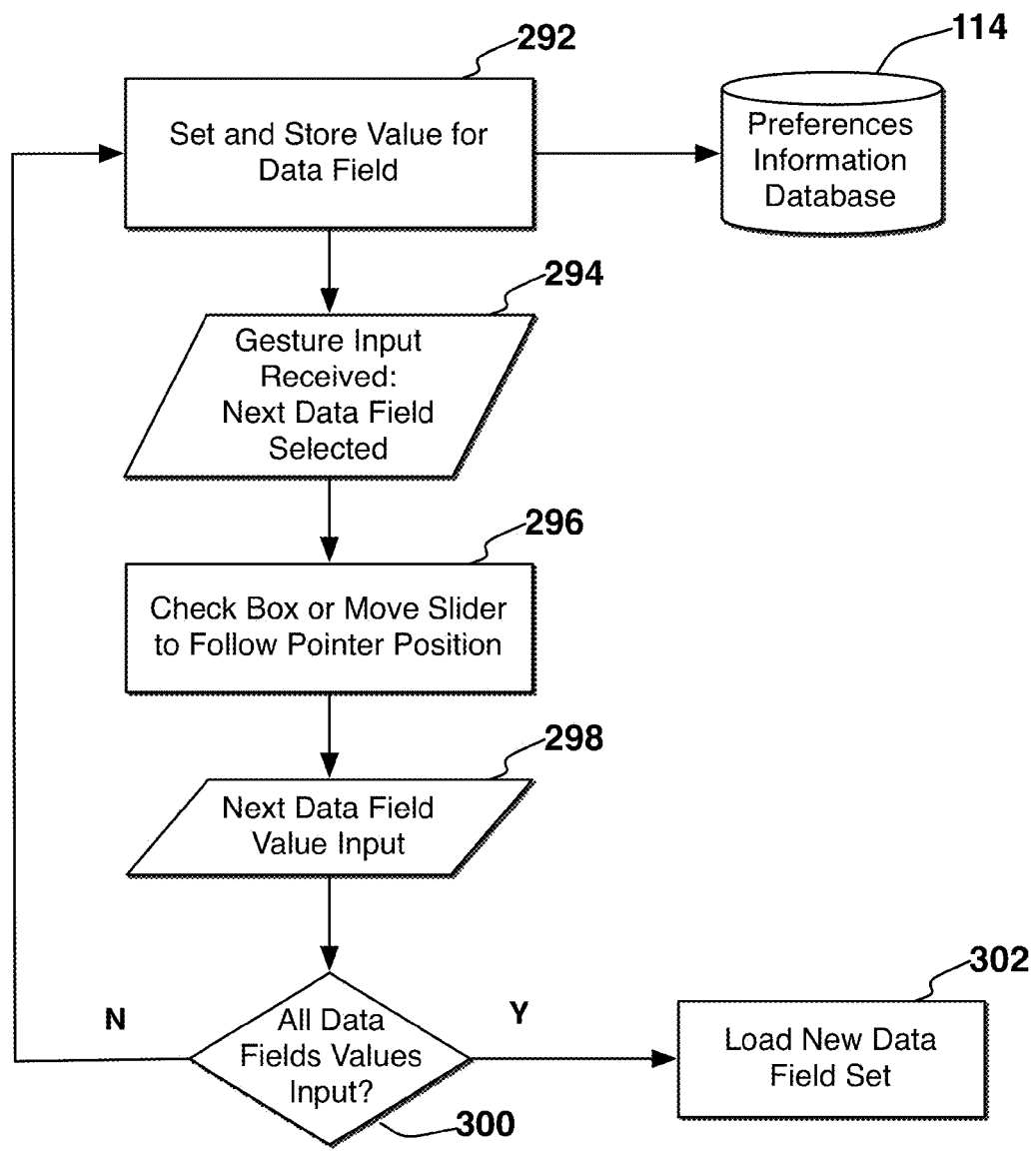
FIG. 20C is a flowchart indicating an example of a software process subroutine for inputting survey or profile data in a software user interface in accordance with one or more aspects of the present disclosure.

FIG. 20C is a flowchart illustrating a subroutine of flowchart 20A step 276, relating to data field input operations of the survey form 54 (FIG. 4C), in an example software user interface, in accordance with various embodiments.

In FIG. 20C at step 292 in this example the value for the data field previously input is set and stored in the memory of the computing device 5A, and in some embodiments stored in the preferences information database 114.

At step 294 when gesture input is received, indicating the pointer 10 (FIG. 4C) is in contact with the touch screen of the computing device 5A, and has for example touched the next checkbox 58 (FIG. 4C), or moved the next slider 59 (FIG. 4D), the sequence advances to step 296, the checkbox is checked, or the slider moved according to the gesture input, and at step 298 a value is input for that data field. In this example, if it is determined at step 300 that values have not been input for all data fields, the sequence loops back to step 292 and continues. If it is determined at step 300 that values have been input for all data fields, the sequence advances to step 302 and a new data field set is loaded into the survey form 54 (FIG. 4C).

Figure 20D:
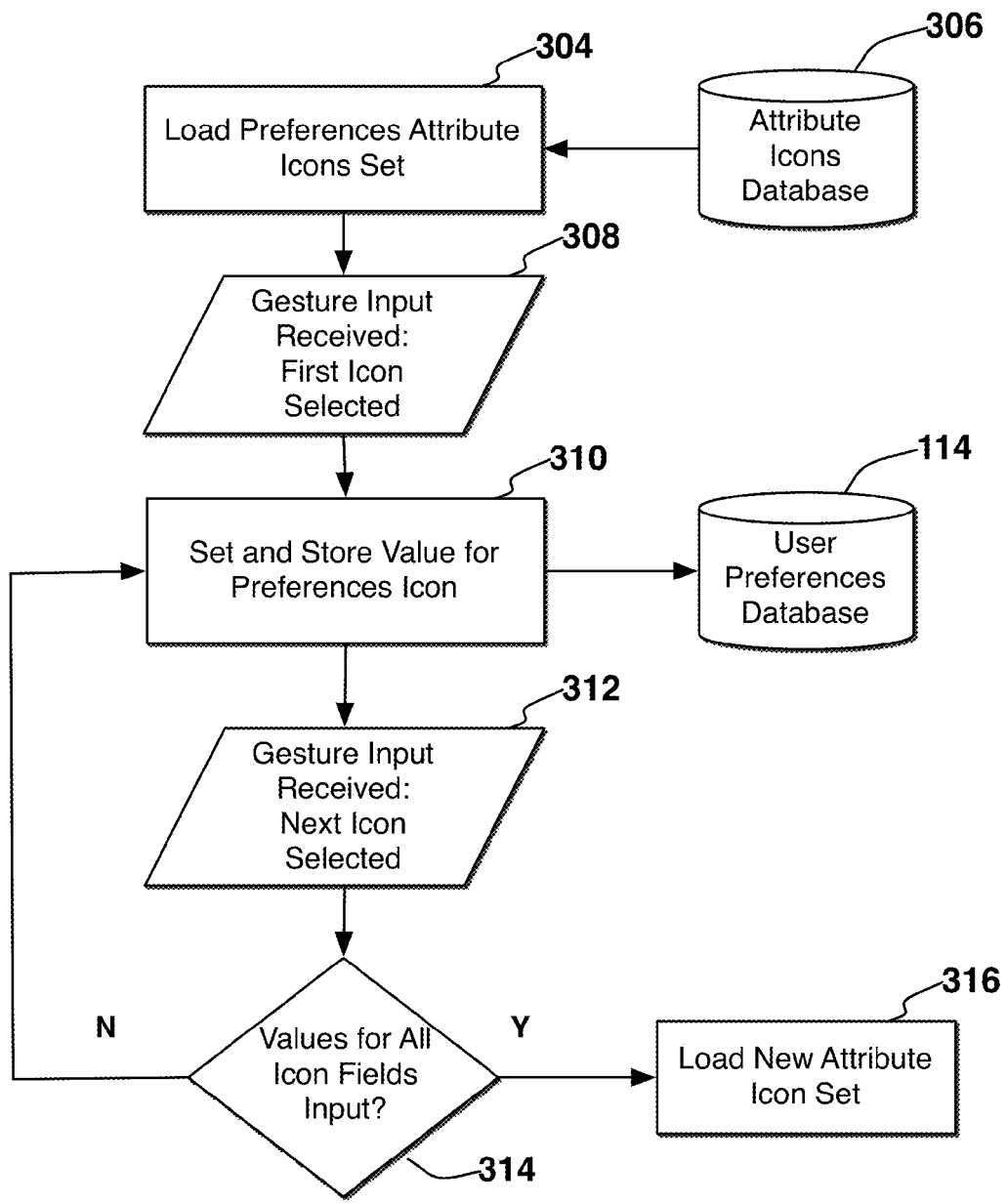
FIG. 20D is a flowchart indicating an example of a software process subroutine for preferences data input using attribute icons in a software user interface in accordance with one or more aspects of the present disclosure.

FIG. 20D is a flowchart illustrating a subroutine for input of preferences in the member preferences input page 60 (FIG. 5), in an example of a software user interface, in accordance with various embodiments.

In the example of FIG. 20D at step 304 a preferences attribute icons set is loaded into the member preferences input page 60 (FIG. 5) of a software user interface, in some instances from an attribute icons database 306, which in some embodiments may be stored on the e-commerce website servers 108 (FIG. 13). At step 308 when gesture input is received, for example indicating the pointer 10 (FIG. 5) is in contact with the touch screen of the computing device 5A, and has for example touched the first of the attribute icons 62 (FIG. 5), that icon is selected. At step 310 that icon value is set to indicate it is now an attribute icon in selected state 64 (FIG. 5), and the value in some examples may be stored to the user preferences database 114, for instance on preferences collection servers 112 (FIG. 13).

At step 312 when gesture input is received, indicating the next attribute icon 62 has been selected, the sequence advances to step 314, where it is determined if values for all attribute icon data fields have been input; if no, the sequence loops back to step 310 and continues; if yes, the sequence advances to step 316 and a new set of attribute icons 62 is loaded into the member preferences input page 60 (FIG. 5) of the software user interface.

Figure 21:
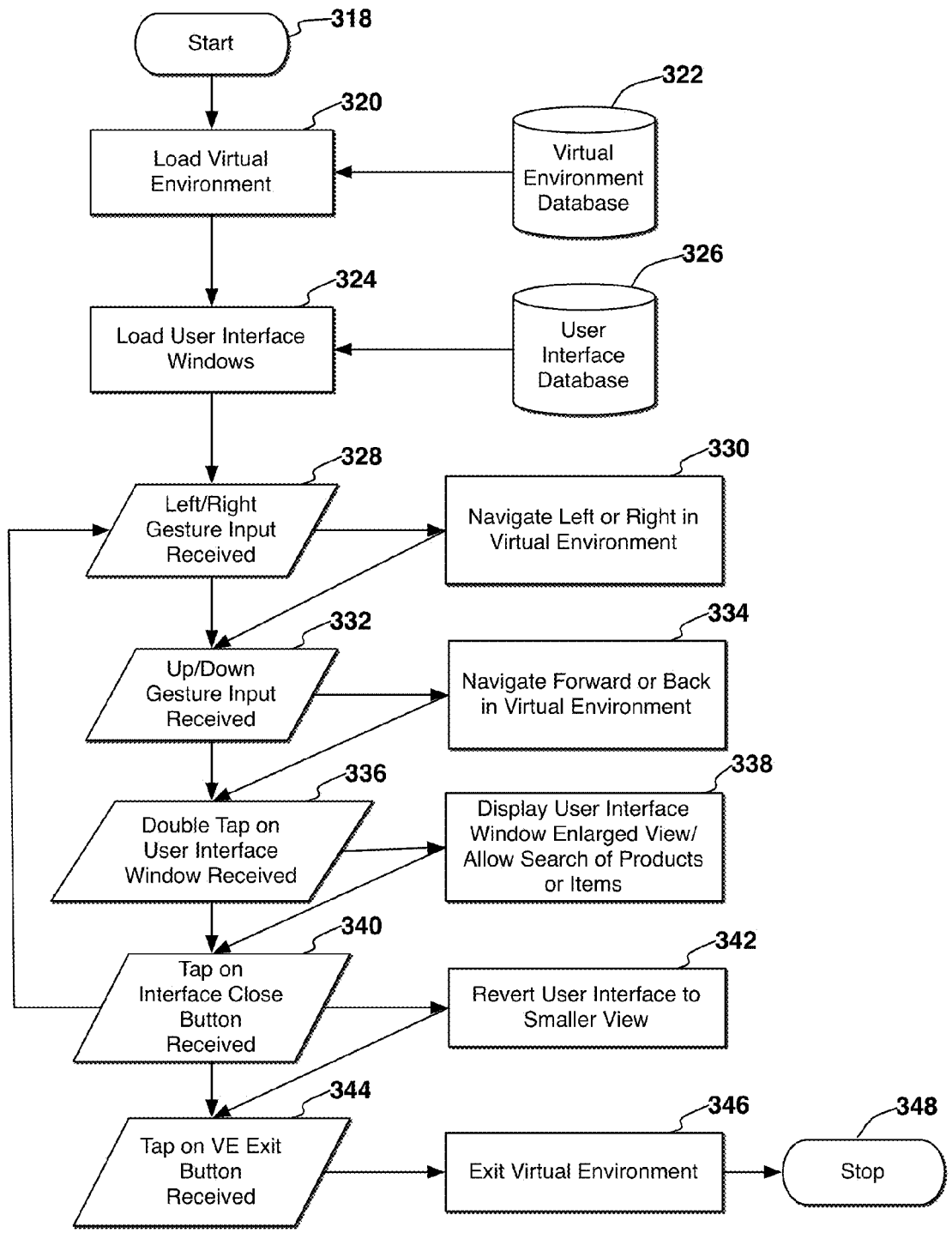
FIG. 21 is a flowchart indicating examples of software process steps for operations of a software user interface embedded in a virtual shopping environment in accordance with one or more aspects of the present disclosure.

FIG. 21 is a flowchart illustrating an example of software process steps, for operations of an example of a software user interface controlled by the computing device 5A, embedded in the virtual environment 100 (FIG. 12A), in accordance with various embodiments of the present disclosure.

In FIG. 21, in some embodiments, at step 320 the virtual environment 100 (FIG. 12A) is loaded into the computing device 5A, for example from a virtual environment database 322, which in some instances may be stored on e-commerce website servers 108 (FIG. 13). At step 324 user interface windows 12A (FIG. 12A) are loaded into the virtual environment 100, for example from a user interface database 326, which in some instances may be stored on e-commerce website servers 108 (FIG. 13). At Step 328 in some embodiments, when gesture input is received, indicating the pointer 10 (FIG. 12A) is in contact with the touch screen of the computing device 5A, indicating single-point, or one-finger gestures swiping to the left or to the right are being performed (FIG. 12C), the sequence advances to step 330 and navigation to the left or right within the virtual environment 100 is executed.

At Step 332 for example when gesture input is received, indicating the pointer 10 (FIG. 12A) is in contact with the touch screen of the computing device 5A, indicating for example right click, dual-point, or two-finger gestures swiping up or down are being performed (FIG. 12D), the sequence advances to step 334 and navigation forward or backward within the virtual environment 100 is executed.

In this example, at Step 336 when a double-tap gesture input is received on the touch screen of the computing device 5A, in the area of one of the user interface windows 12A (FIG. 12A), step 338 is executed, and the user interface window in enlarged view 12B (FIG. 12B) is displayed, facilitating for example search and rating of products or items in a process similar to that depicted in FIG. 4A.

At step 340 for example when a tap gesture input is received on the user interface close button 14 (FIG. 12B), step 342 is executed and the user interface window in enlarged view 12B is replaced with the smaller view software user interface window 12A.

At step 344 for example when a tap gesture input is received on the virtual environment exit button 104 (FIG. 12B), the sequence advances to step 346 and the virtual environment 100 is exited, in some instances returning the user to their profile page or the host site's home page.

Figure 22:
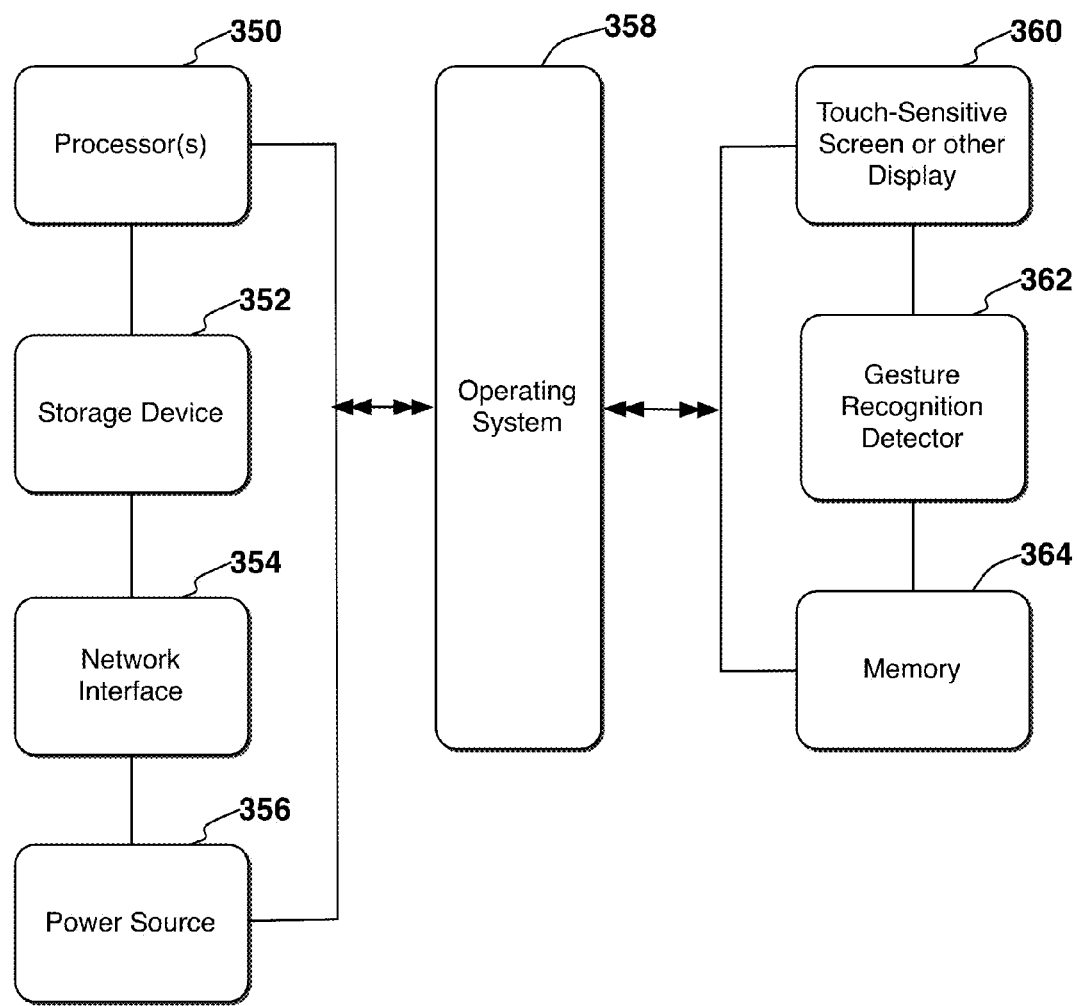
FIG. 22 is a drawing illustrating an example of the components of the computing device in accordance with one or more embodiments of the present disclosure.

FIG. 22 is a drawing illustrating an example of the components of the computing device 5A. This drawing is intended to indicate a minimum set of components for an example of a computing device we may contemplate to be utilized in various embodiments of the disclosure; however, many other hardware configurations are possible that may also be utilized in accordance with various embodiments.

The example computing device of FIG. 22 comprises the processor(s) 350, storage device (for example a hard drive) 352, network interface 354, power source 356, operating system 358, touch-sensitive screen or other display 360, gesture recognition detector 362, and memory (for example RAM) 364.

CONCLUSION, RAMIFICATIONS, AND SCOPE

Thus the reader will see that one or more embodiments of the present innovation provide systems and methods that enable customers of e-commerce companies, websites and mobile applications to shop, perform searches, enter values for a plurality of fields of profile and other types of data in a single swipe or gesture, and enter specific degrees of preference for a plurality of products and services in a single swipe or gesture, allowing customers to complete e-commerce activities more quickly and effectively than is possible by other methods. In addition the various embodiments of the present disclosure empower e-commerce companies to gather more richly detailed preferences data from their customers users and members, more effectively, and in less time than is accomplished with other methods.

While the above description contains many specificities, these should not be construed as limitations on the scope of any embodiment, but as exemplifications of various embodiments thereof. Many other ramifications and variations are possible within the teachings of the various embodiments. For example:

Social Shopping Websites

A software user interface operated on the touch screen of a mobile device, on a desktop or laptop computer, or other computing device, such that the interface is embedded on a social shopping website or other application, where the user enters values for degrees of preference for a plurality of products, items or services in a single swipe or gesture, and social shopping websites gather more detailed member profile data from member or users.

Remotely Controlled Services

A user interface for inputting of gestures that are transmitted over the internet or other network, to web servers or other computing devices in a location other than that of the user, for processing and recording of those gestures.

Social Networking Websites

A software user interface operated on the touch screen of a mobile device, on a desktop or laptop computer, or other computing device, such that the interface is embedded on a social networking website or other application, where the user enters values for multiple fields of member profile information in a single swipe or gesture, and social networking websites gather more detailed member profile data from their members, in less time than other methods.

Music Websites

A software user interface operated on the touch screen of a mobile device, on a desktop or laptop computer, or other computing device, for music websites, such that the interface is embedded on a music website or other application, where the user describes degrees of preference for multiple songs in a single swipe or gesture, the interface responds by presenting the user with more songs similar to those they like, and music companies gather more detailed preferences data from their customers.

Medical Offices

A mobile device or computer station in a doctor's office or other location where patients are seen, where a software user interface is operated by patients and staff, to enter answers to multiple patient information questions, on medical and office administrative forms, in a single swipe or gesture, such that patient intake processes are faster and easier for patients and office staff.

Gaming

A software user interface operated on the touch screen of a mobile device, on a desktop or laptop computer, or other computing device, for video games, such that the user enters values for multiple game elements in a single swipe or gesture, making gaming interfaces more powerful, and enabling more gaming elements to be engaged with at once by players.

It will be apparent to those having ordinary skill in the art that modifications to the systems and processes disclosed herein may occur, without departing from the true spirit and scope of the disclosure. The present innovations may clearly have many ramifications other than the embodiments recited in the detailed description, and may be implemented through a plurality of user interface modalities, for example:

- A pair of glasses the user wears to view the display functions of a computing device, such that the glasses include a surface on which the user performs gestures, or glasses that track eye movements, for inputting of values, responses, etc.
- A user interface for a computing device implemented through the use of a holographic image display method, in two or more dimensions, where in the case of a three dimensional display, forward and back gestures may be performed.
- An in-store hybrid process combining user interface stations based on mobile or stationary computing devices for user data input, with actual displays of real product and service offerings in a so-called "brick and mortar" retail store environment.
- An internet-based user interface process, accessed by the user through mobile or desktop computing devices, to interact with a company's customer preferences database to inform the company and user in a manner as to best prepare both company and user for a purchase transaction online, or a purchase transaction in an actual "brick and mortar" store location.
- A larger-format user interface display installation in a retail store environment, supporting a process of engaging in-store customers to input their preferences for various products or service offerings, in preparation for making a purchase in that store, or to inform a sales person in the store such that they may address the user more specifically and effectively based on the user's stated preferences.
- A software user interface application controlled by voice commands used to direct the interface to move objects representing products or items to specific locations on the rating scale to indicate degrees of user preference.
- Any of the ramifications and variations within the teachings of the various embodiments of the disclosure, achieved through any variation of gesture recognition systems that employ cameras, LEDs, or other methods, to track and respond to gestures of the hands or other parts of the body of a human operator, in order to input data, manipulate text and images, or otherwise control a computing device and its interface.
- Any of the ramifications and variations within the teachings of the various embodiments of the disclosure, wherein the user employs the same methods by performing a series of two or more gestures rather than one continuous gesture.

Notwithstanding the software algorithms and processes described, any existing or future software algorithms and processes may be utilized, in implementing the foregoing various embodiments and their equivalents, without departing from the true spirit and scope of the disclosure.

Notwithstanding the computing device hardware implementation described, any existing or future hardware or human operator interface technologies may be utilized, including any form of pointer means functioning as a part of any existing or future human operator interface technologies, and any combination of gesture recognition or holographic interfaces.

Notwithstanding the network implementation described, any existing or future network or communications infrastructure technologies may be utilized, including any combination of public and private networks. In addition, although specific software process flow diagrams or data structures may have been illustrated, and specific forms of user interface hardware and software may have been indicated, these are for exemplary purposes only, other processes which achieve the same functions or utilize different data structures or formats are contemplated to be within the scope of the concepts described herein. As such, the exemplary embodiments described herein are for illustrative purposes and are not meant to be limiting.

Accordingly, the scope should be determined not by the embodiments illustrated, but by the appended claims and their legal equivalents.

What is claimed:

1. A computer-implemented method for input by a human operator of degrees of preference for a plurality of objects representing products, items or services, in a single swipe or gesture, comprising:
    a) providing a computing device having at least a processor, a memory, and a touch screen display;
    b) providing software loaded into said memory;
    c) providing instructions in said software for displaying a rating scale having a predetermined range of values representing said degrees of preference;
    d) providing said instructions in said software for displaying said plurality of said objects representing products, items or services;
    e) providing said instructions in said software for displaying said objects on graphical representations of rows or shelves, in an orientation relative to said rating scale;
    f) providing said instructions in said software for detecting and responding to gestures performed on said touch screen display;
    g) providing a pointer which said human operator may manipulate to perform said gestures on said touch screen display;
    h) displaying on said touch screen display said rating scale, and said rows or shelves in said orientation relative to said rating scale;
    i) displaying on said touch screen display said objects on said rows or shelves;
    j) detecting a contact of said pointer on said touch screen display;
    k) while said contact of said pointer on said touch screen display is continuously maintained, performing a series of operations implemented by one or more processors, comprising:
    l) detecting when location of said pointer on said touch screen display intersects one of said objects, and attaching said one of said objects to position of said contact of said pointer at said location;
    m) detecting movement of said pointer on said touch screen display, and moving said one of said objects along one of said rows or shelves, in accordance with said movement of said pointer;

n) while said contact is maintained, detecting when said pointer passes over current one of said rows or shelves and into area of adjacent one of said rows or shelves, and said instructions in said software causing said one of said objects previously moved to be fixed in its current placement relative to said rating scale;

o) detecting said current placement relative to said rating scale of said one of said objects previously moved, and said software assigning and recording a value according to degree of preference indicated by said current placement;

p) while said contact is continuously maintained, for each subsequent said one of said objects currently displayed, repeating the following steps:

q) detecting when said location of said pointer on said touch screen display intersects each said one of said objects, attaching said one of said objects to said position of said contact of said pointer at said location, and moving said one of said objects along said one of said rows or shelves, in accordance with said movement of said pointer;

r) detecting when said pointer passes over said current one of said rows or shelves and into said area of said adjacent one of said rows or shelves, and said instructions in said software causing said one of said objects previously moved to be fixed in its said current placement relative to said rating scale;

s) detecting said current placement relative to said rating scale of each of said one of said objects previously moved, and said software assigning and recording said value according to said degree of preference indicated by said placement;

whereby said human operator may input said degrees of preference for said plurality of said objects in said single swipe or gesture on said touch screen display.

2. The method of claim 1, further including when said contact of said pointer on said touch screen display is detected, said instructions in said software causing object on row or shelf nearest to said location of said contact on said touch screen display to automatically move along said row or shelf to said location.

3. The method of claim 1, further including detecting when said one of said objects is attached to said position of said contact of said pointer at said location, and said instructions in said software causing to be displayed an info tag containing designations of brand name, model, price, or other information relating to product, item or service represented by said one of said objects.

4. The method of claim 1, further including detecting when said values for said degrees of preference for all of said objects currently displayed have been recorded, and as a result said instructions in said software causing current display page to automatically scroll to display a new instance of said display page, and a new set of said objects.

5. The method of claim 4, wherein said instructions in said software determine said new set of said objects to consist of said objects representing said products, items or services similar to those said products, items or services represented by said objects for which said values for said degrees of preference above a predetermined threshold have previously been assigned.

6. The method of claim 1, wherein said value according to said degree of preference indicated by said current placement relative to said rating scale is transmitted over the internet or other network, and stored in a database on a server.

7. The method of claim 1, further including displaying said rating scale, said objects, and said rows or shelves in one or more software interface windows, embedded within a virtual shopping environment, and displaying said virtual shopping environment, and said software interface windows on said touch screen display of said computing device, enabling said human operator to perform the method of claim 1 within said virtual shopping environment.

8. The method of claim 7, wherein said virtual shopping environment is implemented in a mobile device application accessed by said human operator on a mobile computing device, or on an e-commerce website accessed by said human operator on a mobile computing device.

9. The method of claim 7, further including means for navigation within said virtual shopping environment enabling said human operator to move in a plurality of directions within said virtual shopping environment.

10. A computer-implemented method for input by a human operator of degrees of preference for a plurality of objects representing products, items or services, in a single swipe or gesture, comprising:

a) providing a computing device having at least a processor, a memory, and a touch screen display;

b) providing software loaded into said memory;

c) providing instructions in said software for displaying a rating scale having a predetermined range of values representing said degrees of preference;

d) providing said instructions in said software for displaying said plurality of said objects representing said products, items or services;

e) providing said instructions in said software for displaying said objects on graphical representations of rows or shelves, in an orientation relative to said rating scale;

f) providing said instructions in said software for detecting and responding to gestures performed on said touch screen display;

g) providing a pointer which said human operator may manipulate to perform said gestures on said touch screen display;

h) displaying on said touch screen display said rating scale, and said rows or shelves in said orientation relative to said rating scale;

i) displaying on said touch screen display said objects on said rows or shelves;

j) detecting a contact of said pointer on said touch screen display;

k) while said contact of said pointer on said touch screen display is continuously maintained, performing a series of operations implemented by one or more processors, comprising:

l) when said contact is detected, said instructions in said software causing object on row or shelf nearest to location of said contact on said touch screen display to automatically move along said row or shelf to said location, and attach to position of said contact of said pointer at said location;

m) detecting movement of said pointer on said touch screen display, and moving said object along said row or shelf, in accordance with said movement of said pointer;

n) while said contact is maintained, detecting when said pointer passes over current one of said rows or shelves and into area of adjacent one of said rows or shelves, and said instructions in said software causing said object previously moved to be fixed in its current placement relative to said rating scale;

o) detecting said current placement relative to said rating scale of said object previously moved, and said software assigning and recording a value according to degree of preference indicated by said current placement;

p) while said contact is continuously maintained, for each subsequent one of said objects currently displayed, repeating the following steps:

q) said instructions in said software causing said object on said row or shelf nearest to said location of said contact on said touch screen display to automatically move along said row or shelf to said location, and attach to said position of said contact of said pointer at said location;

r) detecting said movement of said pointer on said touch screen display, and said instructions in said software causing current said object to move along said current one of said rows or shelves, in accordance with said movement of said pointer;

s) detecting when said pointer passes over said current one of said rows or shelves and into said area of said adjacent one of said rows or shelves, and said instructions in said software causing said object previously moved to be fixed in its said current placement relative to said rating scale;

t) detecting said current placement relative to said rating scale of said object previously moved, and said software assigning and recording said value according to said degree of preference indicated by said current placement;

whereby said human operator may input said degrees of preference for said plurality of said objects in said single swipe or gesture on said touch screen display.

11. The method of claim 10, further including detecting when said object is attached to said position of said contact of said pointer at said location, and said instructions in said software causing to be displayed an info tag containing designations of brand name, model, price, or other information relating to product, item or service represented by said object.

12. The method of claim 10, further including detecting when said values for said degrees of preference for all of said objects currently displayed have been recorded, and as a result said instructions in said software causing current display page to automatically scroll to display a new instance of said display page, and a new set of said objects.

13. The method of claim 12, wherein said instructions in said software determine said new set of said objects to consist of said objects representing said products, items or services similar to those said products, items or services represented by said objects for which said values for said degrees of preference above a predetermined threshold have previously been assigned.

14. The method of claim 10, wherein said value according to said degree of preference indicated by said current placement relative to said rating scale is transmitted over the internet or other network, and stored in a database on a server.

15. The method of claim 10, further including displaying said rating scale, said objects, and said rows or shelves in one or more software interface windows, embedded within a virtual shopping environment, and displaying said virtual shopping environment, and said software interface windows on said touch screen display of said computing device, enabling said human operator to manipulate said pointer to perform the method of claim 10 within said virtual shopping environment.

16. The method of claim 15, wherein said virtual shopping environment is implemented in a mobile device application accessed by said human operator on a mobile computing device, or on an e-commerce website accessed by said human operator on a mobile computing device.

17. The method of claim 15, further including means for navigation within said virtual shopping environment enabling said human operator to move in a plurality of directions within said virtual shopping environment.

18. A computer-implemented method for input by a human operator of degrees of preference for a plurality of objects representing products, items or services, in a single swipe or gesture, comprising:

a) providing a computing device having at least a processor, a memory, and a touch screen display;

b) providing software loaded into said memory;

c) providing instructions in said software for displaying a rating scale having a predetermined range of values representing said degrees of preference;

d) providing said instructions in said software for displaying said plurality of said objects representing said products, items or services;

e) providing said instructions in said software for displaying said objects on graphical representations of rows or shelves, in an orientation relative to said rating scale;

f) providing said instructions in said software for displaying said rating scale, said objects, and said rows or shelves in one or more software interface windows, embedded within a virtual shopping environment;

g) providing said instructions in said software for displaying said one or more software interface windows within one of more virtual display areas within said virtual shopping environment;

h) providing said instructions in said software for detecting and responding to gestures performed on said touch screen display;

i) providing a pointer which said human operator may manipulate to perform said gestures on said touch screen display;

j) displaying on said touch screen display said virtual shopping environment, containing said one or more virtual display areas;

k) displaying on said touch screen display one of said software interface windows within each one of said one or more virtual display areas;

l) displaying on said touch screen display, within each of said software interface windows, said rating scale, and said rows or shelves in said orientation relative to said rating scale;

m) displaying on said touch screen display said objects on said rows or shelves;

n) detecting a contact of said pointer on said touch screen display;

o) while said contact of said pointer on said touch screen display and said gestures are detected, performing a series of operations implemented by one or more processors, comprising:

p) when said gestures are detected, implementing means for navigation within said virtual shopping environment in accordance with said gestures to move in a plurality of directions within said virtual shopping environment, and displaying said one or more virtual display areas, containing said one or more software interface windows;

q) when said contact is detected within said one of said software interface windows, said instructions in said software causing object on row or shelf nearest to location of said contact on said touch screen display to automatically move along said row or shelf to said location, and attach to position of said contact of said pointer at said location;

r) detecting movement of said pointer on said touch screen display, and moving said object along said row or shelf, in accordance with said movement of said pointer;

s) while said contact is maintained, detecting when said pointer passes over current one of said rows or shelves and into area of adjacent one of said rows or shelves, and said instructions in said software causing said object previously moved to be fixed in its current placement relative to said rating scale;

t) detecting said current placement relative to said rating scale of said object previously moved, and said software assigning and recording a value according to degree of preference indicated by said current placement;

u) while said contact within said one of said software interface windows is continuously maintained, for each subsequent one of said objects currently displayed in said one of said software interface windows, repeating the following steps:

v) said instructions in said software causing said object on said row or shelf nearest to said location of said contact on said touch screen display to automatically move along said row or shelf to said location, and attach to said position of said contact of said pointer at said location;

w) detecting said movement of said pointer on said touch screen display, and said instructions in said software causing current said object to move along said current one of said rows or shelves, in accordance with said movement of said pointer;

x) detecting when said pointer passes over said current one of said rows or shelves and into said area of said adjacent one of said rows or shelves, and said instructions in said software causing said object previously moved to be fixed in its said current placement relative to said rating scale;

y) detecting said current placement relative to said rating scale of said object previously moved, and said software assigning and recording said value according to said degree of preference indicated by said current placement;

z) continuing to detect said gestures outside said one of said software interface windows, and implement said means for navigation within said virtual shopping environment in accordance with said gestures;

aa) continuing to detect said contact within each subsequent said one of said software interface windows;

bb) continuing to detect said movement within said each subsequent said one of said software interface windows, move and place said objects relative to said rating scale, and assign and record said values for said objects;

whereby said human operator may navigate within said virtual shopping environment, and input said degrees of preference for said plurality of said objects in said single swipe or gesture on said touch screen display.

19. The method of claim 18, further including detecting when said values for said degrees of preference for all of said objects currently displayed within said one of said software interface windows have been recorded, and as a result said instructions in said software causing current display page within said one of said software interface windows to automatically scroll to display a new instance of said display page, and a new set of said objects, wherein said new set of said objects consists of said objects representing said products, items or services similar to those said products, items or services represented by said objects for which said values for said degrees of preference above a predetermined threshold have previously been assigned.

20. The method of claim 18, wherein said value for said degree of preference indicated by said current placement relative to said rating scale is transmitted over the internet or other network, and stored in a database on a server.

* * * * *